(12) United States Patent
Teki et al.

(10) Patent No.: US 10,839,674 B2
(45) Date of Patent: Nov. 17, 2020

(54) MANAGEMENT SYSTEM, MANAGEMENT DEVICE, MANAGEMENT METHOD, AND MANAGEMENT PROGRAM

(71) Applicant: SUMITOMO ELECTRIC INDUSTRIES, LTD., Osaka (JP)

(72) Inventors: Sei Teki, Osaka (JP); Yoji Okada, Osaka (JP); Shigeru Tanaka, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/337,577

(22) PCT Filed: Jul. 3, 2017

(86) PCT No.: PCT/JP2017/024298
§ 371 (c)(1),
(2) Date: Mar. 28, 2019

(87) PCT Pub. No.: WO2018/066186
PCT Pub. Date: Apr. 12, 2018

(65) Prior Publication Data
US 2020/0035087 A1    Jan. 30, 2020

(30) Foreign Application Priority Data

Oct. 6, 2016    (JP) ................................ 2016-198478

(51) Int. Cl.
*G08B 1/08*    (2006.01)
*G08B 25/10*    (2006.01)
(Continued)

(52) U.S. Cl.
CPC ............... *G08B 25/10* (2013.01); *G08B 5/22* (2013.01); *G08B 7/066* (2013.01); *G08B 17/10* (2013.01); *G08B 25/009* (2013.01); *G08B 31/00* (2013.01)

(58) Field of Classification Search
CPC .......... G08B 25/10; G08B 5/22; G08B 7/066; G08B 17/10; G08B 25/009; G08B 31/00
(Continued)

(56) References Cited

U.S. PATENT DOCUMENTS 6,166,627 A * 12/2000 Reeley .................... B60R 25/33
340/426.25
9,679,255 B1 * 6/2017 Mullaly ............... G08B 29/188
(Continued)

FOREIGN PATENT DOCUMENTS

JP    H09-223288 A    8/1997
JP    H10-171519 A    6/1998
(Continued)

*Primary Examiner* — Kerri L McNally
*Assistant Examiner* — Thang D Tran
(74) *Attorney, Agent, or Firm* — Faegre Drinker Biddle & Reath LLP

(57) ABSTRACT

A management system includes a plurality of sensors installed in a predetermined area, and a management device. The management device includes: an acquisition unit configured to acquire sensor information wirelessly transmitted from the plurality of sensors; an accumulation unit configured to accumulate the acquired sensor information; a determination unit configured to perform abnormality determination regarding the predetermined area by use of the sensor information; a notification unit configured to notify a content based on a result of the determination by the determination unit; and a display control unit capable of performing a control of temporally displaying a content regarding the
(Continued)

predetermined area, on the basis of the sensor information acquired by the acquisition unit.

16 Claims, 36 Drawing Sheets

(51) Int. Cl.
  *G08B 5/22* (2006.01)
  *G08B 7/06* (2006.01)
  *G08B 17/10* (2006.01)
  *G08B 25/00* (2006.01)
  *G08B 31/00* (2006.01)
(58) Field of Classification Search
  USPC .................................................. 340/539.22
  See application file for complete search history.

(56) References Cited

U.S. PATENT DOCUMENTS

| | | | | |
|---|---|---|---|---|
| 9,888,371 | B1* | 2/2018 | Jacob | G08B 13/22 |
| 9,955,423 | B2* | 4/2018 | Kates | G08B 1/08 |
| 10,045,187 | B1* | 8/2018 | Soleimani | H04W 4/023 |
| 2005/0275530 | A1* | 12/2005 | Kates | G08B 1/08 |
| | | | | 340/539.22 |
| 2006/0234621 | A1* | 10/2006 | Desrochers | F24F 3/044 |
| | | | | 454/239 |
| 2008/0155045 | A1 | 6/2008 | Koyama | |
| 2009/0045937 | A1* | 2/2009 | Zimmerman | G08B 17/00 |
| | | | | 340/506 |
| 2009/0113990 | A1* | 5/2009 | Groves | G01N 1/26 |
| | | | | 73/31.01 |
| 2009/0322527 | A1* | 12/2009 | Crisp | G08B 25/08 |
| | | | | 340/541 |
| 2012/0025971 | A1* | 2/2012 | K. | G08B 17/10 |
| | | | | 340/525 |
| 2013/0312984 | A1* | 11/2013 | Piegari | A62C 2/00 |
| | | | | 169/45 |
| 2013/0325158 | A1* | 12/2013 | Kobayashi | G05B 19/41875 |
| | | | | 700/108 |
| 2014/0313032 | A1* | 10/2014 | Sager | G06F 3/04842 |
| | | | | 340/539.17 |
| 2015/0213697 | A1* | 7/2015 | Knox | G08B 17/10 |
| | | | | 382/103 |
| 2015/0330817 | A1* | 11/2015 | Law | G01N 33/0073 |
| | | | | 702/3 |
| 2015/0339407 | A1* | 11/2015 | Gallo | G06F 16/951 |
| | | | | 707/736 |
| 2016/0007179 | A1* | 1/2016 | Kim | G08B 7/066 |
| | | | | 455/404.1 |
| 2016/0019777 | A1* | 1/2016 | Peterson | G08B 29/188 |
| | | | | 340/506 |
| 2016/0042638 | A1* | 2/2016 | Sangha | G08B 29/043 |
| | | | | 340/628 |
| 2016/0133108 | A1* | 5/2016 | Bucsa | G08B 17/11 |
| | | | | 340/629 |
| 2016/0171857 | A1* | 6/2016 | Zumsteg | G08B 17/10 |
| | | | | 340/628 |
| 2016/0189509 | A1* | 6/2016 | Malhotra | G08B 21/18 |
| | | | | 340/541 |
| 2016/0189513 | A1* | 6/2016 | Sloo | G08B 21/02 |
| | | | | 340/522 |
| 2016/0219348 | A1* | 7/2016 | Formo | G08B 25/002 |
| 2016/0282872 | A1* | 9/2016 | Ahmed | B64C 39/024 |
| 2016/0343242 | A1* | 11/2016 | Warren | G08B 29/126 |
| 2017/0013810 | A1* | 1/2017 | Grabell | A01G 31/06 |
| 2017/0109985 | A1* | 4/2017 | Jenkins | G08B 21/0244 |
| 2018/0011480 | A1* | 1/2018 | Hiruta | G05B 23/0208 |
| 2018/0073982 | A1* | 3/2018 | Ebata | G08B 29/188 |
| 2018/0137743 | A1* | 5/2018 | Tanaka | G08B 5/22 |
| 2018/0197393 | A1* | 7/2018 | Gallo | G06F 3/04847 |
| 2018/0276980 | A1* | 9/2018 | Yukizane | G08B 17/00 |

FOREIGN PATENT DOCUMENTS

| | | |
|---|---|---|
| JP | H11-338848 A | 12/1999 |
| JP | 2000-090366 A | 3/2000 |
| JP | 2000-113357 A | 4/2000 |
| JP | 2003-187362 A | 7/2003 |
| JP | 2004-062537 A | 2/2004 |
| JP | 2008-027388 A | 2/2008 |
| JP | 2008-147489 | 6/2008 |
| JP | 2010-170557 A | 8/2010 |
| JP | 2012-088855 | 5/2012 |
| JP | 2012-113354 A | 6/2012 |
| JP | 2013-37707 A | 2/2013 |
| JP | 2013-207693 A | 10/2013 |
| WO | WO 2016/117021 A1 | 7/2016 |

* cited by examiner

FIG. 26
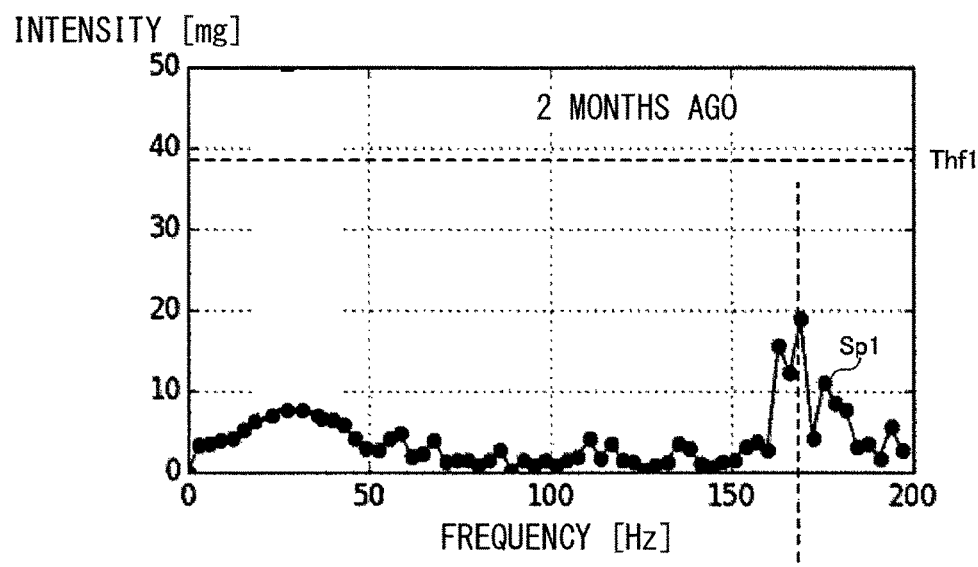
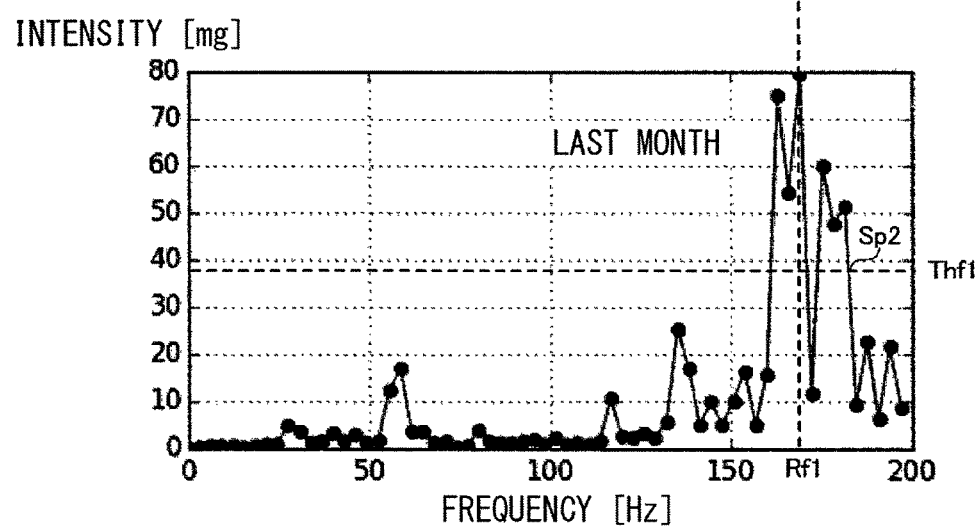

FIG. 27
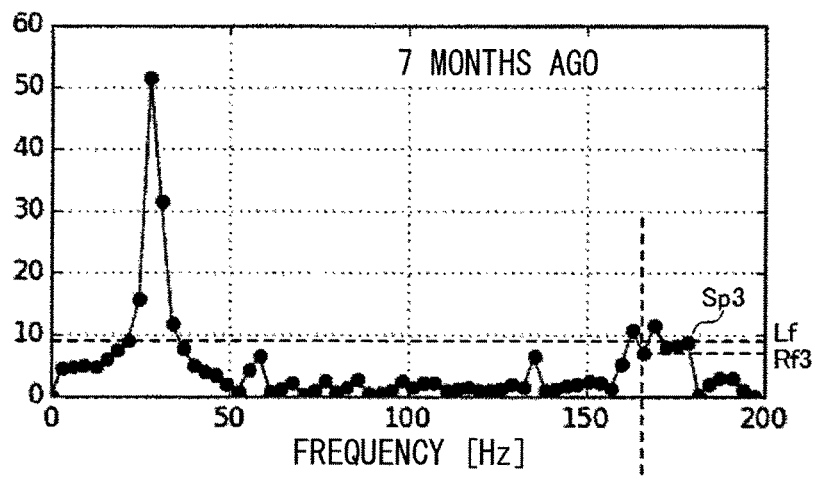
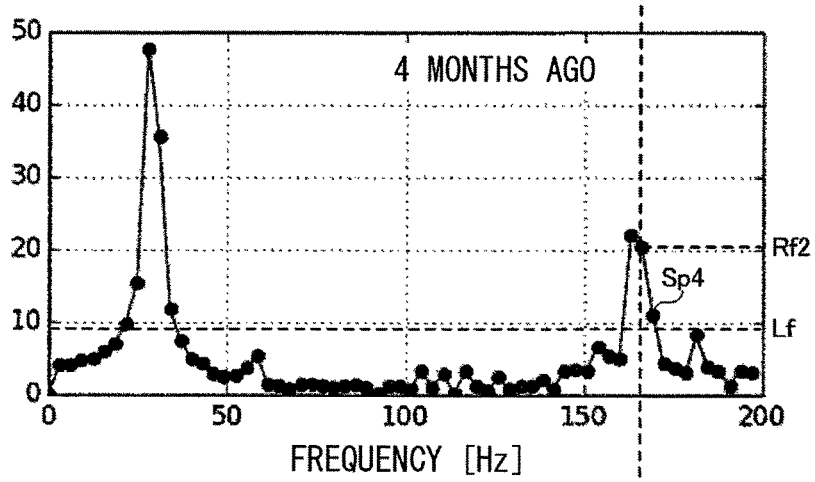
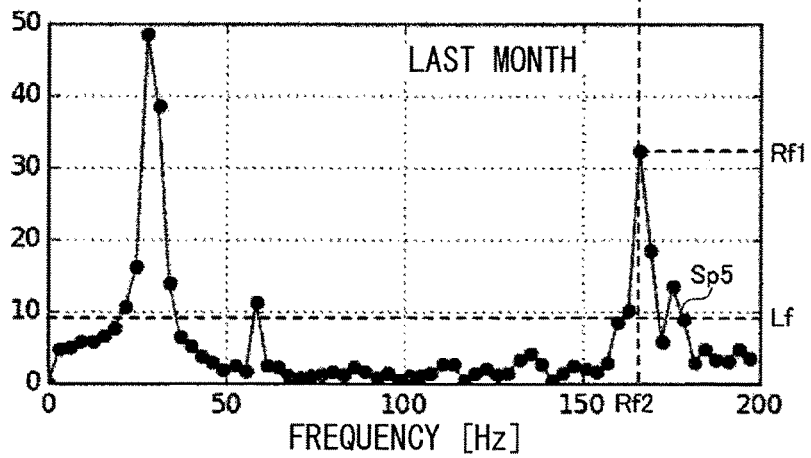

MANAGEMENT SYSTEM, MANAGEMENT DEVICE, MANAGEMENT METHOD, AND MANAGEMENT PROGRAM

TECHNICAL FIELD

The present invention relates to a management system, a management device, a management method, and a management program.

This application claims priority on Japanese Patent Application No. 2016-198478 filed on Oct. 6, 2016, the entire contents of which are incorporated herein by reference.

BACKGROUND ART

Japanese Laid-Open Patent Publication No. 2013-37707 (Patent Literature 1) discloses a technology as follows. That is, a fire alarm system includes a plurality of fire alarms, and these fire alarms transmit radio signals via radio waves as the medium. Each fire alarm includes: a fire detection means for detecting fire; an alarm means for broadcasting a fire warning; a transmission means for transmitting a radio signal; a reception means for receiving a radio signal; a control means; and a power supply battery. The control means causes the alarm means to broadcast a fire warning, and causes the transmission means to transmit a radio signal including a fire warning message that causes the other fire alarms to broadcast the fire warning, when the fire detection means detects fire. The control means causes the alarm means to broadcast a fire warning, upon receiving, through the reception means, a radio signal transmitted from another fire alarm and thus receiving a fire warning message. The control means intermittently activates the alarm means, and causes the alarm means to broadcast a fire warning, upon receiving, through the reception means, a radio signal transmitted from another fire alarm and thus receiving a fire warning message.

CITATION LIST

Patent Literature

PATENT LITERATURE 1: Japanese Laid-Open Patent Publication No. 2013-37707
PATENT LITERATURE 2: Japanese Laid-Open Patent Publication No. 2010-170557

SUMMARY OF INVENTION (1) A management system according to the present disclosure includes a plurality of sensors installed in a predetermined area, and a management device. The management device includes: an acquisition unit configured to acquire sensor information wirelessly transmitted from the plurality of sensors; an accumulation unit configured to accumulate the sensor information acquired by the acquisition unit; a determination unit configured to perform abnormality determination regarding the predetermined area by use of the sensor information; a notification unit configured to notify a content based on a result of the determination by the determination unit; and a display control unit capable of performing a control of temporally displaying a content regarding the predetermined area, on the basis of the sensor information acquired by the acquisition unit.

(19) A management device according to the present disclosure includes: an acquisition unit configured to acquire sensor information wirelessly transmitted from a plurality of sensors installed in a predetermined area; a determination unit configured to perform abnormality determination regarding the predetermined area by use of the sensor information; a notification unit configured to notify a content based on a result of the determination by the determination unit; and a display control unit capable of performing a control of temporally displaying a content regarding the predetermined area, on the basis of the sensor information acquired by the acquisition unit.

(20) A management method according to the present disclosure is used in a management system that includes a plurality of sensors installed in a predetermined area, and a management device. The method includes: acquiring, by the management device, sensor information wirelessly transmitted from the plurality of sensors; accumulating, by the management device, the acquired sensor information; performing, by the management device, abnormality determination regarding the predetermined area by use of the sensor information; notifying, by the management device, a content based on a result of the determination; and performing, by the management device, a control of temporally displaying a content regarding the predetermined area, on the basis of the acquired sensor information.

(21) A management program according to the present disclosure is used in a management device, and the program causes a computer to function as: an acquisition unit configured to acquire sensor information wirelessly transmitted from the plurality of sensors; a determination unit configured to perform abnormality determination regarding the predetermined area by use of the sensor information; a notification unit configured to notify a content based on a result of the determination by the determination unit; and a display control unit capable of performing a control of temporally displaying a content regarding the predetermined area, on the basis of the sensor information acquired by the acquisition unit.

An aspect of the present disclosure can be implemented as a semiconductor integrated circuit that realizes a part or the entirety of a management system including such characteristic processing units, and can be implemented as a program for causing a computer to execute such characteristic process steps.

Another aspect of the present disclosure can be implemented as a semiconductor integrated circuit that realizes a part or the entirety of a management device including such characteristic processing units, and can be implemented as a method including such characteristic process steps.

BRIEF DESCRIPTION OF DRAWINGS

FIG. 26 shows an example of a measurement result of an acceleration sensor in the management system according to the fifth embodiment of the present disclosure.

FIG. 27 shows an example of a measurement result of an acceleration sensor in the management system according to the fifth embodiment of the present disclosure.

DESCRIPTION OF EMBODIMENTS

Figure 1:
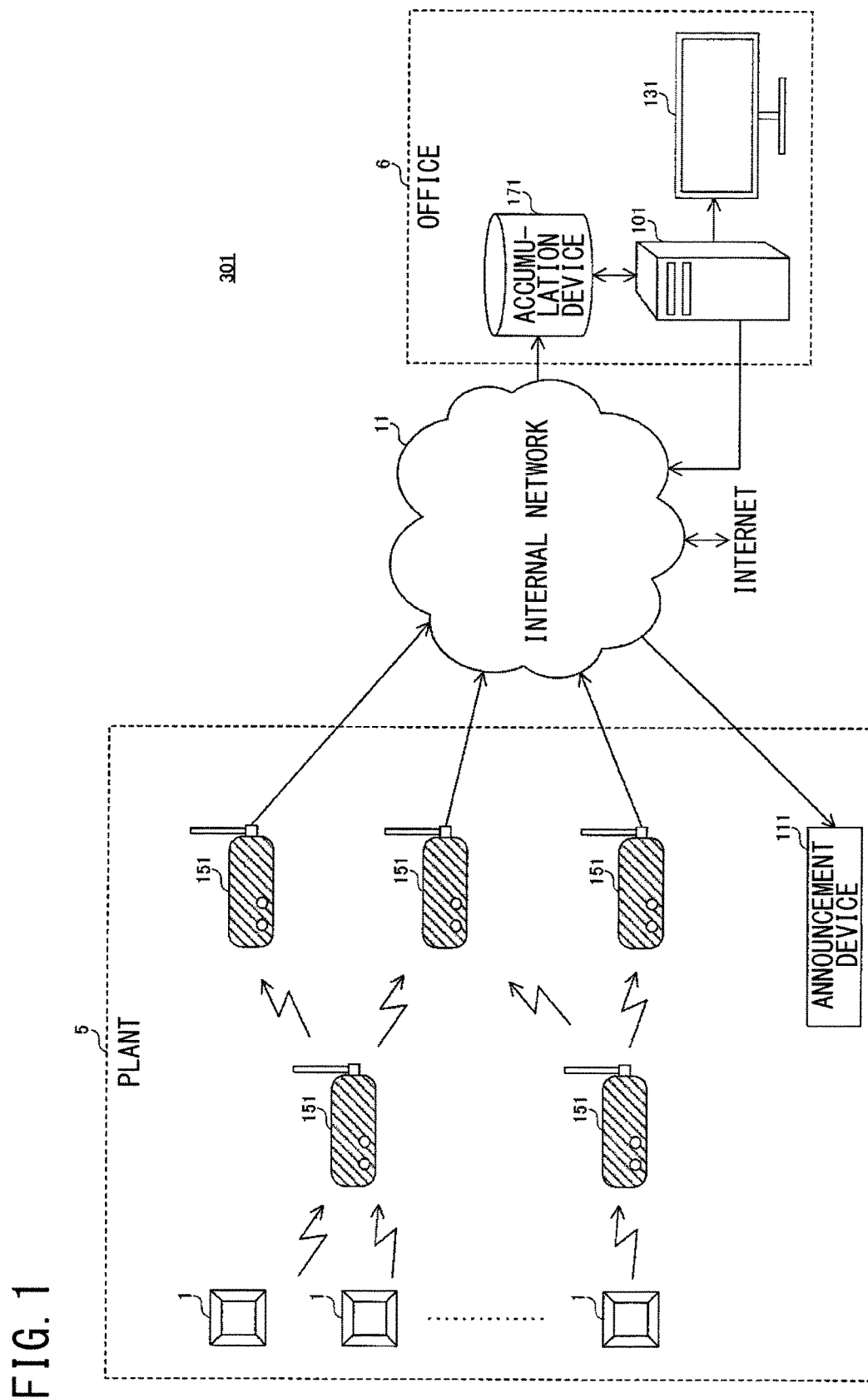
FIG. 1 shows a configuration of management system according to a first embodiment of the present disclosure.

Various technologies for monitoring a predetermined area have been developed.

Problem to be Solved By the Present Disclosure

Beyond the technology disclosed in Patent Literature 1, a technology for satisfactorily monitoring the state of a predetermined area in a plant or the like, and transmitting a monitoring result to an administrator more accurately, has been demanded.

The present disclosure is made to solve the above problem, and it is an object of the present disclosure to provide a management system, a management device, a management method, and a management program which are capable of accurately transmitting a monitoring result regarding a predetermined area.

Effect of Present Disclosure

According to the present disclosure, a monitoring result regarding a predetermined area can be accurately transmitted.

DESCRIPTION OF EMBODIMENTS OF THE PRESENT DISCLOSURE

First, contents of embodiments of the present disclosure will be listed for description.

(1) A management system according to an embodiment of the present disclosure includes a plurality of sensors installed in a predetermined area, and a management device. The management device includes: an acquisition unit configured to acquire sensor information wirelessly transmitted from the plurality of sensors; an accumulation unit configured to accumulate the sensor information acquired by the acquisition unit; a determination unit configured to perform abnormality determination regarding the predetermined area by use of the sensor information; a notification unit configured to notify a content based on a result of the determination by the determination unit; and a display control unit capable of performing a control of temporally displaying a content regarding the predetermined area, on the basis of the sensor information acquired by the acquisition unit.

As described above, since the abnormality determination regarding the predetermined area is performed by using the sensor information, it is possible to recognize at least one of a spatial change and a temporal change of the state of the predetermined area, on the basis of at least one of a spatial change and a temporal change of the content of the sensor information, for example. Thus, it is possible to grasp the state of the predetermined area more accurately. In addition, since the accumulation unit is provided, for example, at least one of the spatial process and the temporal process can be easily performed. Further, the content based on the determination result is notified, and the content regarding the predetermined area, based on the sensor information, is temporally displayed, whereby the state of the predetermined area can be transmitted to an administrator more accurately. Accordingly, the monitoring result regarding the predetermined area can be more accurately transmitted.

(2) Preferably, the determination unit performs the abnormality determination by comparing the sensor information acquired by the acquisition unit, with determination information that is registered in advance.

According to this configuration, more correct determination can be performed by, for example, registering the tendency, according to the determination target, of the temporal change of the sensor information. Specifically, as for facilities in a plant, for example, the old/new state, the operation state, the load state, etc., vary from facility to facility, and therefore, it is difficult to unconditionally determine a common criterion for abnormality. Therefore, it is preferable to set criteria for normality and abnormality for each facility, for example. Thus, for example, the aforementioned configuration, in which the tendency of a normal temporal change or the tendency of an abnormal temporal change for each facility is registered, and abnormality is determined through comparison with the registered tendency, is particularly effective in a plant. Furthermore, for example, when a plurality of tendencies of normal temporal changes and a plurality of tendencies of abnormal temporal changes are registered, it is possible to enhance the possibility of finding the tendency of a temporal change similar to the tendency of the temporal change of the target period, from among the registered tendencies of temporal changes. Thus, it is possible to avoid a situation that the management device has difficulty in recognizing which of the tendency of the normal temporal change and the tendency of the abnormal temporal change, the tendency of the temporal change in the target period is similar to.

(3) Preferably, the determination unit performs the abnormality determination by comparing tendency information indicating a temporal change estimated from the sensor information acquired by the acquisition unit, with determination information that is registered in advance.

As described above, the tendency information includes, for example, information indicating a temporal change representing the characteristics of values indicated by the sensor information, whereby the state of the predetermined area can be correctly grasped. Therefore, the state of the predetermined area can be satisfactorily monitored.

(4) More preferably, the tendency information includes information based on a result of a statistical process performed on the sensor information.

As described above, the tendency information includes the information, based on the result of the statistical process, which represents the characteristics of values indicated by the sensor information, whereby the state of the predetermined area can be grasped more correctly.

(5) More preferably, the result of the statistical process is at least one of an average, a variance, and a standard deviation.

As described above, the tendency information includes the information that appropriately indicates variation of values indicated by the sensor information, whereby the state of the predetermined area can be easily grasped from the variation.

(6) Preferably, the determination unit performs the abnormality determination by comparing future sensor information estimated from the sensor information acquired by the acquisition unit, with determination information that is registered in advance.

According to this configuration, for example, future abnormality in the predetermined area can be determined, whereby necessary measures to deal with the future abnormality can be taken during the normal state.

(7) More preferably, the management device calculates a timing at which a result of the determination indicates abnormality.

According to this configuration, it is possible to provide a more accurate preparation period for dealing with future abnormality, i.e., a period from the timing at which the determination is performed to the timing indicated by the calculation result.

(8) More preferably, the determination unit further acquires a result of determination performed by a user as to whether or not a tendency of a temporal change of the sensor information, which is based on the sensor information acquired by the acquisition unit, is normal, thereby correcting the determination information that is registered in advance.

According to this configuration, for example, the tendency of the temporal change indicated by the determination information registered in advance is corrected to meet the thought of the user, thereby avoiding abnormality determination that greatly deviates from the thought of the user.

(9) More preferably, the determination information is a threshold value.

According to the above configuration, since comparison between the sensor information and the determination information can be easily performed, simplification of the determination process regarding the predetermined area can be achieved.

(10) Preferably, the management device compares information based on the sensor information in a target period, with determination information used for the determination, and performs determination of an abnormal area in the predetermined area, on the basis of a result of the comparison.

Since the determined abnormal area is spatially displayed and notified, a user can promptly recognize the abnormal area in the predetermined area, and thus can appropriately deal with abnormality.

(11) More preferably, the management device predicts a temporal transition of the abnormal area on the basis of the sensor information in the target period.

According to this configuration, for example, a spatial spread of a future abnormal area can be accurately transmitted to the administrator, whereby the administrator can provide preventive measures for the future.

(12) Preferably, the management system further includes a plurality of relay devices configured to relay the sensor information through wireless communication, and the sensor information is transmitted to the management device via the plurality of relay devices.

According to this configuration, since wireless communication with sensors spreading over a wide area can be established, the sensor information transmitted from the plurality of sensors can be satisfactorily collected.

(13) Preferably, the sensor information includes at least one measurement result, regarding the predetermined area, among measurement results of smoke, temperature, humidity, current, voltage, concentration, pressure, acceleration, and angular acceleration.

According to this configuration, a physical quantity according to the characteristics of the monitoring target can be measured and acquired, whereby the state of the predetermined area can be grasped more correctly.

(14) Preferably, the sensor information includes a measurement result of smoke, and the management device performs control of displaying at least one of flow, distribution, and residence time of smoke in the predetermined area.

According to this configuration, a person who has seen the display can recognize, for example, the position where fire breaks out, and the degree of spread of smoke, whereby the person can more accurately recognize the fire situation in the predetermined area.

(15) More preferably, the management device determines a fire area in the predetermined area on the basis of the measurement result of smoke, and the management device performs control of displaying an evacuation route from the fire area to an outside of the predetermined area.

According to this configuration, the fire area can be determined more accurately, whereby a more accurate evacuation route can be displayed. Thus, it is possible to further reduce the risk that a person is stuck in the predetermined area as he/she escapes therefrom.

(16) More preferably, the management device determines a fire area in the predetermined area on the basis of the measurement result of smoke, and the management device performs control of displaying an arrival route from an outside of the predetermined area to the fire area.

According to this configuration, the fire area can be determined more accurately, whereby a more accurate arrival route can be displayed. Thus, it is possible to further reduce the risk that a person is stuck in the predetermined area as he/she rushes to the fire area.

(17) More preferably, the management device performs control of displaying a position of a fire extinguishing tool to be used against a fire area in the predetermined area.

According to this configuration, the time required for searching for the fire extinguishing tool can be reduced, whereby prompt measures against fire in the predetermined area can be taken.

(18) Preferably, the predetermined area is included in a plant.

According to this configuration, the predetermined area in the plant can be collectively managed regardless of the operation state of the plant, such as ordinary operation and unattended operation, thereby providing a management system having excellent monitoring efficiency.

(19) A management device according to an embodiment of the present disclosure includes: an acquisition unit configured to acquire sensor information wirelessly transmitted from a plurality of sensors installed in a predetermined area; a determination unit configured to perform abnormality determination regarding the predetermined area by use of the sensor information; a notification unit configured to notify a content based on a result of the determination by the determination unit; and a display control unit capable of performing a control of temporally displaying a content regarding the predetermined area, on the basis of the sensor information acquired by the acquisition unit.

As described above, since the abnormality determination regarding the predetermined area is performed by using the sensor information, it is possible to recognize at least one of a spatial change and a temporal change of the state of the predetermined area, on the basis of at least one of a spatial change and a temporal change of the content of the sensor information, for example. Thus, it is possible to grasp the state of the predetermined area more accurately. In addition, the content based on the determination result is notified, and the content regarding the predetermined area, based on the sensor information, is temporally displayed, whereby the state of the predetermined area can be transmitted to the administrator more accurately. Accordingly, the monitoring result regarding the predetermined area can be transmitted more accurately.

(20) A management method according to an embodiment of the present disclosure is a method used in a management system including a plurality of sensors installed in a predetermined area, and a management device. The method includes: acquiring, by the management device, sensor information wirelessly transmitted from the plurality of sensors; accumulating, by the management device, the acquired sensor information; performing, by the management device, abnormality determination regarding the predetermined area by use of the sensor information; notifying, by the management device, a content based on a result of the determination; and performing, by the management device, a control of temporally displaying a content regarding the predetermined area, on the basis of the acquired sensor information.

As described above, since the abnormality determination regarding the predetermined area is performed by using the sensor information, it is possible to recognize at least one of a spatial change and a temporal change of the state of the predetermined area, on the basis of at least one of a spatial change and a temporal change of the content of the sensor information, for example. Thus, it is possible to grasp the state of the predetermined area more accurately. In addition, since the sensor information is accumulated, for example, at least one of the spatial process and the temporal process can be easily performed. Further, the content based on the determination result is notified, and the content regarding the predetermined area, based on the sensor information, is temporally displayed, whereby the state of the predetermined area can be transmitted to an administrator more accurately. Accordingly, the monitoring result regarding the predetermined area can be more accurately transmitted.

(21) A management program according to an embodiment of the present disclosure is a program used in a management device. The program causes a computer to function as: an acquisition unit configured to acquire sensor information wirelessly transmitted from a plurality of sensors; a determination unit configured to perform abnormality determination regarding the predetermined area by use of the sensor information; a notification unit configured to notify a content based on a result of the determination by the determination unit; and a display control unit capable of performing a control of temporally displaying a content regarding the predetermined area, on the basis of the sensor information acquired by the acquisition unit.

As described above, since the abnormality determination regarding the predetermined area is performed by using the sensor information, it is possible to recognize at least one of a spatial change and a temporal change of the state of the predetermined area, on the basis of at least one of a spatial change and a temporal change of the content of the sensor information, for example. Thus, it is possible to grasp the state of the predetermined area more accurately. Further, the content based on the determination result is notified, and the content regarding the predetermined area, based on the sensor information, is temporally displayed, whereby the state of the predetermined area can be transmitted to an administrator more accurately. Accordingly, the monitoring result regarding the predetermined area can be more accurately transmitted.

A management system according to an embodiment of the present disclosure includes: a plurality of sensors installed in a predetermined area; an accumulation unit configured to accumulate sensor information wirelessly transmitted from the plurality of sensors; and a management device configured to acquire the sensor information. The management device performs determination regarding the predetermined area by performing at least one of a spatial process and a temporal process using the acquired sensor information, and the management device is capable of notifying a content based on a result of the determination, and performing, based on the acquired sensor information, at least one of control of spatially displaying a content regarding the predetermined area and control of temporally displaying the content regarding the predetermined area.

As described above, since the determination regarding the predetermined area is performed by using at least one of the spatial process and the temporal process using the sensor information, it is possible to recognize at least one of a spatial change and a temporal change of the state of the predetermined area, on the basis of at least one of a spatial change and a temporal change of the content of the sensor information. Thus, it is possible to grasp the state of the predetermined area more accurately. In addition, since the accumulation device is provided, at least one of the spatial process and the temporal process can be easily performed. Further, the content based on the determination result is notified, and at least one of spatial display and temporal display of the content regarding the predetermined area, based on the sensor information, is performed, whereby the state of the predetermined area can be transmitted to the administrator more accurately. Accordingly, the monitoring result regarding the predetermined area can be transmitted more accurately.

Preferably, the management device compares tendency information indicating a tendency of a temporal change of the sensor information, which is based on the sensor information in a target period, with determination information used for the determination, and performs the determination on the basis of the comparison result.

According to this configuration, for example, by using, as the tendency information, the tendency of a temporal change of the sensor information in a target period and the tendency of a temporal change of the sensor information in a period different from the target period, and using, as the determination information, a threshold value and the tendency of a temporal change of the sensor information, it is possible to flexibly cope with a determination timing, a determination period, and a determination method which are desired by the user.

More preferably, the tendency information includes prediction tendency information indicating the tendency of the temporal change in a future period after the target period, which is predicted based on the sensor information in the target period.

According to this configuration, for example, future abnormality in the predetermined area can be determined, whereby necessary measures to deal with the future abnormality can be taken during the normal state.

More preferably, the management device calculates a timing, after the target period, at which the comparison result satisfies a predetermined condition.

According to this configuration, it is possible to provide, for example, a more accurate preparation period for dealing with future abnormality, i.e., a period from the timing at which the determination is performed to the timing indicated by the calculation result.

More preferably, the determination information includes registered tendency information, indicating the tendency of the temporal change, which has been registered in advance.

According to this configuration, more correct determination can be performed by, for example, registering the tendency information according to the determination target. Specifically, as for facilities in a plant, for example, the old/new state, the operation state, the load state, etc., vary from facility to facility, and therefore, it is difficult to unconditionally determine a common criterion for abnormality. Therefore, it is preferable to set criteria for normality and abnormality for each facility, for example. Thus, for example, the aforementioned configuration, in which the tendency of a normal temporal change or the tendency of an abnormal temporal change for each facility is registered, and abnormality is determined through comparison with the registered tendency, is particularly effective in the plant. Furthermore, for example, when a plurality of tendencies of normal temporal changes and a plurality of tendencies of abnormal temporal changes are registered, it is possible to enhance the possibility of finding the tendency of a temporal change similar to the tendency of the temporal change in the target period, from among the registered tendencies of temporal changes. Thus, it is possible to avoid a situation that the management device has difficulty in recognizing which of the tendency of the normal temporal change and the tendency of the abnormal temporal change, the tendency of the temporal change in the target period is similar to.

More preferably, the registered tendency information includes registered past tendency information indicating the tendency of the temporal change based on the sensor information in a past period prior to the target period.

According to this configuration, for example, by registering the past tendency information indicating the tendency under a situation where determination of normality or abnormality should be made, the determination of normality or abnormality can be performed more correctly when a similar situation occurs again.

More preferably, the tendency information and the registered past tendency information are pieces of information based on the sensor information from the same sensor.

According to this configuration, for example, by registering the past tendency information indicating the tendency under a situation where determination of normality or abnormality should be made, tendency information indicating similar tendency to the tendency of the temporal change indicated by the registered past tendency information can be obtained when a similar situation occurs again, whereby determination of normality or abnormality can be performed more correctly. In addition, for example, it is possible to detect that the tendency of a temporal change of a value indicated by the sensor information in the most-recent target period is different from the tendency of a temporal change of a value indicated by the sensor information in the past period, whereby occurrence of abnormality in the predetermined area can be promptly recognized. In addition, for example, abnormality that has occurred in the predetermined area can be recognized early through a simple process using samples obtained in fewer number of periods. Thus, the abnormality that has occurred in the predetermined area can be promptly transmitted to the administrator. In a plant, for example, a facility that may affect measurement data performs substantially the same operation during the same process, the same time period, or the like. In other words, such a facility performs different operations during different processes, different time periods, or the like. Meanwhile, in an office or the like, a person who may affect measurement data changes his/her whereabouts, moves irregularly, and therefore is unlikely to perform the same action during the same time period. Accordingly, the above configuration, in which abnormality is determined by comparing past data obtained from the same sensor during different time sections, is particularly effective in a plant.

More preferably, the management device further acquires the result of determination by the user as to whether or not the tendency of the temporal change of the sensor information, which is based on the acquired sensor information, is normal, and performs registration of the tendency information on the basis of the acquired determination result.

According to this configuration, the tendency of the temporal change of the sensor information, which is to be registered, and the result of determination by the user can be registered in combination. Therefore, when a similar tendency of a temporal change is acquired again, whether or not the tendency is normal can be determined along the thought of the user.

Preferably, the tendency information includes first tendency information indicating a tendency of a temporal change of the sensor information, which is based on the sensor information of the first sensor in the target period. Meanwhile, the determination information includes second tendency information indicating a tendency of a temporal change of the sensor information, which is based on the sensor information, in the target period, of one or a plurality of sensors different from the first sensor.

According to this configuration, for example, in a case where there is a correlation between the tendency of the temporal change indicated by the tendency information and the tendency of the temporal change indicated by the determination information, it is possible to more correctly determine occurrence of abnormality in the predetermined area on the basis of the comparison result. Specifically, for example, in a plant where smoke is generated while a facility is operated, the plant is determined to be normal when it is detected that the smoke density increases with time while a current flows through the facility. However, the plant is determined to be abnormal when it is detected that the smoke density increases with time while no current flows through the facility. Furthermore, as described above, in the plant, a facility performs substantially the same operation during the same process, the same time period, or the like. Therefore, in a case where a plurality of sensors are installed in the plant, the relationship, in the same time period, among temporal changes of values indicated by sensor information from these sensors, does not vary very much. Meanwhile, in an office or the like, a person is unlikely to perform the same action during the same time period. Therefore, in a case where a plurality of sensors are installed in an office, the relationship, in the same time period, among temporal changes of values indicated by sensor information from these sensors, varies. Accordingly, the above configuration, in which abnormality is determined by comparing the temporal changes in the same time section regarding a plurality of sensors, is particularly effective in the plant.

More preferably, the target period is a period during which a facility installed in the predetermined area is stopped.

Thus, when the aforementioned determination is performed in, for example, the facility stop period during which the facility is highly likely to be unmanned, determination accuracy is enhanced by a reduction in noise, and security in the predetermined area can be improved.

Preferably, the determination information indicates a threshold value, and the management device dynamically sets the threshold value indicated by the determination information.

According to this configuration, for example, even in a case where the temperature, the dust concentration (the amount of dust), or the like in the predetermined area changes with lapse of time, a threshold value according to the changed environment can be set, whereby determination regarding the predetermined area can be appropriately performed based on the comparison result.

More preferably, the management device sets the threshold value for each of a plurality of division determination periods into which a determination period, during which determination is to be performed, is divided.

According to this configuration, a threshold value can be set for each division determination period during which the environment is stable, in accordance with, for example, the operation schedule of the predetermined area such as a plant, the season, etc., whereby determination regarding the predetermined area can be performed more appropriately.

More preferably, the management device sets each of the division determination periods on the basis of the values indicated by the sensor information.

According to this configuration, it is possible to set a plurality of division determination periods suitable for determination using threshold values, for example, division determination periods each in which the environment, the state, or the like of the facility is substantially constant.

Preferably, the management device has a mode for performing the determination by individually using pieces of sensor information, and a mode for performing the determination by comparing the pieces of sensor information of the plurality of sensors.

According to this configuration, for example, it is possible to selectively use, according to a measurement target, a determination method, based on an absolute value, for determining abnormality in the predetermined area from one type of measurement result, and a determination method, based on a relative value, for determining abnormality in the predetermined area from a plurality of types of measurement results. Thus, the monitoring function with respect to the predetermined area can be improved.

More preferably, the tendency information includes information based on the size of a range of a temporal change of the sensor information.

As described above, the tendency information includes the information, based on the size of the range of the temporal change of the sensor information, which represents the characteristics of values indicated by the sensor information. Therefore, the state of the predetermined area can be correctly grasped, whereby the state of the predetermined area can be satisfactorily monitored.

More preferably, the tendency information includes information based on the magnitude of a frequency component in a temporal change of the sensor information.

As described above, the tendency information includes the information, based on the magnitude of the frequency component in the temporal change of the sensor information, which represents the characteristics of values indicated by the sensor information. Therefore, the state of the predetermined area can be correctly grasped, whereby the state of the predetermined area can be satisfactorily monitored.

Preferably, the management device determines a plurality of abnormal areas including a first abnormal area in the predetermined area, and a second abnormal area which is at least partially different from the first abnormal area. The management device compares the values indicated by the sensor information with a first range, and determines the first abnormal area in accordance with the comparison result. The management device compares the values indicated by the sensor information with a second range which is at least partially different from the first range, and determines the second abnormal area in accordance with the comparison result.

As described above, since the abnormal area is determined stepwise in accordance with the degree of abnormality, a spatial spread of the degree of abnormality in the predetermined area can be transmitted to the administrator more accurately. For example, there is a case where many facilities are installed depending on the scale of a plant. In this case, when each of the facilities is equipped with a sensor, spatial abnormality can be determined based on the measurement results from the respective sensors. For example, when fire breaks out in the plant, it is desired to minimize damage by promptly specifying a facility that causes the fire, extinguishing the fire, and preventing the fire from spreading to other facilities. Therefore, for example, if a maintenance person can be separately notified of an area where the fire actually breaks out and an area to which the fire may spread, on the basis of the measurement results from the sensors, it is possible to promptly specify the facility that causes the fire, and extinguish the fire. Therefore, the aforementioned configuration is particularly effective in a plant.

A management device according to an embodiment of the present disclosure includes: an acquisition unit configured to acquire sensor information wirelessly transmitted from a plurality of sensors installed in a predetermined area; a determination unit configured to perform determination regarding the predetermined area by performing at least one of a spatial process and a temporal process using the sensor information acquired by the acquisition unit; a notification unit configured to notify a content based on a result of the determination by the determination unit; and a display control unit configured to perform, based on the sensor information acquired by the acquisition unit, at least one of control of spatially displaying a content regarding the predetermined area and control of temporally displaying the content regarding the predetermined area.

As described above, since the determination regarding the predetermined area is performed by using at least one of the spatial process and the temporal process using the sensor information, it is possible to recognize at least one of a spatial change and a temporal change of the state of the predetermined area, on the basis of at least one of a spatial change and a temporal change of the content of the sensor information. Thus, it is possible to grasp the state of the predetermined area more accurately. Further, the content based on the determination result is notified, and at least one of spatial display and temporal display of the content regarding the predetermined area, based on the sensor information, is performed, whereby the state of the predetermined area can be transmitted to the administrator more accurately. Accordingly, the monitoring result regarding the predetermined area can be transmitted more accurately.

A management method according to an embodiment of the present disclosure is a management method used in a management system including: a plurality of sensors installed in a predetermined area; an accumulation unit configured to accumulate sensor information wirelessly transmitted from the plurality of sensors; and a management device. The method includes: acquiring, by the management device, the sensor information; performing, by the management device, determination regarding the predetermined area by performing at least one of a spatial process and a temporal process using the acquired sensor information; notifying, by the management device, a content based on a result of the determination; and performing, by the management device, at least one of control of spatially displaying a content regarding the predetermined area and control of temporally displaying the content regarding the predetermined area, on the basis of the acquired sensor information.

As described above, since the determination regarding the predetermined area is performed by using at least one of the spatial process and the temporal process using the sensor information, it is possible to recognize at least one of a spatial change and a temporal change of the state of the predetermined area, on the basis of at least one of a spatial change and a temporal change of the content of the sensor information. Thus, it is possible to grasp the state of the predetermined area more accurately. In addition, since the accumulation device is provided, at least one of the spatial process and the temporal process can be easily performed. Further, the content based on the determination result is notified, and at least one of spatial display and temporal display of the content regarding the predetermined area, based on the sensor information, is performed, whereby the state of the predetermined area can be transmitted to the administrator more accurately. Accordingly, the monitoring result regarding the predetermined area can be transmitted more accurately.

A management program according to an embodiment of the present disclosure is a management program used in a management device. The management program causes a computer to function as: an acquisition unit configured to acquire sensor information wirelessly transmitted from a plurality of sensors installed in a predetermined area; a determination unit configured to perform determination regarding the predetermined area by performing at least one of a spatial process and a temporal process using the sensor information acquired by the acquisition unit; a notification unit configured to notify a content based on a result of the determination by the determination unit; and a display control unit configured to perform, based on the sensor information acquired by the acquisition unit, at least one of control of spatially displaying a content regarding the predetermined area and control of temporally displaying the content regarding the predetermined area.

As described above, since the determination regarding the predetermined area is performed by using at least one of the spatial process and the temporal process using the sensor information, it is possible to recognize at least one of a spatial change and a temporal change of the state of the predetermined area, on the basis of at least one of a spatial change and a temporal change of the content of the sensor information. Thus, it is possible to grasp the state of the predetermined area more accurately. Further, the content based on the determination result is notified, and at least one of spatial display and temporal display of the content regarding the predetermined area, based on the sensor information, is performed, whereby the state of the predetermined area can be transmitted to the administrator more accurately. Accordingly, the monitoring result regarding the predetermined area can be transmitted more accurately.

A management system according to an embodiment of the present disclosure includes: a plurality of sensors installed in a predetermined area; an accumulation unit configured to accumulate sensor information wirelessly transmitted from the plurality of sensors; and a management device configured to acquire the sensor information. The management device performs, with respect to a plurality of target periods, predetermined arithmetic processing on values indicated by a plurality of pieces of sensor information from the same sensor in each target period, to calculate a representative value in the target period, and the management device predicts, based on the representative values in the respective target periods, a representative value in a period later than the target periods.

As described above, since the future representative value is predicted, and the aforementioned determination is performed based on the prediction result, the future state of the predetermined area can be correctly grasped, whereby the future state of the predetermined area can be satisfactorily monitored.

Preferably, the management device calculates a statistic of values indicated by the plurality of pieces of sensor information from the same sensor in each target period, as a representative value in the target period. Based on the representative values in the respective target periods, the management device predicts a representative value in the later period.

As described above, the statistic representing the characteristics of the values indicated by the sensor information in each target period is calculated as a representative value, and a representative value in a later period is predicted based on the representative values in the respective target periods. Thus, the future state of the predetermined area can be grasped more correctly, whereby the future state of the predetermined area can be monitored more satisfactorily.

Preferably, the management device calculates, as a representative value in each target period, the size of a range of values indicated by the plurality of pieces of sensor information from the same sensor in the target period, and predicts a representative value in the later period on the basis of the representative values in the respective target periods.

As described above, the size of the range of the values indicated by the sensor information, which represents the characteristics of the values in each target period, is calculated as a representative value, and a representative value in a later period is predicted based on the representative values in the respective target periods. Therefore, the future state of the predetermined area can be grasped more correctly, whereby the future state of the predetermined area can be monitored more satisfactorily.

Preferably, the management device calculates a frequency distribution of values indicated by the plurality of pieces of sensor information arranged in time sequence from the same sensor in each target period, and calculates, as a representative value in the target period, the magnitude of a predetermined frequency component in the calculated frequency distribution. Based on the representative values in the respective target periods, the management device predicts a representative value in the later period.

As described above, the magnitude of the predetermined frequency component in the frequency distribution, which represents the characteristics of the values indicated by the sensor information in each target period, is calculated as a representative value, and a representative value in a later period is predicted based on the representative values in the respective target periods. Therefore, the future state of the predetermined area can be grasped more correctly, whereby the future state of the predetermined area can be monitored more satisfactorily.

A management system according to an embodiment of the present disclosure includes: a plurality of sensors installed in a predetermined area; an accumulation unit configured to accumulate sensor information wirelessly transmitted from the plurality of sensors; and a management device configured to acquire the sensor information. The management device determines an abnormal area in the predetermined area on the basis of the acquired sensor information.

As described above, since the spatial spread of the abnormal area is predicted, for example, the administrator can provide measures against the abnormal area. Therefore, the state of the predetermined area can be satisfactorily monitored.

A management system according to an embodiment of the present disclosure includes: a plurality of sensors installed in a predetermined area; an accumulation unit configured to accumulate sensor information wirelessly transmitted from the plurality of sensors; and a management device configured to acquire the sensor information. The management device predicts a temporal transition of an abnormal area in the predetermined area, on the basis of the acquired sensor information.

As described above, since a spatial spread of a future abnormal area is predicted, for example, the administrator can provide preventive measures for the future. Therefore, the state of the predetermined area can be satisfactorily monitored.

Preferably, the management device determines a plurality of abnormal areas including a first abnormal area in the predetermined area, and a second abnormal area which is at least partially different from the first abnormal area. The management device compares the values indicated by the sensor with a first range, and determines the first abnormal area in accordance with the comparison result. The management device compares the values indicated by the sensor with a second range which is at least partially different from the first range, and determines the second abnormal area in accordance with the comparison result.

As described above, since the abnormal area is determined stepwise in accordance with the degree of abnormality, a spatial spread of the degree of abnormality in the predetermined area can be transmitted to the administrator more accurately. For example, there is a case where many facilities are installed depending on the scale of a plant. In this case, when each of the facilities is equipped with a sensor, spatial abnormality can be determined based on the measurement results from the respective sensors. For example, when fire breaks out in the plant, it is desired to minimize damage by promptly specifying a facility that causes the fire, extinguishing the fire, and preventing the fire from spreading to other facilities. Therefore, for example, if a maintenance person can be separately notified of an area where the fire actually breaks out and an area to which the fire may spread, on the basis of the measurement results from the sensors, it is possible to promptly specify the facility that causes the fire, and extinguish the fire. Therefore, the aforementioned configuration is particularly effective in a plant.

Preferably, the management device determines a first abnormal area in the predetermined area.

According to this configuration, a spatial spread of the first abnormal area in the predetermined area can be transmitted to the administrator more accurately.

More preferably, the management device determines the second abnormal area obtained by extending or shifting the determined first abnormal area.

According to this configuration, a spatial spread of the second abnormal area which is highly likely to be abnormal can be transmitted to the administrator more accurately, whereby the administrator can provide preventive measures to deal with spread or shift of the first abnormal area.

A management method according to an embodiment of the present disclosure is a management method used in a management system including: a plurality of sensors installed in a predetermined area; an accumulation unit configured to accumulate sensor information wirelessly transmitted from the plurality of sensors; and a management device. The method includes: acquiring the sensor information by the management device; performing, with respect to a plurality of target periods, by the management device, predetermined arithmetic processing on values indicated by a plurality of pieces of sensor information from the same sensor in each target period to calculate a representative value in the target period; and predicting, based on the representative values in the respective target periods, by the management device, a representative value in a period after the target periods.

As described above, since the future representative value is predicted, and the aforementioned determination is performed based on the prediction result, the future state of the predetermined area can be correctly grasped, whereby the future state of the predetermined area can be satisfactorily monitored.

A management method according to an embodiment of the present disclosure is a management method used in a management system including: a plurality of sensors installed in a predetermined area; an accumulation unit configured to accumulate sensor information wirelessly transmitted from the plurality of sensors; and a management device. The method includes: acquiring the sensor information by the management device; and determining, by the management device, an abnormal area in the predetermined area on the basis of the acquired sensor information.

As described above, since the spatial spread of the abnormal area is predicted, for example, the administrator can provide measures against the abnormal area. Therefore, the state of the predetermined area can be satisfactorily monitored.

A management method according to an embodiment of the present disclosure is a management method used in a management system including: a plurality of sensors installed in a predetermined area; an accumulation unit configured to accumulate sensor information wirelessly transmitted from the plurality of sensors; and a management device. The method includes: acquiring the sensor information by the management device; and predicting, by the management device, a temporal transition of an abnormal area in the predetermined area on the basis of the acquired sensor information.

As described above, since the spatial spread of the future abnormal area is predicted, for example, the administrator can provide preventive measures for the future. Therefore, the state of the predetermined area can be satisfactorily monitored.

Hereinafter, embodiments of the present disclosure will be described with reference to the drawings. The same or corresponding parts in the drawings are denoted by the same reference characters, and description thereof is not repeated. At least some parts of the embodiments descried below may be combined together as desired.

First Embodiment

[Configuration and Basic Operation]

FIG. 1 shows a configuration of a management system according to a first embodiment of the present disclosure.

With reference to FIG. 1, a management system 301 includes a plurality of sensor units 1, a management device 101, a plurality of access points (relay devices) 151, and an accumulation device (accumulation unit) 171. Each sensor unit 1 includes one or a plurality of sensors. When the sensor unit 1 includes a plurality of sensors, the management system 301 may include one sensor unit 1.

Figure 2:
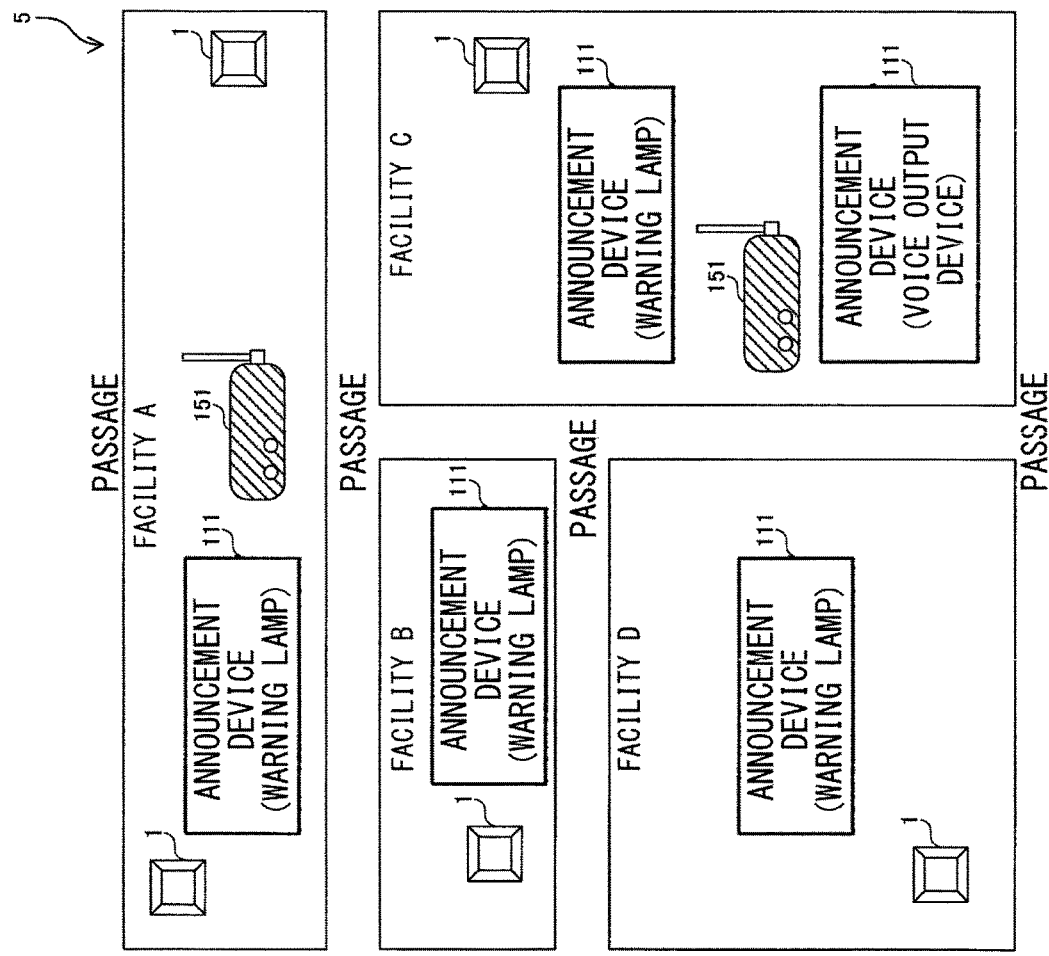
FIG. 2 shows an example of a plant in which sensors of the management system according to the first embodiment of the present disclosure are installed.

FIG. 2 shows an example of a plant in which the sensors of the management system according to the first embodiment of the present disclosure are installed. FIG. 2 shows the state of a plant 5 of a business entity as viewed from above.

With reference to FIG. 1 and FIG. 2, the plurality of sensor units 1 are installed in a predetermined area, specifically, a predetermined building, for example. In this example, the plurality of sensor units 1 are installed in the plant 5. The plant 5 is a place which is equipped with certain machines and tools, and in which articles are continuously produced and processed. The present disclosure is not limited to the configuration in which the plurality of sensor units 1 are installed in the plant 5, and is also applicable to a configuration in which a plurality of sensor units 1 are installed in an airport, a railroad station, a bus terminal, an office, a warehouse, or the like.

In the example of FIG. 2, two access points 151 and five sensor units 1 are installed in the plant 5. The numbers of sensor units 1 provided in facilities A, B, C, and D in the plant 5 are two, one, one, and one, respectively. In the plant 5, four or less sensor units 1 or six or more sensor units 1 may be provided. In the management system 301, pieces of information regarding facilities, environments, etc., in plants are collected.

The sensor units 1 are provided in the facilities in the plant 5. Each sensor unit 1 performs measurement regarding the state, environment, etc., of a measurement target, specifically, the corresponding facility installed in the plant 5.

A warning lamp as an example of an announcement device 111 is installed in each of the facilities in the plant 5. A voice output device as an example of the announcement device 111 is installed in, for example, the facility C in the plant 5.

The management device 101, a display device 131, and the accumulation device 171 are located in, for example, a place different from the place where the plurality of sensors are installed. Specifically, the management device 101, the display device 131, and the accumulation device 171 are installed in, for example, an office 6 located outside the plant 5. At least one of the management device 101, the display device 131, and the accumulation device 171 may be installed in the same place as the plurality of sensors, specifically, inside the plant 5. The management device 101 may include the display device 131.

Each sensor unit 1 includes at least one of a smoke sensor, a temperature sensor, a humidity sensor, a current sensor, an acceleration sensor, and a non-contact temperature sensor. The sensor unit 1 may include a concentration sensor, a gyro sensor, a pressure sensor, a battery voltage sensor, etc., besides the aforementioned sensors.

A smoke sensor measures smoke, specifically, the concentration of dust contained in smoke, for example. A temperature sensor measures an ambient temperature around a facility. A humidity sensor measures a humidity around a facility. A current sensor measures a current that flows through a wire provided near a facility. A non-contact temperature sensor measures a non-contact temperature, based on infrared illumination, of a facility. An acceleration sensor measures vibration of a measurement target, more specifically, an acceleration, speed, position, etc., of the measurement target.

The sensor unit 1 creates sensor information containing a result of measurement performed by the sensor included therein, and the ID of the sensor. Then, the sensor unit 1, for example, broadcasts the created sensor information, thereby wirelessly transmitting the sensor information to the access point 151.

Upon receiving the sensor information from the sensor unit 1, the access point 151 relays the received sensor information to the accumulation device 171 via an internal network 11. Communication between the access point 151 and the accumulation device 171 may be wired communication or wireless communication.

The access point 151 is able to perform multi-hop communication in accordance with the communication standard IEEE802.15.4, for example. Specifically, the access point 151 relays the sensor information received from the sensor unit 1, through wireless communication, for example. The sensor information is transmitted to the management device 101 via a plurality of access points 151, for example.

More specifically, each access point 151 transmits the sensor information received from the sensor unit 1 to the accumulation device 171 via one or a plurality of access points 151 and the internal network 11, or transmits the received sensor information to the accumulation device 171 via the internal network 11.

The accumulation device 171 accumulates the sensor information transmitted from the access point 151. More specifically, upon receiving the sensor information from the access point 151, the accumulation device 171 adds the reception time to the sensor information and then accumulates the sensor information therein. Alternatively, for example, the sensor information is databased and accumulated in the accumulation device 171.

The accumulation device 171 retains, for example, drawing information indicating a drawing of the plant 5, IDs of the respective sensors installed in the plant 5, and position coordinates of the sensors in the drawing. The accumulation device 171 also retains announcement destination information indicating a destination to which abnormality that has occurred in the plant 5 should be notified. The drawing information may include height information indicating the heights of the sensors.

[Management Device]

Figure 3:
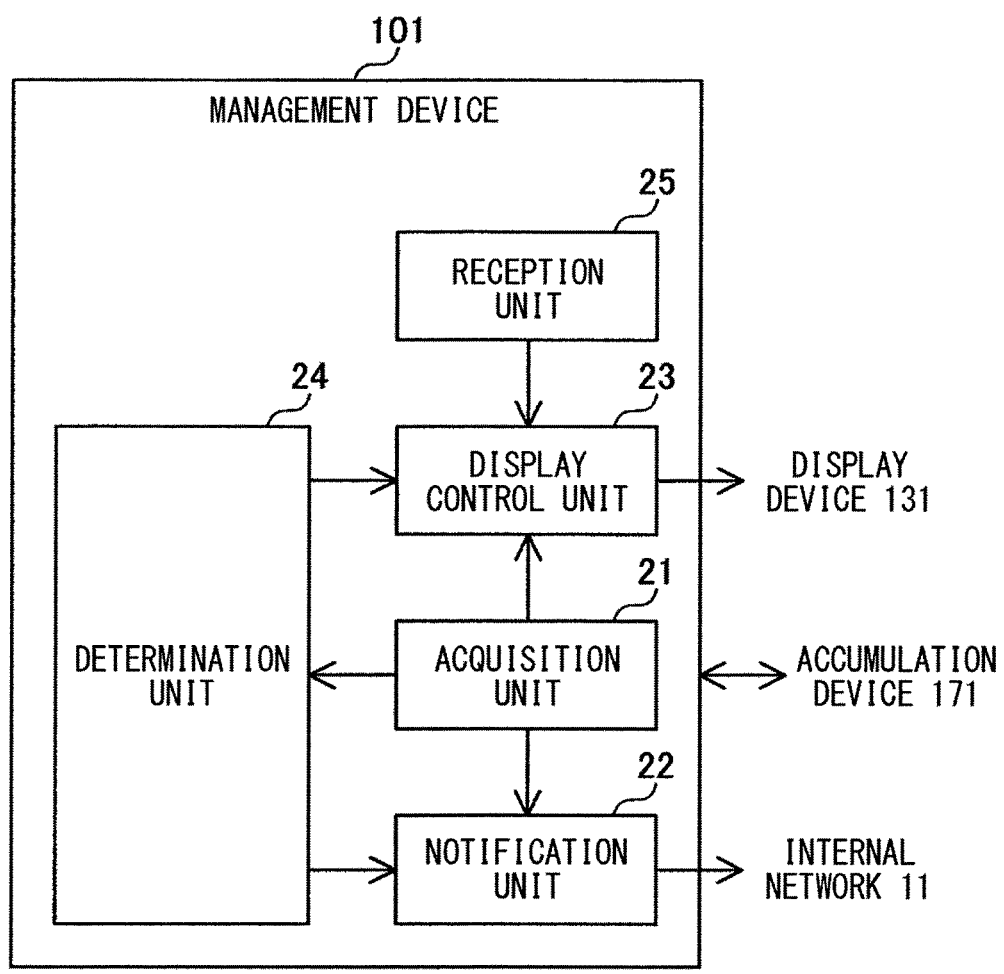
FIG. 3 shows a configuration of the management device in the management system according to the first embodiment of the present disclosure.

FIG. 3 shows a configuration of the management device in the management system according to the first embodiment of the present disclosure.

With reference to FIG. 3, the management device 101 includes an acquisition unit 21, a notification unit 22, a display control unit 23, a determination unit 24, and a reception unit 25.

The reception unit 25 is an input device such as a mouse and a keyboard. The reception unit 25 receives an operation performed by an administrator to a screen displayed on the display device 131, creates operation information indicating the content of the received operation, and outputs the operation information to the display control unit 23.

The acquisition unit 21 acquires sensor information wirelessly transmitted from the plurality of sensors installed in the plant 5. The acquisition unit 21 may acquire sensor information transmitted from the plurality of sensors installed in the plant 5 through wired communication.

More specifically, the acquisition unit 21 acquires the sensor information accumulated in the accumulation device 171, and outputs the acquired sensor information to the determination unit 24.

Meanwhile, the acquisition unit 21 acquires the drawing information retained in the accumulation device 171, and outputs the acquired drawing information to the display control unit 23 and the notification unit 22. Furthermore, the acquisition unit 21 acquires the announcement destination information retained in the accumulation device 171, and outputs the acquired announcement destination information to the notification unit 22.

The determination unit 24 performs a temporal process using the sensor information acquired by the acquisition unit 21 to perform determination regarding a predetermined area, for example, the plant 5. In other words, the determination unit 24 performs abnormality determination regarding the plant 5 by using the sensor information.

Specifically, the determination unit 24 compares, for example, tendency information indicating a tendency of a temporal change of sensor information, which is based on the sensor information in a target period, with determination information to be used for the aforementioned determination, and performs the determination on the basis of the comparison result.

The determination information includes, for example, registered tendency information, indicating a tendency of a temporal change of sensor information, which has been registered in advance. Specifically, the registered tendency information includes, for example, registered past tendency information indicating a tendency of a temporal change of sensor information, which is based on the sensor information obtained in a past period prior to the target period. More specifically, for example, the tendency information and the registered past tendency information are pieces of information based on the sensor information from the same sensor.

In other words, the determination unit 24 performs abnormality determination by, for example, comparing the latest sensor information acquired by the acquisition unit 21 with the determination information registered in advance. Specifically, for example, the determination unit 24 compares the latest sensor information with the determination information, and performs abnormality determination on the basis of the comparison result.

In other words, the determination unit 24 compares a temporal change of a value indicated by the sensor information within a first period, with a temporal change of a value indicated by the sensor information from the same sensor within a second period prior to the first period.

Specifically, the determination unit 24 compares, for example, a temporal change of a value indicated by sensor information within a most-recent period that is a most-recent predetermined period, with a temporal change of a value indicated by sensor information within a past period that is a period prior to the most-recent period. Then, based on the comparison result, the determination unit 24 determines whether or not abnormality has occurred in the plant 5, for example. Specifically, for example, the determination unit 24, based on the comparison result, determines whether or not abnormality has occurred in a monitoring target area in the plant 5, and determines whether or not abnormality has occurred in a monitoring target facility installed in the plant 5.

The most-recent period is, for example, a time period from a timing T2, which is a predetermined time before a timing T1 indicating the present time, to the timing T1. The past period is a time period from a timing T4, which is a predetermined time before a timing T3 prior to the timing T2, to the timing T3.

Figure 4:
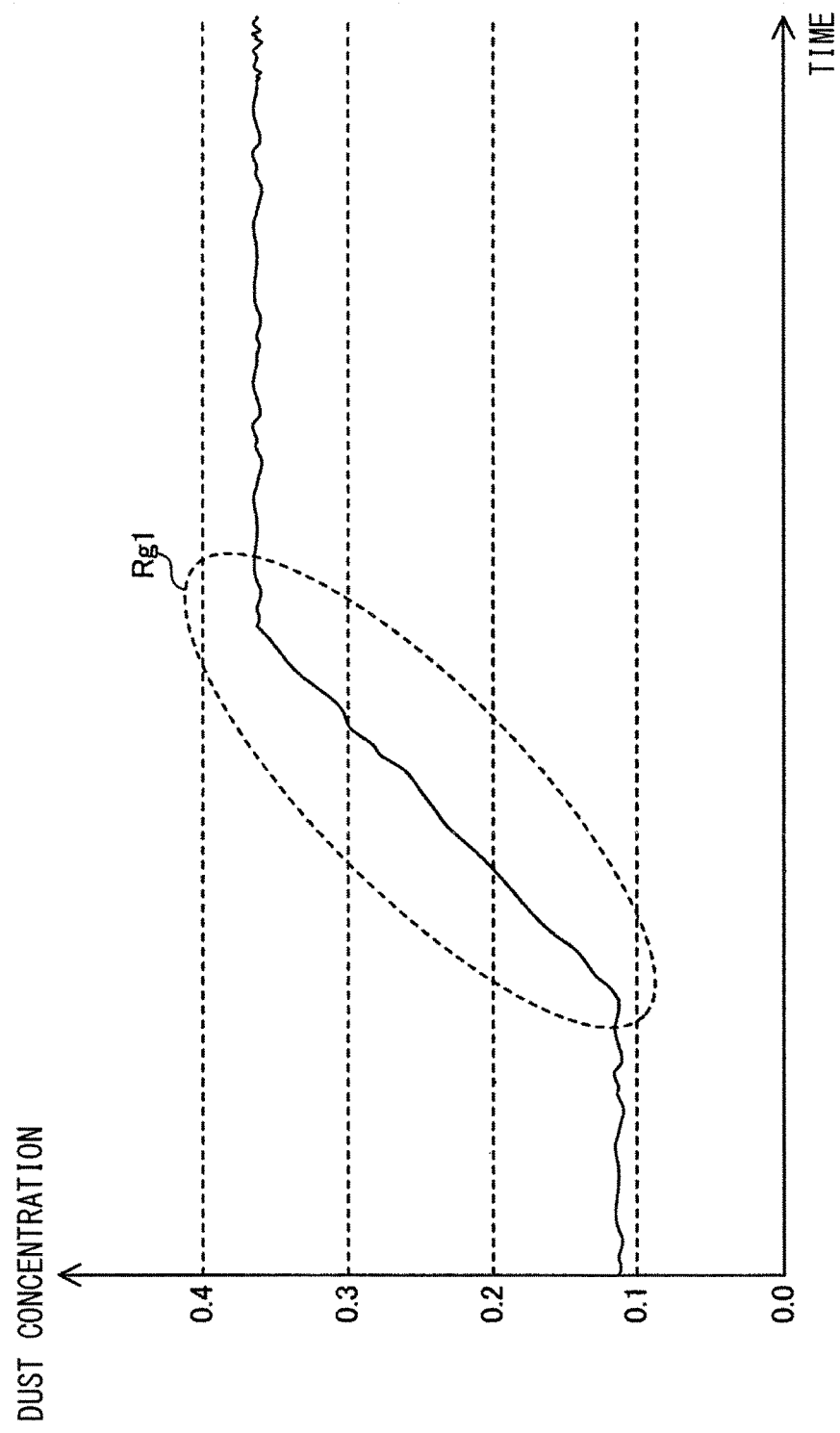
FIG. 4 shows an example of a temporal change of a dust concentration measured by a sensor according to the first embodiment of the present disclosure.
Figure 5:
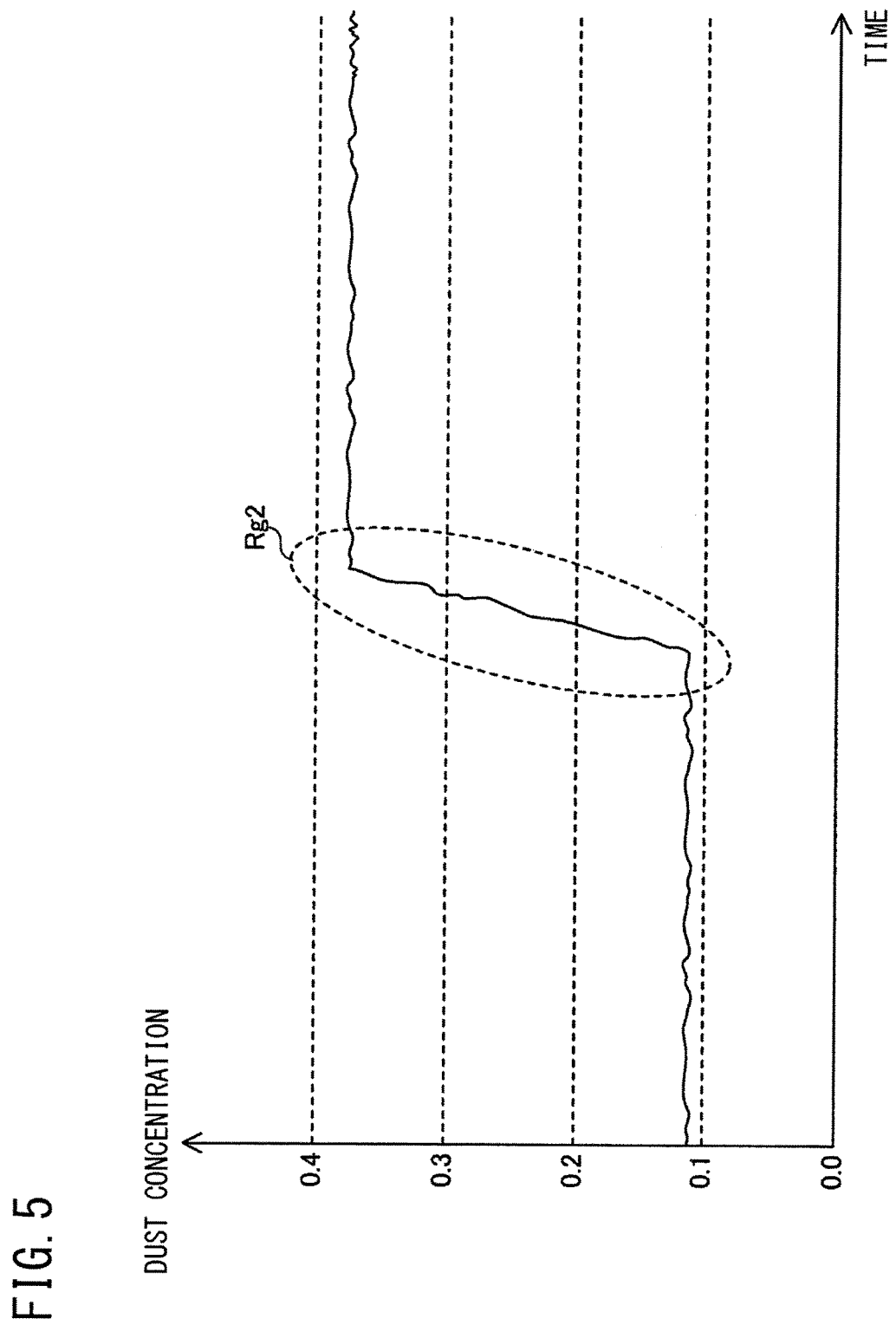
FIG. 5 shows an example of a temporal change of a dust concentration measured by a sensor according to the first embodiment of the present disclosure.

FIG. 4 and FIG. 5 each show an example of a temporal change of the dust concentration measured by a sensor according to the first embodiment of the present disclosure. In each of FIG. 4 and FIG. 5, the vertical axis represents the dust concentration, and the horizontal axis represents time. FIG. 4 and FIG. 5 have the same scale in the horizontal axis.

The determination unit 24 monitors a temporal change of the dust concentration in the most-recent period, for example. The temporal change of the dust concentration shown in each of FIG. 4 and FIG. 5 is an example of the temporal change of the dust concentration within the most-recent period. Information indicating the tendency of the temporal change of the dust concentration shown in each of FIG. 4 and FIG. 5 is an example of the tendency information.

More specifically, each time the accumulation device 171 accumulates new sensor information from a smoke sensor, the determination unit 24 acquires the new sensor information from the accumulation device 171 via the acquisition unit 21.

Based on pieces of sensor information acquired at a plurality of timings in the most-recent period, the determination unit 24 monitors the temporal change of the dust concentration in the most-recent period. The determination unit 24 performs, for each smoke sensor, monitoring of the temporal change of the dust concentration. In addition, each time the determination unit 24 acquires new sensor information from the accumulation device 171 via the acquisition unit 21, the determination unit 24 updates the temporal change of the dust concentration in the monitoring target.

Figure 6:
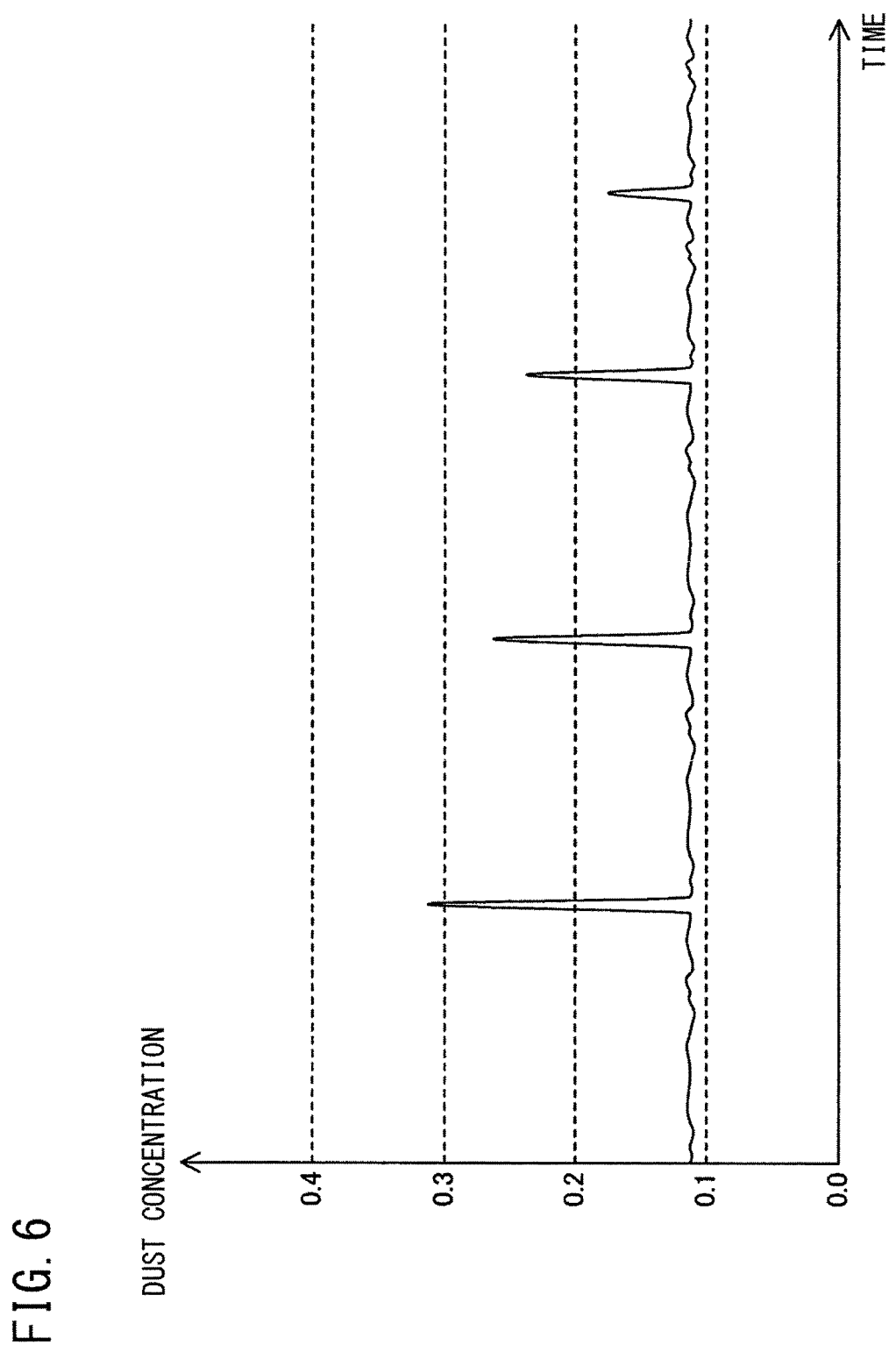
FIG. 6 shows an example of a temporal change of a dust concentration measured by a sensor according to the first embodiment of the present disclosure.

FIG. 6 shows an example of a temporal change of the dust concentration measured by the sensor according to the first embodiment of the present disclosure. In FIG. 6, the vertical axis represents the dust concentration, and the horizontal axis indicates time. The scale of the horizontal axis in FIG. 6 is the same as the scale of the horizontal axis in FIG. 4.

For example, based on pieces of sensor information acquired at a plurality of timings in the past period, the determination unit 24 creates and retains a temporal change of the dust concentration in the past period. More specifically, the determination unit 24 retains the temporal change of the dust concentration shown in FIG. 6, as a normal temporal change of the dust concentration. That is, the temporal change of the dust concentration shown in FIG. 6 is registered. Information indicating the tendency of the temporal change of the dust concentration shown in FIG. 6 is an example of the registered past tendency information.

Each time the temporal change of the dust concentration in the monitoring target is updated, the determination unit 24 compares the temporal change of the dust concentration in the monitoring target, with the normal temporal change of the dust concentration shown in FIG. 6.

In a case where the dust concentration steeply increases as shown by regions Rg1 and Rg2 in FIG. 4 and FIG. 5 and the increased dust concentration does not attenuate, the determination unit 24 recognizes that the temporal change of the dust concentration in the monitoring target is different from the normal temporal change of the dust concentration, and determines that abnormality has occurred in the plant 5.

Upon determining that abnormality has occurred in the plant 5, the determination unit 24 creates abnormality detection information including: the ID of the smoke sensor showing abnormality; the abnormal temporal change of the dust concentration; and the normal temporal change of the dust concentration, and outputs the created abnormality detection information to the display control unit 23 and the notification unit 22.

Figure 7:
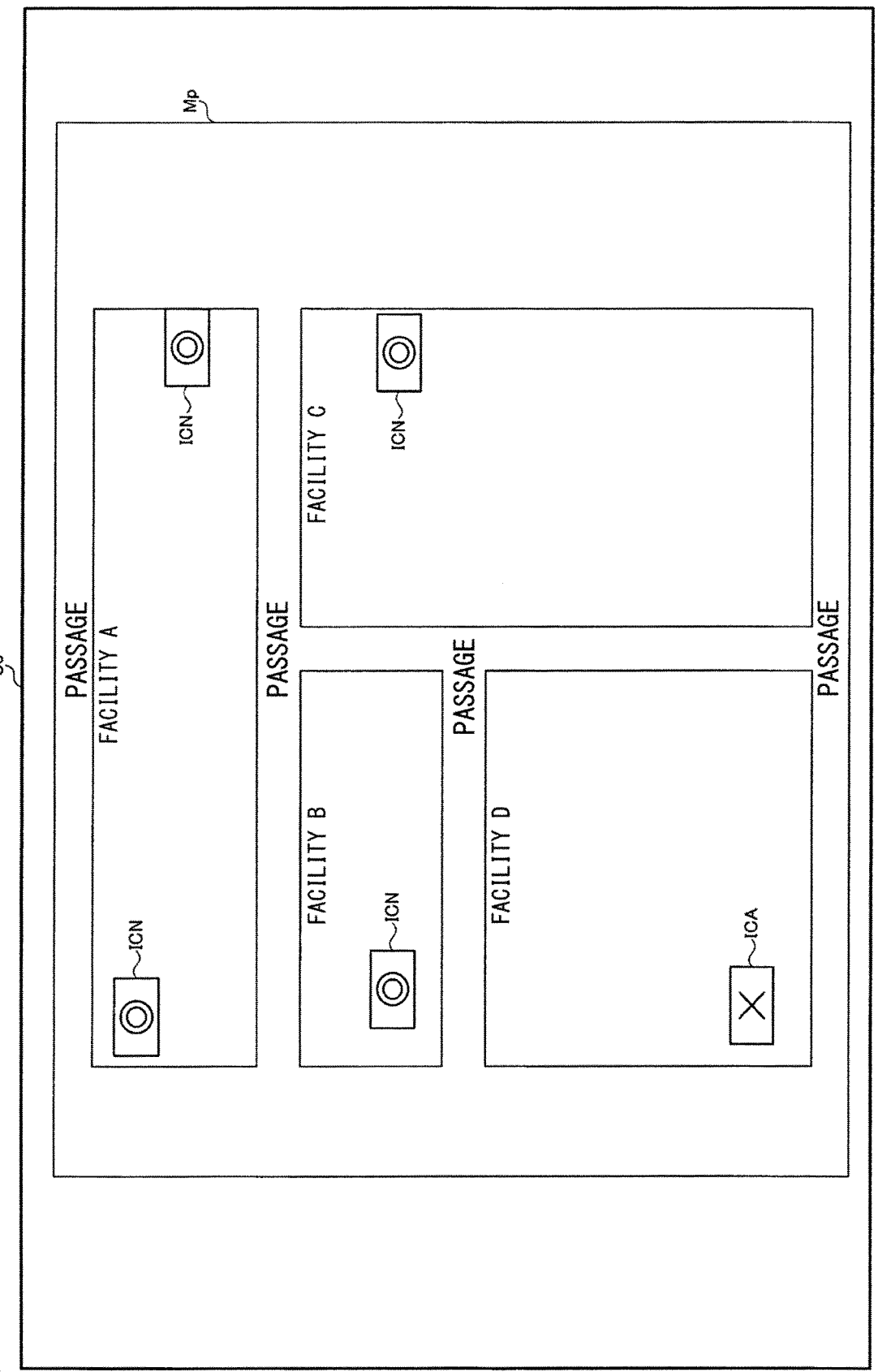
FIG. 7 shows an example of a screen displayed on a display device in the management system according to the first embodiment of the present disclosure.

FIG. 7 shows an example of a screen displayed on the display device in the management system according to the first embodiment of the present disclosure.

With reference to FIG. 7, the display control unit 23 is able to perform control of temporally displaying the content regarding the plant 5, on the basis of the sensor information acquired by the acquisition unit 21. Specifically, based on the sensor information acquired by the acquisition unit 21, the display control unit 23 performs control of spatially displaying the content regarding the plant 5 and control of temporally displaying the content regarding the plant 5.

For example, based on the sensor information, the display control unit 23 performs control of spatially displaying abnormality in the plant 5, and control of temporally displaying abnormality in the plant 5.

More specifically, upon receiving the abnormality detection information from the determination unit 24, the display control unit 23 acquires drawing information from the accumulation device 171 via the acquisition unit 21. Then, based on the acquired drawing information, the display control unit 23 performs control of displaying icons ICN, ICA representing a plurality of smoke sensors installed in the plant 5 and a drawing Mp of the plant 5, on a screen Sc of the display device 131.

Further, based on the abnormality detection information and the drawing information, the display control unit 23 changes the display mode of the icon of the smoke sensor showing abnormality. Specifically, the display control unit 23 changes the shape of the icon ICA of the smoke sensor showing abnormality so as to be different from the shape of the icon ICN of the smoke sensor showing normality.

The display control unit 23 is configured to change the shape of an icon ICA of a smoke sensor showing abnormality. However, the present disclosure is not limited thereto.

The display control unit 23 may be configured to cause an icon of a smoke sensor showing abnormality to change in color, blink, rotate, expand, contract, or perform a combination thereof.

The display control unit 23 performs control of displaying the temporal change of the dust concentration measured by the smoke sensor showing abnormality.

More specifically, when the administrator confirms the temporal change of the dust concentration measured by the smoke sensor showing abnormality, the administrator performs, to the reception unit 25, an operation of clicking the icon ICA of the smoke sensor showing abnormality, for example.

Upon receiving the operation performed by the administrator, the reception unit 25 creates operation information indicating the content of the received operation, and outputs the operation information to the display control unit 23.

The display control unit 23 performs control of displaying, on one screen, both the normal temporal change, and the temporal change, in the most-recent period, which is determined to be abnormal.

Specifically, when the operation information received from the reception unit 25 indicates that the icon ICA of the smoke sensor showing abnormality has been clicked, the display control unit 23 performs control of displaying, on one screen, both the normal temporal change of the dust concentration shown in FIG. 6 and the abnormal temporal change of the dust concentration shown in FIG. 4 or FIG. 5.

The notification unit 22 notifies the content based on the determination result of the determination unit 24. For example, the notification unit 22 notifies the abnormality of the plant 5 which has been determined to be abnormal by the determination unit 24.

More specifically, upon receiving the abnormality detection information from the determination unit 24, the notification unit 22 acquires the announcement destination information and the drawing information from the accumulation device 171 via the acquisition unit 21.

Based on the abnormality detection information and the drawing information, the notification unit 22 creates a mail indicating: the position, in the drawing Mp of the plant 5, of the smoke sensor having the ID indicated by the abnormality detection information; and the fact that the dust concentration measured by this smoke sensor is abnormal. Then, the notification unit 22 transmits the created mail to a device such as a server indicated by the acquired announcement destination information, via the internal network 11.

Furthermore, based on the abnormality detection information and the drawing information, the notification unit 22 creates announcement information indicating the facility D in which the sensor having the ID indicated by the abnormality detection information is installed, and transmits the created announcement information to the announcement device 111 via the internal network 11.

Referring back to FIG. 2, upon receiving the announcement information from the management device 101, the announcement device 111 announces the content of the received announcement information. A voice output device serving as the announcement device 111 outputs the content of the announcement information by voice. A warning lamp serving as the announcement device 111 starts to operate when the facility D indicated by the announcement information is the same as the facility where the warning lamp is provided. Specifically, the warning lamp provided in the facility D operates based on the announcement information.

[Operation]

Each of the devices included in the management system 301 is equipped with a computer, and an arithmetic processing unit such as a CPU in the computer reads out a program including a part or all of steps in the following sequence diagrams/flowcharts, from a memory (not shown), and executes the program. The programs for the plurality of devices can be installed from outside. Each of the programs for the plurality of devices is distributed in a state of being stored in a storage medium.

Figure 8:
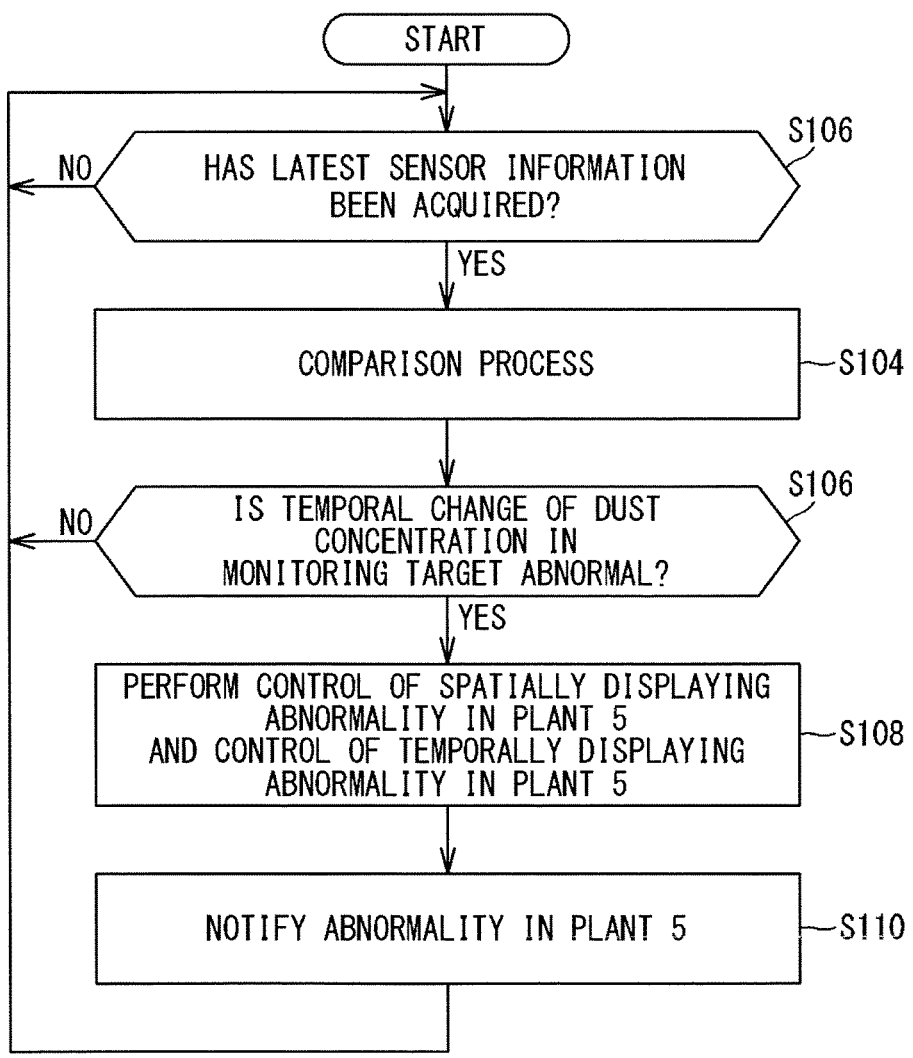
FIG. 8 is a flowchart showing an operation procedure used when the management device according to the first embodiment of the present disclosure processes sensor information.

FIG. 8 is a flowchart showing an operation procedure used when the management device according to the first embodiment of the present disclosure processes sensor information.

With reference to FIG. 8, first, the management device 101 stands by until the accumulation device 171 accumulates new sensor information (NO in step S102). When the accumulation device 171 has accumulated new sensor information, the management device 101 acquires the new sensor information (YES in step S102).

Next, the management device 101 performs a comparison process of comparing a temporal change of the dust concentration, which is indicated by pieces of sensor information acquired at a plurality of timings in the most-recent period, i.e., a temporal change of the dust concentration in the monitoring target, with the normal temporal change of the dust concentration in the past period (step S104).

Next, based on the result of the comparison process, the management device 101 determines whether or not the temporal change of the dust concentration in the monitoring target shows abnormality (step S106).

When the temporal change of the dust concentration in the monitoring target shows abnormality (YES in step S106), the management device 101 performs control of spatially displaying the abnormality in the plant 5, and control of temporally displaying the abnormality in the plant 5 (step S108).

Next, the management device 101 notifies the abnormality in the plant 5 (step S110).

When the temporal change of the dust concentration in the monitoring target does not show abnormality (NO in step S106) or when the abnormality in the plant 5 has been notified (step S110), the management device 101 stands by until the accumulation device 171 accumulates new sensor information (NO in step S102).

The order of steps S108 and S110 is not limited to the above order, and steps S108 and S110 may be reversed.

[Modifications]

The accumulation device 171 retains one or a plurality of temporal change patterns, each indicating a normal temporal change of the dust concentration (hereinafter, also referred to as normal temporal change patterns). In addition, the accumulation device 171 retains one or a plurality of temporal change patterns each indicating an abnormal temporal change of the dust concentration (hereinafter, also referred to as abnormal temporal change patterns). These temporal change patterns are examples of temporal changes for determination, and are registered through an operation performed by the administrator on the reception unit 25 in the management device 101, for example.

The determination unit 24 in the management device 101 uses, for example, a normal temporal change pattern and an abnormal temporal change pattern, as temporal changes in a past period. The determination unit 24 compares, for example, registered past tendency information indicating the tendencies of the normal temporal change pattern and the abnormal temporal change pattern retained in the accumulation device 171, with tendency information indicating a tendency of a temporal change of a value indicated by sensor information in a most-recent period, and performs determination regarding the plant 5 on the basis of the comparison result.

Figure 9:
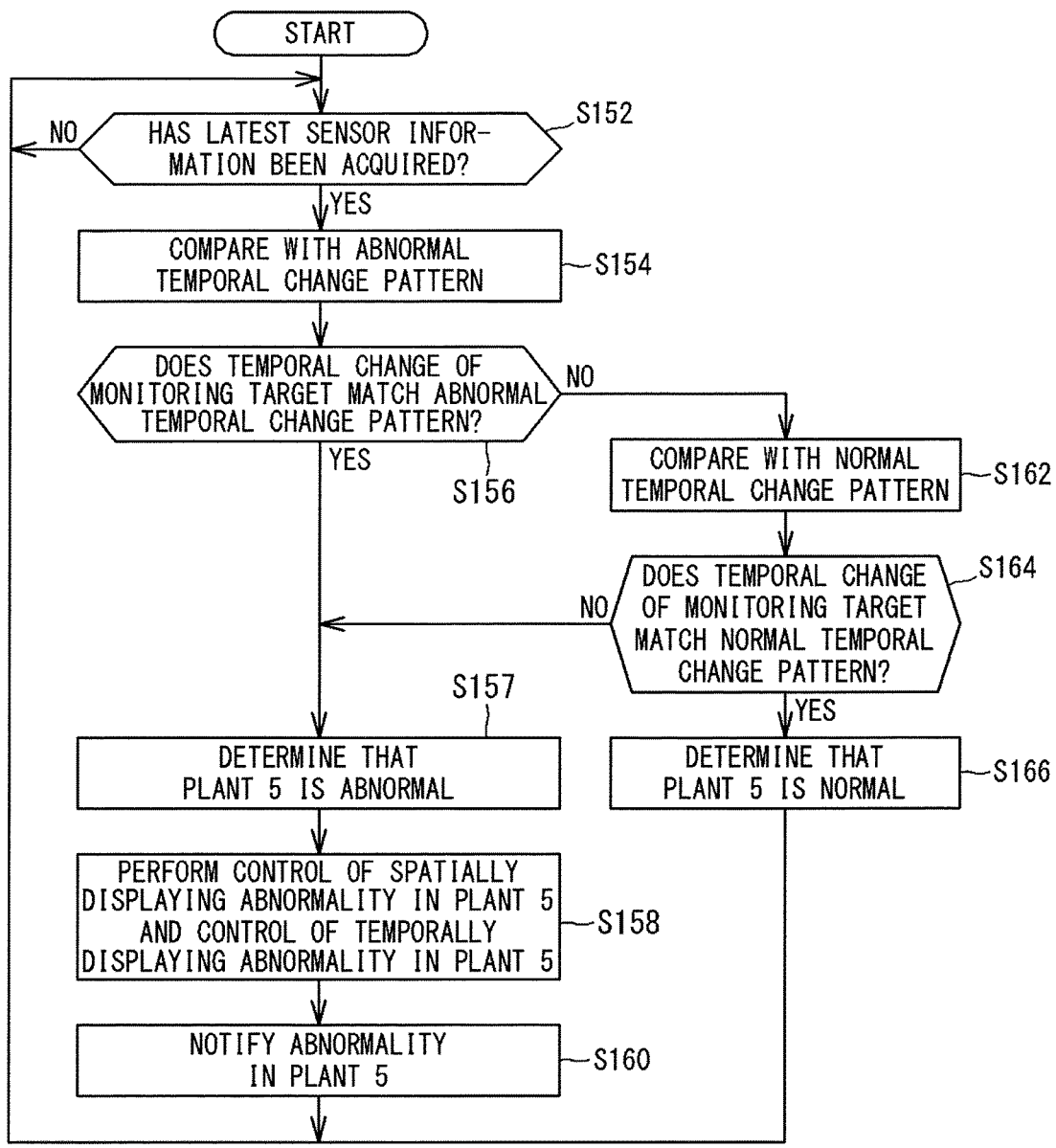
FIG. 9 is a flowchart showing a modification of the operation procedure used when the management device according to the first embodiment of the present disclosure processes sensor information.

FIG. 9 is a flowchart showing a modification of the operation procedure used when the management device according to the first embodiment of the present disclosure processes sensor information.

With reference to FIG. 9, first, the management device 101 stands by until the accumulation device 171 accumulates new sensor information (NO in step S152). When the accumulation device 171 has accumulated new sensor information, the management device 101 acquires the new sensor information (YES in step S152).

Next, the management device 101 acquires one or a plurality of abnormal temporal change patterns from the accumulation device 171, and compares the acquired abnormal temporal change pattern with the temporal change of the dust concentration in the monitoring target (step S154).

Next, when the abnormal temporal change pattern does not match the temporal change of the dust concentration in the monitoring target (NO in step S156), the management device 101 acquires one or a plurality of normal temporal change patterns of the dust concentration from the accumulation device 171, and compares the acquired normal temporal change pattern with the temporal change of the dust concentration in the monitoring target (step S162).

When the abnormal temporal change pattern matches the temporal change of the dust concentration in the monitoring target (YES in step S156), or when the normal temporal change pattern does not match the temporal change of the dust concentration in the monitoring target (NO in step S164), the management device 101 determines that abnormality has occurred in the plant 5 (step S157).

Next, the management device 101 performs control of spatially displaying the abnormality in the plant 5, and control of temporally displaying the abnormality in the plant 5 (step S158).

Next, the management device 101 notifies the abnormality in the plant 5 (step S160).

On the other hand, when the normal temporal change pattern matches the temporal change of the dust concentration in the monitoring target (YES in step S164), the management device 101 determines that the plant 5 is normal (step S166).

When the plant 5 has been determined to be normal (step S166) or when the abnormality in the plant 5 has been notified (step S160), the management device 101 stands by until the accumulation device 171 accumulates new sensor information (NO in step S152).

The order of steps S158 and S160 is not limited to the above order, and steps S158 and S160 may be reversed.

The management device 101 is configured to compare the normal temporal change pattern and the abnormal temporal change pattern with the temporal change of the value indicated by the sensor information in the most-recent period, and perform the aforementioned determination on the basis of the comparison result. However, the present disclosure is not limited thereto. The management device 101 may be configured to compare one of the normal temporal change pattern and the abnormal temporal change pattern with the temporal change of the value indicated by the sensor information in the most-recent period, and perform the aforementioned determination on the basis of the comparison result.

The determination unit 24 further acquires, for example, a result of determination by a user as to whether or not the tendency of the temporal change of the sensor information, which is based on the sensor information acquired by the acquisition unit 21, is normal, thereby correcting the determination information registered in advance. Specifically, the determination unit 24 corrects the determination information registered in advance, on the basis of the determination result.

In other words, the management device 101, for example, acquires the result of determination by the user as to whether or not the tendency of the temporal change of the sensor information, which is based on the acquired sensor information, is normal, and performs registration of the tendency information on the basis of the acquired determination result. Specifically, the management device 101 registers at least one of a normal temporal change pattern and an abnormal temporal change pattern.

Figure 10:
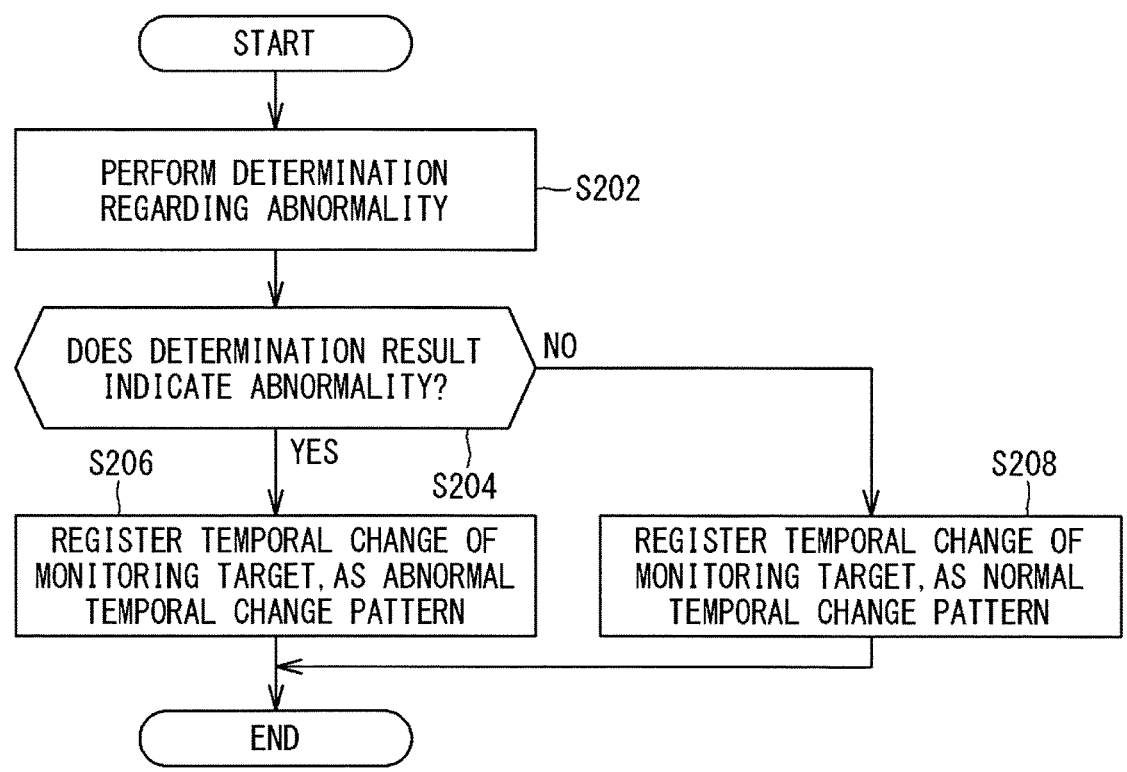
FIG. 10 is a flowchart showing an operation procedure used when the management device according to the first embodiment of the present disclosure registers a temporal change pattern.

FIG. 10 is a flowchart showing an operation procedure used when the management device according to the first embodiment of the present disclosure registers a temporal change pattern.

With reference to FIG. 10, first, the administrator refers to the temporal change of the dust concentration in the monitoring target, which is displayed on the display device 131, and determines whether or not the temporal change is abnormal, and inputs the determination result and the title of the temporal change to the management device 101 while operating the reception unit 25 (step S202).

Next, the reception unit 25 in the management device 101 acquires operation information indicating the content of the operation performed by the administrator. When the determination result indicated by the acquired operation information is that the temporal change is abnormal (YES in step S204), the reception unit 25 registers, as one abnormal temporal change pattern, the temporal change together with the title thereof in the accumulation device 171, for example (step S206).

On the other hand, when the determination result indicated by the acquired operation information is that the temporal change is normal (NO in step S204), the management device 101 registers, as one normal temporal change pattern, the temporal change together with the title thereof (step S208).

In the management device according to the first embodiment of the present disclosure, the display control unit 23 is configured to perform, based on the sensor information acquired by the acquisition unit 21, both the control of spatially displaying the content regarding the plant 5 and the control of temporally displaying the content regarding the plant 5. However, the present disclosure is not limited thereto. The display control unit 23 may be configured to perform, based on the sensor information, one of the control of spatially displaying the content regarding the plant 5 and the control of temporally displaying the content regarding the plant 5.

The management system according to the first embodiment of the present disclosure is used for abnormality detection. However, the present disclosure is not limited thereto. The management system 301 may be used for quality control, monitoring of working environment, etc.

In the management system according to the first embodiment of the present disclosure, the accumulation device 171 is provided outside the management device 101, as an accumulation unit. However, the present disclosure is not limited thereto. The accumulation unit may be provided inside the management device 101. In this case, for example, the acquisition unit 21 in the management device 101 acquires sensor information wirelessly transmitted from the plurality of sensors, and stores the acquired sensor information in the accumulation unit. The determination unit 24 performs, for example, abnormality determination regarding the predetermined area by using at least one of the sensor information directly acquired from the sensor by the acquisition unit 21 and the sensor information acquired from the accumulation unit by the acquisition unit 21.

The management system according to the first embodiment of the present disclosure includes a plurality of access points 151. However, the present disclosure is not limited thereto. The management system 301 may include one access point 151, or may include no access point 151.

In the management system according to the first embodiment of the present disclosure, the determination unit 24 is configured to perform determination regarding the plant 5. However, the present disclosure is not limited thereto. The determination unit 24 may be configured to perform determination regarding a predetermined area, in the plant 5, such as a floor, a facility, a passage, etc., or may be configured to perform determination regarding a predetermined area outside the plant 5.

Incidentally, beyond the technology disclosed in Patent Literature 1, a technology for satisfactorily monitoring the state of a predetermined area such as a plant, and the state of a facility installed in the predetermined area, and more accurately transmitting the monitoring result to an administrator, has been demanded.

More specifically, in a plant, if a defect occurs in an end product, for example, it is necessary to know in which step, among a plurality of manufacturing steps, an event causing the defect has occurred. For example, if the temperature or humidity had an abnormal value in a certain step, it is found that the defect occurred in this step, and an administrator or the like for the step can investigate the cause of the defect by using a record such as sensor information to improve the manufacturing process. Thus, beyond the technology disclosed in Patent Literature 1, a technology for satisfactorily monitoring the state of the plant, and more accurately transmitting the monitoring result to an administrator, has been demanded.

Meanwhile, the management system according to the first embodiment of the present disclosure includes a plurality of sensors installed in a predetermined area, and the management device 101. The management device 101 includes: the acquisition unit 21 configured to acquire sensor information wirelessly transmitted from the plurality of sensors; the accumulation unit configured to accumulate the sensor information acquired by the acquisition unit 21; the determination unit 24 configured to perform abnormality determination regarding the predetermined area by using the sensor information; the notification unit 22 configured to notify the content based on the result of the determination performed by the determination unit 24; and the display control unit 23 capable of performing control of temporally displaying the content regarding the predetermined area, on the basis of the sensor information acquired by the acquisition unit 21.

As described above, since the abnormality determination regarding the predetermined area is performed by using the sensor information, it is possible to recognize at least one of a spatial change and a temporal change of the state of the predetermined area, on the basis of at least one of a spatial change and a temporal change of the content of the sensor information, for example. Thus, it is possible to grasp the state of the predetermined area more accurately. In addition, since the accumulation unit is provided, for example, at least one of the spatial process and the temporal process can be easily performed. Further, the content based on the determination result is notified, and the content regarding the predetermined area, based on the sensor information, is temporally displayed, whereby the state of the predetermined area can be transmitted to the administrator more accurately. Accordingly, the monitoring result regarding the predetermined area can be more accurately transmitted.

In the management system according to the first embodiment of the present disclosure, the determination unit 24 performs abnormality determination by comparing the sensor information acquired by the acquisition unit 21 with the determination information registered in advance.

According to this configuration, more correct determination can be performed by, for example, registering the tendency, according to the determination target, of the temporal change of the sensor information. Specifically, as for the facilities in the plant 5, the old/new state, the operation state, the load state, etc., vary from facility to facility, and therefore, it is difficult to unconditionally determine a common criterion for abnormality. Therefore, it is preferable to set criteria for normality and abnormality for each facility, for example. Thus, the aforementioned configuration, in which the tendency of a normal temporal change or the tendency of an abnormal temporal change for each facility is registered, and abnormality is determined through comparison with the registered tendency, is particularly effective in the plant 5. Furthermore, for example, when a plurality of tendencies of normal temporal changes and a plurality of tendencies of abnormal temporal changes are registered, it is possible to enhance the possibility of finding the tendency of a temporal change similar to the tendency of the temporal change of the target period, from among the registered tendencies of temporal changes. Thus, it is possible to avoid a situation that the management device 101 has difficulty in recognizing which of the tendency of the normal temporal change and the tendency of the abnormal temporal change, the tendency of the temporal change in the target period is similar to.

In the management system according to the first embodiment of the present disclosure, the determination unit 24 further acquires the determination result by the user as to whether or not the tendency of the temporal change of the sensor information, which is based on the sensor information acquired by the acquisition unit 21, is normal, thereby correcting the determination information registered in advance.

According to this configuration, for example, the tendency of the temporal change indicated by the determination information registered in advance is corrected to meet the thought of the user, thereby avoiding abnormality determination that greatly deviates from the thought of the user.

In the management device according to the first embodiment of the present disclosure, the acquisition unit 21 acquires sensor information wirelessly transmitted from a plurality of sensors installed in a predetermined area. The determination unit 24 performs abnormality determination regarding the predetermined area by using the sensor information. The notification unit 22 notifies the content based on the result of the determination performed by the determination unit 24. The display control unit 23 is able to perform control of temporally displaying the content regarding the predetermined area, on the basis of the sensor information acquired by the acquisition unit 21.

As described above, since the abnormality determination regarding the predetermined area is performed by using the sensor information, it is possible to recognize at least one of a spatial change and a temporal change of the state of the predetermined area, on the basis of at least one of a spatial change and a temporal change of the content of the sensor information, for example. Thus, the state of the predetermined area can be grasped more accurately. In addition, the content based on the determination result is notified, and the content regarding the predetermined area, based on the sensor information, is temporally displayed, whereby the state of the predetermined area can be transmitted to the administrator more accurately. Accordingly, the monitoring result regarding the predetermined area can be transmitted more accurately.

In the management system according to the first embodiment of the present disclosure, a plurality of sensors are installed in a predetermined area. The accumulation device 171 accumulates sensor information wirelessly transmitted from the plurality of sensors. The management device 101 is able to acquire the sensor information, perform determination regarding the predetermined area through a temporal process by using the acquired sensor information; and notify the content based on the determination result. In addition, the management device 101 is able to perform, based on the acquired sensor information, at least one of control of spatially displaying the content regarding the predetermined area and control of temporally displaying the content regarding the predetermined area.

As described above, since the determination regarding the predetermined area is performed through the temporal process using the sensor information, a temporal change of the state of the predetermined area can be recognized based on a temporal change of the content of the sensor information, and thus the state of the predetermined area can be grasped more accurately. In addition, since the accumulation device 171 is provided, the temporal process can be easily performed. Further, the content based on the determination result is notified, and at least one of spatial display and temporal display of the content regarding the predetermined area, based on the sensor information, is performed, whereby the state of the predetermined area can be transmitted to the administrator more accurately. Accordingly, the state of the predetermined area can be satisfactorily monitored, and the monitoring result regarding the predetermined area can be transmitted more accurately.

In the management system according to the first embodiment of the present disclosure, the management device 101 compares the tendency information indicating the tendency of a temporal change of the sensor information, which is based on the sensor information in a target period, with the determination information to be used for determination, and performs determination on the basis of the comparison result.

According to this configuration, for example, by using, as tendency information, the tendency of a temporal change of the sensor information in a target period and the tendency of a temporal change of the sensor information in a period different from the target period, and using, as determination information, a threshold value and the tendency of a temporal change, it is possible to flexibly cope with a determination timing, a determination period, and a determination method which are desired by the user.

In the management system according to the first embodiment of the present disclosure, the determination information includes registered tendency information, indicating the tendency of a temporal change of the sensor information, which has been registered in advance.

According to this configuration, more correct determination can be performed by, for example, registering the tendency information according to the determination target. Specifically, for example, as for the facilities in the plant 5, the old/new state, the operation state, the load state, etc.,
vary from facility to facility, and therefore, it is difficult to unconditionally determine a common criterion for abnormality. Therefore, it is preferable to set criteria for normality and abnormality for each facility, for example. Thus, for example, the aforementioned configuration, in which the tendency of a normal temporal change or the tendency of an abnormal temporal change for each facility is registered, and abnormality is determined through comparison with the registered tendency, is particularly effective in the plant. Furthermore, for example, when a plurality of tendencies of normal temporal changes and a plurality of tendencies of abnormal temporal changes are registered, it is possible to enhance the possibility of finding the tendency of a temporal change similar to the tendency of the temporal change in the target period, from among the registered tendencies of temporal changes. Thus, it is possible to avoid a situation that the management device has difficulty in recognizing which of the tendency of the normal temporal change and the tendency of the abnormal temporal change, the tendency of the temporal change in the target period is similar to.

In the management system according to the first embodiment of the present disclosure, the registered tendency information includes the registered past tendency information indicating the tendency of a temporal change based on the sensor information in the past period prior to the target period.

According to this configuration, for example, by registering the past tendency information indicating the tendency under a situation where determination of normality or abnormality should be made, the determination of normality or abnormality can be performed more correctly when a similar situation occurs again.

In the management system according to the first embodiment of the present disclosure, the tendency information and the registered past tendency information are pieces of information based on the sensor information from the same sensor.

According to this configuration, for example, by registering the past tendency information indicating the tendency under a situation where determination of normality or abnormality should be made, tendency information indicating similar tendency to the tendency of the temporal change indicated by the registered past tendency information can be obtained when a similar situation occurs again, whereby determination of normality or abnormality can be performed more correctly. In addition, for example, it is possible to detect that the tendency of a temporal change of a value indicated by the sensor information in the most-recent target period is different from the tendency of a temporal change of a value indicated by the sensor information in the past period, whereby occurrence of abnormality in the predetermined area can be promptly recognized. In addition, for example, abnormality that has occurred in the predetermined area can be recognized early through a simple process using samples obtained in fewer number of periods. Thus, the abnormality that has occurred in the predetermined area can be promptly transmitted to the administrator. In a plant, for example, a facility that may affect measurement data performs substantially the same operation during the same process, the same time period, or the like. In other words, such a facility performs different operations during different processes, different time periods, or the like. Meanwhile, in an office or the like, a person who may affect measurement data changes his/her whereabouts, moves irregularly, and therefore is unlikely to perform the same action during the same time period. Accordingly, the above configuration, in which abnormality is determined by comparing past data obtained from the same sensor during different time sections, is particularly effective in a plant.

In the management system according to the first embodiment of the present disclosure, the management device further acquires the result of determination by the user as to whether or not the tendency of a temporal change of the sensor information, which is based on the acquired sensor information, is normal, and performs registration of the tendency information on the basis of the acquired determination result.

According to this configuration, the tendency of the temporal change of the sensor information, which is to be registered, and the result of determination by the user can be registered in combination. Therefore, when a similar tendency of a temporal change is acquired again, whether or not the tendency is normal can be determined along the thought of the user.

In the management system according to the first embodiment of the present disclosure, the plurality of access points 151 relay the sensor information through wireless communication. Then, the sensor information is transmitted to the management device 101 via the plurality of access points 151.

According to this configuration, since wireless communication with the sensor units 1 spreading over a wide area can be established, the sensor information transmitted from the plurality of sensor units 1 can be satisfactorily collected.

In the management system according to the first embodiment of the present disclosure, the sensor information includes a measurement result of at least one of smoke, temperature, humidity, current, voltage, concentration, pressure, acceleration, and angular speed regarding the predetermined area.

According to this configuration, a physical quantity according to the characteristics of the monitoring target can be measured and acquired, whereby the state of the predetermined area can be grasped more correctly.

In the management system according to the first embodiment of the present disclosure, the predetermined area is included in the plant 5.

According to this configuration, a plurality of predetermined areas in the plant 5 can be collectively managed regardless of the operation state of the plant 5, such as ordinary operation and unattended operation, thereby providing a management system having excellent monitoring efficiency.

In the management device according to the first embodiment of the present disclosure, the acquisition unit 21 acquires sensor information wirelessly transmitted from a plurality of sensors installed in a predetermined area. The determination unit 24 performs a temporal process by using the sensor information acquired by the acquisition unit 21 to perform determination regarding the predetermined area. The notification unit 22 notifies the content based on the result of the determination performed by the determination unit 24. Then, based on the sensor information acquired by the acquisition unit 21, the display control unit 23 performs at least one of control of spatially displaying the content regarding the predetermined area, and control of temporally displaying the content regarding the predetermined area.

As described above, since the determination regarding the predetermined area is performed through the temporal process using the sensor information, a temporal change of the state of the predetermined area can be recognized based on a temporal change of the content of the sensor information, whereby the state of the predetermined area can be grasped more accurately. In addition, the content based on the determination result is notified, and at least one of spatial display and temporal display of the content regarding the predetermined area, based on the sensor information, is performed, whereby the state of the predetermined area can be transmitted to the administrator more accurately. Accordingly, the state of the predetermined area can be satisfactorily monitored, and the monitoring result regarding the predetermined area can be transmitted more accurately.

In the management system according to the first embodiment of the present disclosure, the management device 101 compares a temporal change of a value indicated by the sensor information within a first period, with a temporal change of a value indicated by the sensor information in a second period prior to the first period, and performs determination regarding the plant 5 on the basis of the comparison result.

According to this configuration, for example, it is possible to promptly recognize occurrence of abnormality in the plant 5 by detecting that a temporal change of a value indicated by the sensor information in a most-recent period is different from a temporal change of the value indicated by the sensor information in a period prior to the most-recent period. In addition, for example, occurrence of abnormality in the plant 5 can be recognized early through the simple process using samples obtained in fewer number of periods. Thus, occurrence of abnormality in the plant 5 can be promptly transmitted to the administrator. In the plant 5, for example, a facility that may affect measurement data performs substantially the same operation during the same process, the same time period, or the like. In other words, such a facility performs different operations during different processes, different time periods, or the like. Meanwhile, in an office or the like, a person who may affect measurement data changes his/her whereabouts, moves irregularly, and therefore is unlikely to perform the same action during the same time period. Accordingly, the above configuration, in which abnormality is determined by comparing past data obtained from the same sensor during different time sections, is particularly effective in the plant 5.

In the management system according to the first embodiment of the present disclosure, the management device 101 uses a normal temporal change and an abnormal temporal change as temporal changes in the second period.

According to this configuration, it is possible to recognize which of the normal temporal change and the abnormal temporal change, the temporal change in the first period is similar to. Thus, determination of normality or abnormality can be performed more reliably.

In the management system according to the first embodiment of the present disclosure, the management device 101 performs control of displaying, on one screen, both the normal temporal change and the temporal change, in the first period, which has been determined to be abnormal.

According to this configuration, it is possible to allow the user to easily recognize a difference between the normal temporal change and the temporal change determined to be abnormal.

In the management system according to the first embodiment of the present disclosure, the management device 101 compares a temporal change for determination, which is a normal temporal change or an abnormal temporal change of a value indicated by the sensor in the sensor unit 1 and has been registered in advance, with a temporal change of a value indicated by the sensor information in the target period, and performs determination regarding abnormality of the plant 5 on the basis of the comparison result.

According to this configuration, for example, when a plurality of normal temporal changes and a plurality of abnormal temporal changes have been registered in advance, it is possible to enhance the possibility of finding a temporal change similar to the temporal change in the target period from among the registered temporal changes. Thus, it is possible to avoid a situation that the management device 101 has difficulty in recognizing which of the normal temporal change and the abnormal temporal change, the temporal change in the target period is similar to. In addition, for example, as for the facilities in the plant 5, the old/new state, the operation state, the load state, etc., vary from facility to facility, and therefore, it is difficult to unconditionally determine a common criterion for abnormality. Therefore, it is preferable to set criteria for normality and abnormality for each facility. Thus, for example, the aforementioned configuration, in which the normal temporal change patterns or the abnormal temporal change patterns for each facility have been registered in advance, and abnormality determination is performed through comparison with the registered patterns, is particularly effective in the plant 5.

In the management system according to the first embodiment of the present disclosure, the management device 101 further acquires the result of determination by the user as to whether or not a temporal change of a value indicated by the acquired sensor information is normal, and registers a temporal change for determination on the basis of the acquired determination result.

According to this configuration, a temporal change, which is difficult to be recognized by the management device 101 as to which of the normal temporal change and the abnormal temporal change the temporal change is similar to, can be registered, together with the result of determination by the user, as a temporal change for determination. Therefore, when a similar temporal change has been acquired again, it is possible to easily recognize as to which of the normal temporal change and the abnormal temporal change, the temporal change is similar to.

Hereinafter, another embodiment of the present disclosure will be described with reference to the drawings. The same or corresponding parts in the drawings are denoted by the same reference characters, and description thereof is not repeated.

Second Embodiment

This embodiment relates to a management system which compares pieces of sensor information of a plurality of different sensors, in contrast to the management system according to the first embodiment. Except for the contents described below, the management system of this second embodiment is identical to the management system of the first embodiment.

Referring back to FIG. 3, the determination unit 24 compares, for example, tendency information including first tendency information with determination information including second tendency information. The first tendency information indicates a tendency of a temporal change of sensor information, which is based on sensor information of a first sensor in a target period. The second tendency information indicates a tendency of a temporal change of sensor information, which is based on sensor information, in the target period, of one or a plurality of sensors different from the first sensor. Based on the comparison result, the determination unit 24 performs determination regarding a predetermined area, for example, the plant 5. In this embodiment, the target period is, for example, a period during which a facility installed in the plant 5 is stopped (hereinafter, also referred to as "facility stop period").

In other words, the determination unit 24, for example, compares pieces of sensor information of a plurality of sensors, and performs determination regarding the plant 5 on the basis of the comparison result. Specifically, the determination unit 24, for example, compares pieces of sensor information of a plurality of sensors of different types, and performs determination regarding the plant 5 on the basis of the comparison result. More specifically, the determination unit 24 evaluates a correlation between measurement results indicated by a plurality of pieces of sensor information, and performs determination regarding the plant 5 on the basis of the evaluation result.

Specifically, the determination unit 24 acquires the pieces of sensor information of the plurality of sensors from the accumulation device 171 via the acquisition unit 21, and monitors the contents of the acquired pieces of sensor information.

The determination unit 24 compares temporal changes of the contents of the pieces of sensor information. The contents of the pieces of sensor information used for the comparison should be correlated with each other, in other words, should have a cause-effect relationship.

Figure 11:
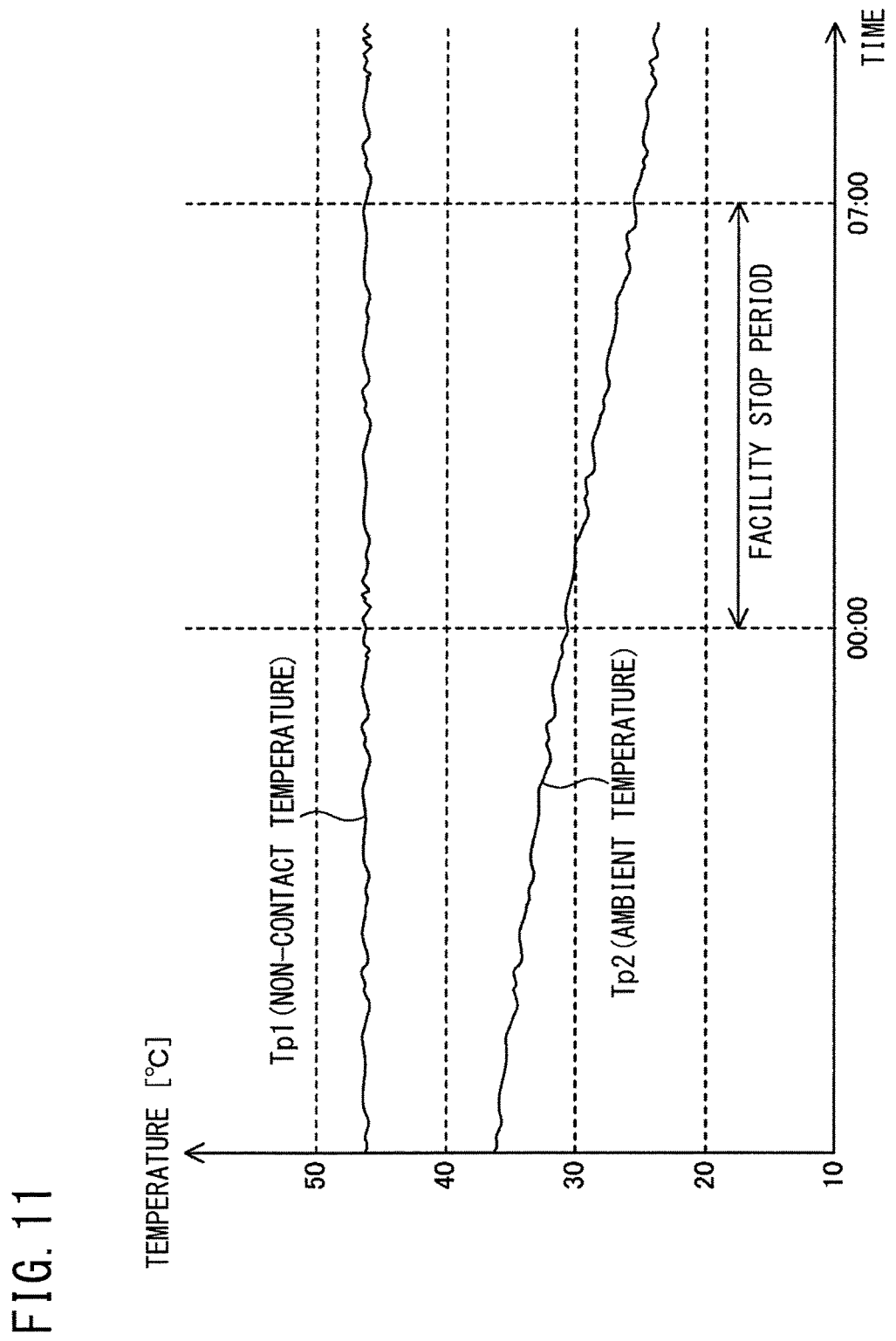
FIG. 11 shows examples of temporal changes of a non-contact temperature and an ambient temperature respectively measured by a non-contact temperature sensor and a temperature sensor according to a second embodiment of the present disclosure.

FIG. 11 shows examples of temporal changes of a non-contact temperature and an ambient temperature respectively measured by a non-contact temperature sensor and a temperature sensor according to the second embodiment of the present disclosure. In FIG. 11, the vertical axis represents temperature, and the horizontal axis represents time.

With reference to FIG. 11, temperature curves Tp1, Tp2 indicate the temporal changes of the non-contact temperature and the ambient temperature, respectively. In this embodiment, since the non-contact temperature sensor and the temperature sensor are installed in the same facility, for example, the non-contact temperature and the ambient temperature should be correlated with each other. In addition, the facilities in the plant 5 are stopped during a facility stop period from midnight to 7 a.m., for example.

In this example, for example, information indicating a tendency of a temporal change of the non-contact temperature during the facility stop period is the first tendency information. On the other hand, for example, information indicating a tendency of a temporal change of the ambient temperature during the facility stop period is the second tendency information. The first tendency information and the second tendency information may be replaced with each other.

The determination unit 24 acquires the sensor information of the non-contact temperature sensor and the sensor information of the temperature sensor from the accumulation device 171 via the acquisition unit 21, and monitors the temporal change of the non-contact temperature, i.e., the temperature at the surface of the facility, and the temporal change of the ambient temperature.

The determination unit 24 retains, for example, a reference correlation M1 indicating that, during the facility stop period, the temperature indicated by the sensor information from the non-contact temperature sensor decreases with time, and the temperature indicated by the sensor information from the temperature sensor decreases with time.

In the middle of the facility stop period or after completion of the facility stop period, the determination unit 24 creates, for example, a target correlation M2 which is a correlation between: a temporal change of the temperature indicated by the sensor information from the non-contact temperature sensor in a target period including a part or the entirety of the facility stop period; and a temporal change of the temperature indicated by the sensor information from the temperature sensor in the target period.

The determination unit 24 compares the reference correlation M1 with the target correlation M2, and performs determination regarding the plant 5 on the basis of the comparison result.

Specifically, the determination unit 24 compares the temperature curves Tp1 and Tp2, and recognizes that, during the facility stop period, the ambient temperature decreases with the stop of the facility whereas the temperature at the surface of the facility does not decrease. Thus, the determination unit 24 determines that abnormality has occurred in the plant 5, more specifically, determines that abnormality has occurred in the facility, in the plant 5, which is equipped with the non-contact temperature sensor and the temperature sensor.

Upon determining that abnormality has occurred in the plant 5, the determination unit 24 creates abnormality detection information including: the ID of each sensor showing abnormality; and the temporal changes of the non-contact temperature and the ambient temperature, and outputs the created abnormality detection information to the display control unit 23 and the notification unit 22.

Figure 12:
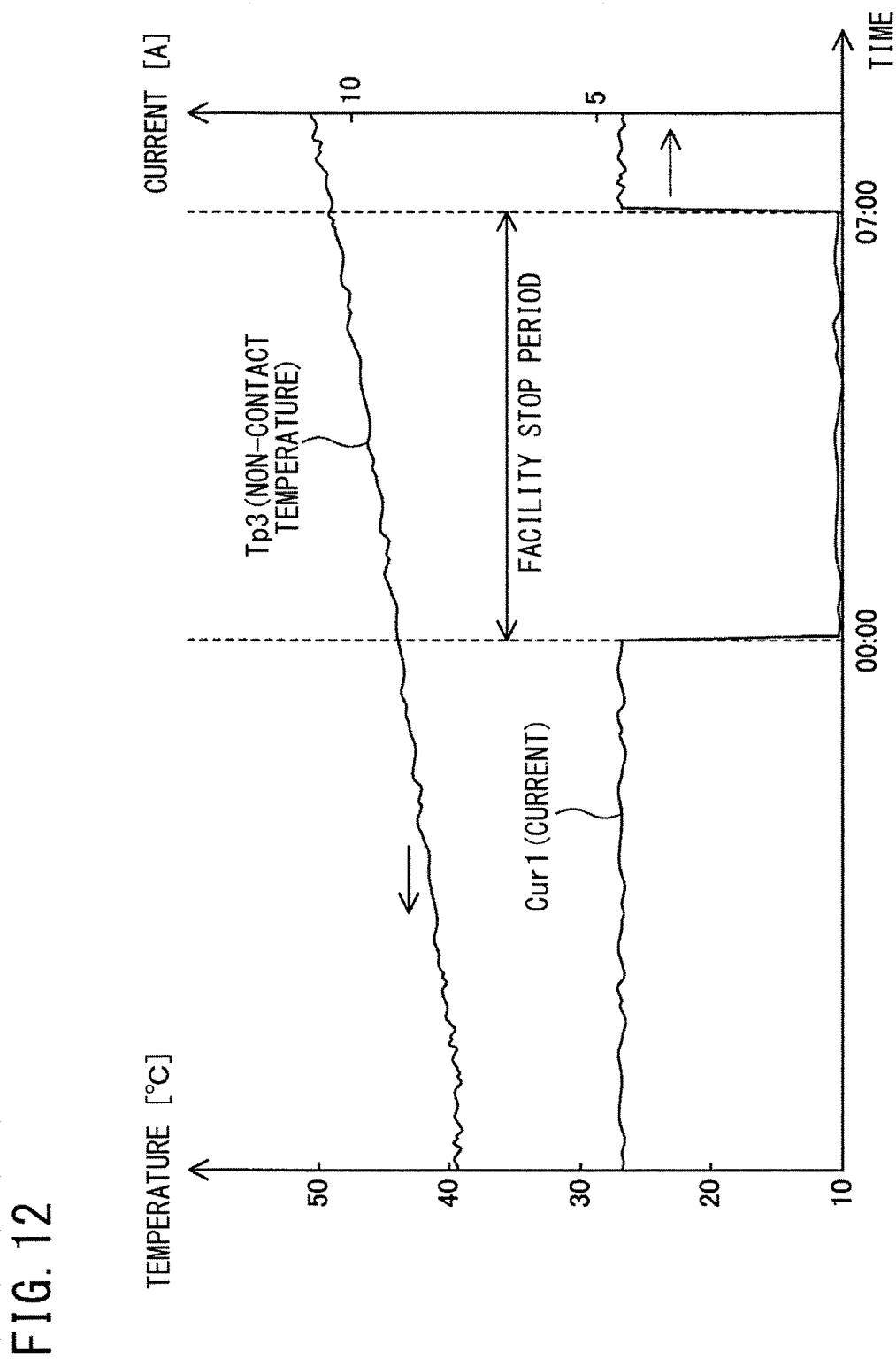
FIG. 12 shows examples of temporal changes of a non-contact temperature and a current respectively measured by the non-contact temperature sensor and a current sensor according to the second embodiment of the present disclosure.

FIG. 12 shows examples of temporal changes of a non-contact temperature and a current respectively measured by the non-contact temperature sensor and a current sensor according to the second embodiment of the present disclosure. In FIG. 12, the two vertical axes represent temperature and current, respectively, and the horizontal axis represents time.

With reference to FIG. 12, a temperature curve Tp3 and a current curve Cur1 indicate the temporal changes of the non-contact temperature and the current, respectively. In this embodiment, since the non-contact temperature sensor and the current sensor measure, for example, the temperature at the surface of the facility and the current flowing through the facility, respectively, the non-contact temperature and the current should be correlated with each other. In addition, the facilities in the plant 5 are stopped during a facility stop period from midnight to 7 a.m., for example.

In this example, for example, information indicating a tendency of a temporal change of the non-contact temperature during the facility stop period is the first tendency information. On the other hand, for example, information indicating a tendency of a temporal change of the current during the facility stop period is the second tendency information. The first tendency information and the second tendency information may be replaced with each other.

The determination unit 24 retains, for example, a reference correlation M3 indicating that, during the facility stop period, the temperature indicated by the sensor information from the non-contact temperature sensor decreases with time when a current value indicated by the sensor information from the current sensor is substantially zero.

In the middle of the facility stop period or after completion of the facility stop period, the determination unit 24 creates, for example, a target correlation M4 which is a correlation between: a temporal change of the current indicated by the sensor information from the current sensor, in a target period including a part or the entirety of the facility stop period; and a temporal change, in the target period, of the temperature indicated by the sensor information from the non-contact temperature sensor.

The determination unit 24 compares the reference correlation M3 with the target correlation M4, and performs determination regarding the plant 5 on the basis of the comparison result.

Specifically, the determination unit 24 compares the temperature curve Tp3 with the current curve Cur1, and recognizes that, during the facility stop period, the temperature at the surface of the facility increases although no current flows through the facility and therefore there is no cause for such an increase in the temperature at the surface of the facility. Thus, the determination unit 24 determines that abnormality has occurred in the plant 5.

Upon determining that abnormality has occurred in the plant 5, the determination unit 24 creates abnormality detection information including: the ID of each sensor showing abnormality; and the temporal changes of the non-contact temperature and the current, and outputs the created abnormality detection information to the display control unit 23 and the notification unit 22.

Figure 13:
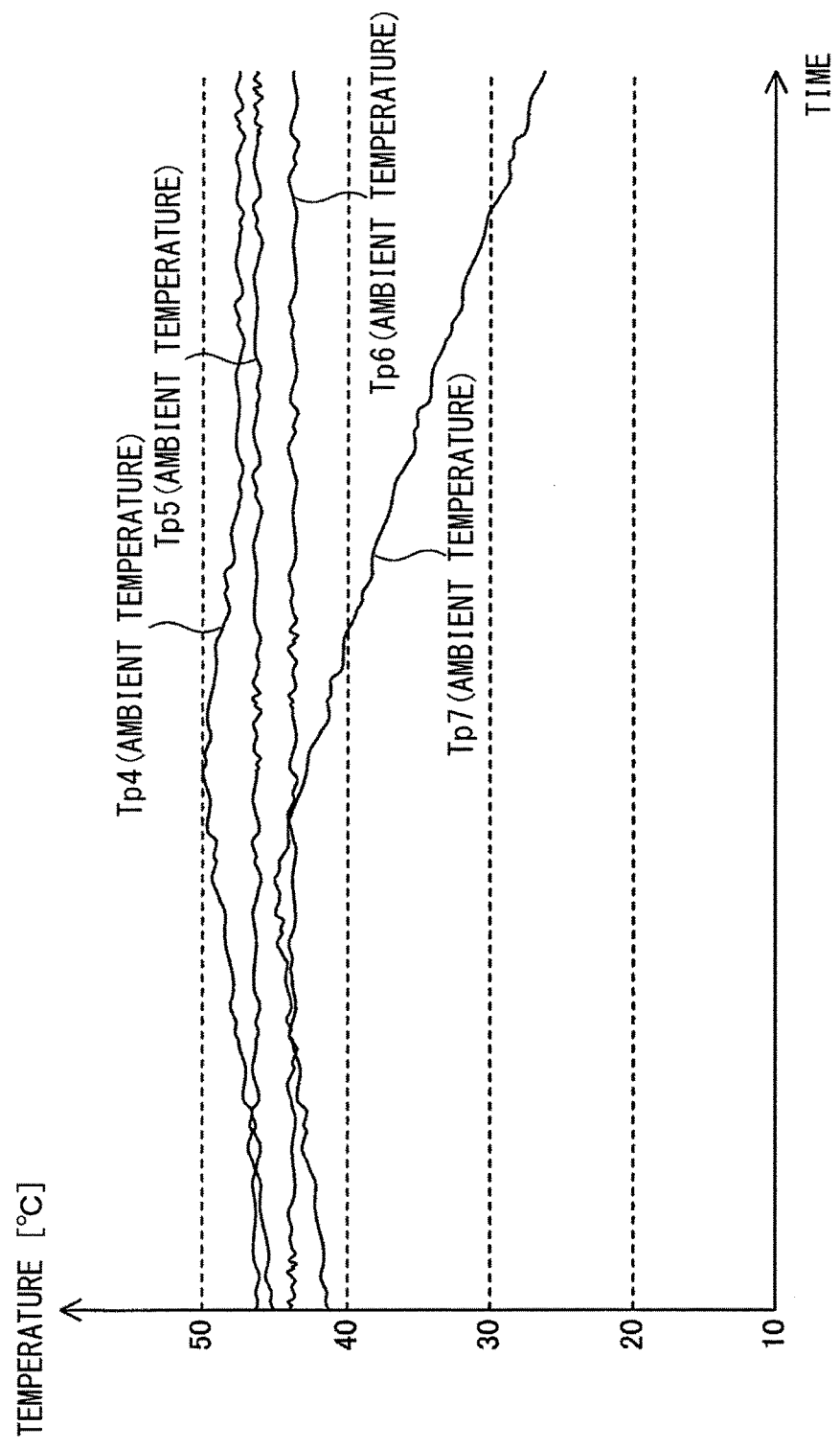
FIG. 13 shows examples of temporal changes of ambient temperatures respectively measured by four temperature sensors according to the second embodiment of the present disclosure.

FIG. 13 shows examples of temporal changes of ambient temperatures respectively measured by four temperature sensors according to the second embodiment of the present disclosure. In FIG. 13, the vertical axis represents temperature, and the horizontal axis represents time.

With reference to FIG. 13, temperature curves Tp4 to Tp7 indicate the temporal changes of the ambient temperatures respectively measured by the four temperature sensors. Since the respective temperature sensors are provided in different facilities performing the same operation, the respective ambient temperatures should be correlated with each other.

In this example, a target period is an arbitrary period, for example. In addition, for example, information indicating a tendency of a temporal change, in the target period, of each of the temperature curves Tp4 to Tp6 is the second tendency information. On the other hand, for example, information indicating a tendency of a temporal change, in the target period, of the temperature curve Tp7 is the first tendency information.

The information indicating the tendency of the temporal change, in the target period, of any one of the temperature curves Tp4 to Tp6 may be the first tendency information. In this case, the information indicating the tendency of the temporal change, in the target period, of each of the temperature curve Tp7 and the remaining temperature curves, is the second tendency information.

The determination unit 24 retains, for example, a reference correlation M5 indicating that the temperatures indicated by the respective pieces of sensor information from the four temperature sensors change in a similar manner during an arbitrary target period.

After completion of the target period, the determination unit 24 creates, for example, a target correlation M6 which is a correlation among the temporal changes, in the target period, of the temperatures indicated by the respective pieces of sensor information from the four temperature sensors.

The determination unit 24 compares, for example, pieces of sensor information from a plurality of sensors of the same type, and performs determination regarding the plant 5 on the basis of the comparison result. In this example, the determination unit 24 compares the reference correlation M5 with the target correlation M6, and performs the determination on the basis of the comparison result. Specifically, the determination unit 24 compares the temperature curves Tp4 to Tp7, and recognizes that the ambient temperature indicated by the temperature curve Tp7 decreases while the ambient temperatures indicated by the temperature curves Tp4 to Tp6 do not decrease. Thus, the determination unit 24 determines that abnormality has occurred in the plant 5.

Upon determining that abnormality has occurred in the plant 5, the determination unit 24 creates abnormality detection information including: the ID of each sensor showing abnormality, and the temporal changes of the respective ambient temperatures, and outputs the created abnormality detection information to the display control unit 23 and the notification unit 22.

The respective temporal changes correlated by the reference correlation are temporal changes in the same period, but the present disclosure is not limited thereto. The respective temporal changes correlated by the reference correlation may be temporal changes in different periods.

The respective temporal changes correlated by the target correlation are temporal changes in the same period, but the present disclosure is not limited thereto. The respective temporal changes correlated by the target correlation may be temporal changes in different periods.

[Operation]

Figure 14:
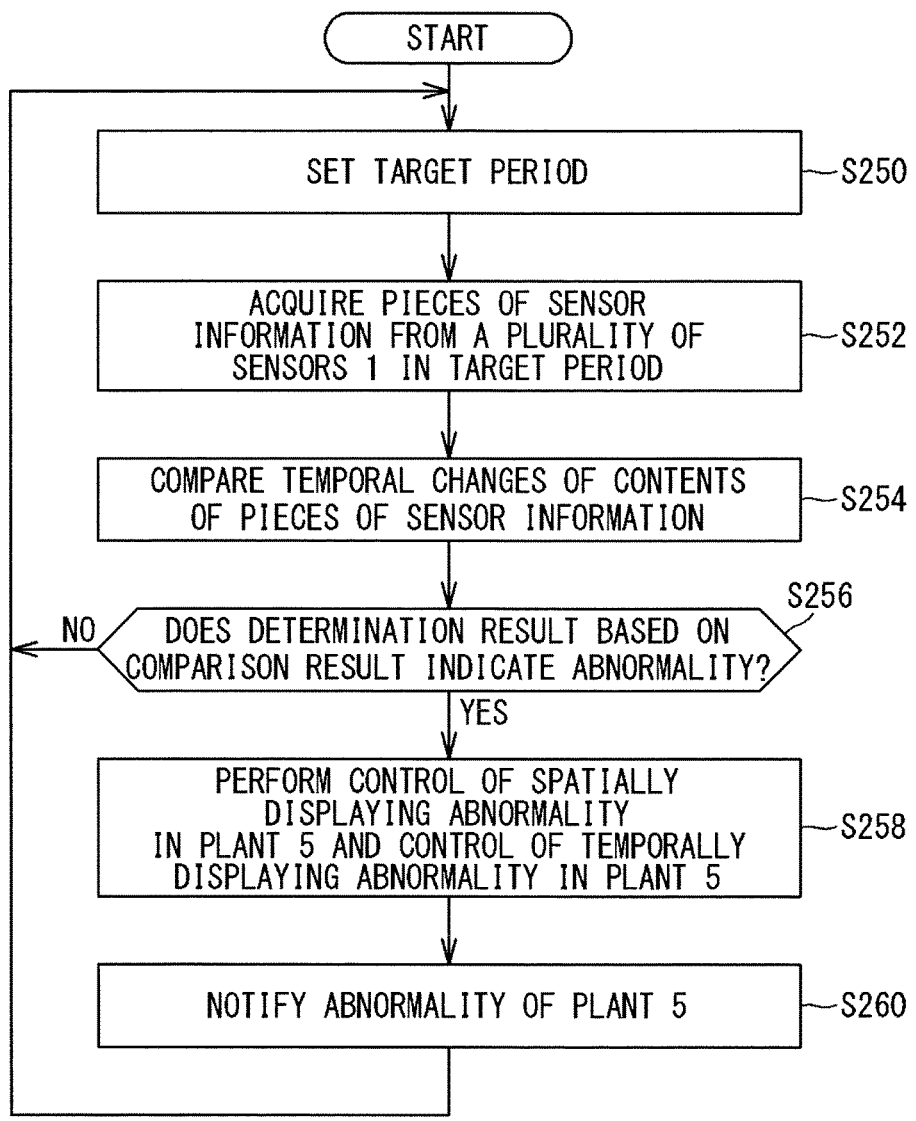
FIG. 14 is a flowchart showing an operation procedure used when the management device according to the second embodiment of the present disclosure processes sensor information.

FIG. 14 is a flowchart showing an operation procedure used when the management device according to the second embodiment of the present disclosure processes sensor information.

With reference to FIG. 14, first, the management device 101 sets a target period. Specifically, the management device 101 sets a facility stop period as a target period (step S250).

Next, the management device 101 acquires pieces of sensor information from a plurality of sensors in the target period (step S252).

Next, the management device 101 compares temporal changes, in the target period, of the contents of the pieces of sensor information. More specifically, the management device 101 compares the reference correlation with the target correlation (step S254).

Upon determining, based on the comparison result, that abnormality has occurred in the plant 5 (YES in step S256), the management device 101 performs control of spatially displaying the abnormality in the plant 5, and control of temporally displaying the abnormality in the plant 5 (step S258).

Next, the management device 101 notifies the abnormality in the plant 5 (step S260).

When the management device 101 has determined, based on the comparison result, that no abnormality has occurred in the plant 5 (NO in step S256) or has notified the abnormality in the plant 5 (step S260), the management device 101 sets a new target period (step S250).

The order of steps S258 and S260 is not limited to the above order, and steps S258 and S260 may be reversed. The target period may be a most-recent period or another period.

As described above, in the management system according to the second embodiment of the present disclosure, the tendency information includes the first tendency information indicating a tendency of a temporal change of sensor information, which is based on the sensor information of the first sensor in the target period. Meanwhile, the determination information includes the second tendency information indicating a tendency of a temporal change of sensor information, which is based on the sensor information, in the target period, of one or a plurality of sensors different from the first sensor.

According to this configuration, for example, in a case where there is a correlation between the tendency of the temporal change indicated by the tendency information and the tendency of the temporal change indicated by the determination information, it is possible to more correctly determine occurrence of abnormality in the predetermined area on the basis of the comparison result. Specifically, for example, in the plant 5 where smoke is generated while a facility is operated, the plant 5 is determined to be normal when it is detected that the smoke density increases with time while a current flows through the facility. However, the plant 5 is determined to be abnormal when it is detected that the smoke density increases with time while no current flows through the facility. Furthermore, as described above, in the plant 5, a facility performs substantially the same operation during the same process, the same time period, or the like. Therefore, in a case where a plurality of sensors are installed in the plant 5, the relationship, in the same time period, among temporal changes of values indicated by pieces of sensor information from these sensors, does not vary very much. Meanwhile, in an office or the like, a person is unlikely to perform the same action during the same time period. Therefore, in a case where a plurality of sensors are installed in an office, the relationship, in the same time period, among temporal changes of values indicated by pieces of sensor information from these sensors, varies. Accordingly, the above configuration, in which abnormality is determined by comparing the temporal changes in the same time section regarding a plurality of sensors, is particularly effective in the plant 5.

In the management system according to the second embodiment of the present disclosure, the target period is a period during which a facility installed in a predetermined area is stopped.

Thus, when the aforementioned determination is performed in, for example, the facility stop period during which the facility is highly likely to be unmanned, determination accuracy is enhanced by a reduction in noise, and security in the predetermined area can be improved.

In the management system according to the second embodiment of the present disclosure, the management device 101 compares temporal changes of values indicated by pieces of sensor information from the plurality of sensors in the same target period, and performs determination regarding the plant 5 on the basis of the comparison result.

According to this configuration, in a case where, for example, the temporal changes of the values indicated by the pieces of sensor information from the plurality of sensors should be correlated with each other, it is possible to more correctly determine that abnormality has occurred in the plant 5, on the basis of the comparison result. Specifically, for example, in the plant 5 where smoke is generated while a facility is operated, the plant 5 is determined to be normal when it is detected that the smoke density increases with time while a current flows through the facility. However, the plant 5 is determined to be abnormal when it is detected that the smoke density increases with time while no current flows through the facility. Furthermore, as described above, in the plant 5, a facility performs substantially the same operation during the same process, the same time period, or the like. Therefore, in a case where a plurality of sensors are installed in the plant 5, the relationship, in the same time period, among temporal changes of values indicated by pieces of sensor information from these sensors, does not vary very much. Meanwhile, in an office or the like, a person is unlikely to perform the same action during the same time period. Therefore, in a case where a plurality of sensors are installed in an office, the relationship, in the same time period, among temporal changes of values indicated by pieces of sensor information from these sensors, varies. Accordingly, the above configuration, in which abnormality is determined by comparing the temporal changes in the same time section regarding a plurality of sensors, is particularly effective in the plant 5.

In the management system according to the second embodiment of the present disclosure, the management device 101 compares the correlation between the temporal change of the value indicated by the sensor information of the first sensor and the temporal change of the value indicated by the sensor information of the second sensor, which have been registered in advance, with the correlation between the temporal change of the value indicated by the sensor information of the first sensor in a third period and the temporal change of the value indicated by the sensor information of the second sensor in a fourth period, and performs determination regarding the plant 5 on the basis of the comparison result.

As described above, for example, the correlation to be a reference is compared with the correlation of evaluation targets, and the aforementioned determination is performed based on the comparison result, whereby the aforementioned determination can be appropriately performed even under a situation where it is difficult to perform the aforementioned determination on the basis of an absolute value of a value indicated by sensor information. Specifically, for example, in a case where many different facilities are installed in the plant 5, smoke, high heat, noise, etc., may be caused by operations of the facilities, and may affect the surrounding environments. In this case, for example, a temporal change of one of the ambient temperature and the temperature at the surface of a facility is sometimes insufficient for determination as to whether temperature rise is caused by the operation of the facility or temperature rise is caused by abnormality such as fire. Even in this case, the aforementioned determination can be appropriately performed through comparison using the correlation between the temporal change of the ambient temperature and the temporal change of the temperature at the surface of the facility. Accordingly, the above configuration, in which abnormality determination is performed by using the correlation between temporal changes of values indicated by pieces of sensor information from a plurality of sensors correlated with each other, is particularly effective in the plant 5.

In the management system according to the second embodiment of the present disclosure, the management device 101 compares pieces of sensor information of sensors of the same type.

According to this configuration, for example, in a case where a plurality of sensors have, as measurement targets thereof, a plurality of facilities performing the same operation, a facility that performs an abnormal operation can be determined more correctly.

In the management system according to the second embodiment of the present disclosure, the management device 101 compares pieces of sensor information from sensors of different types.

According to this configuration, for example, in a case where a plurality of sensors have the same facility as measurement targets thereof, whether or not the facility performs an abnormal operation can be determined more correctly.

The other configurations and operations are the same as those of the management system according to the first embodiment, and detailed description thereof is not repeated here.

Next, another embodiment of the present disclosure will be described with reference to the drawings. The same or corresponding parts in the drawings are denoted by the same reference characters, and description thereof is not repeated.

Third Embodiment

This embodiment relates to a management system capable of mode switching, in contrast to the management system according to the first embodiment. Except for the contents described below, the management system of this third embodiment is identical to the management system of the first embodiment.

[Management Device]

Figure 15:
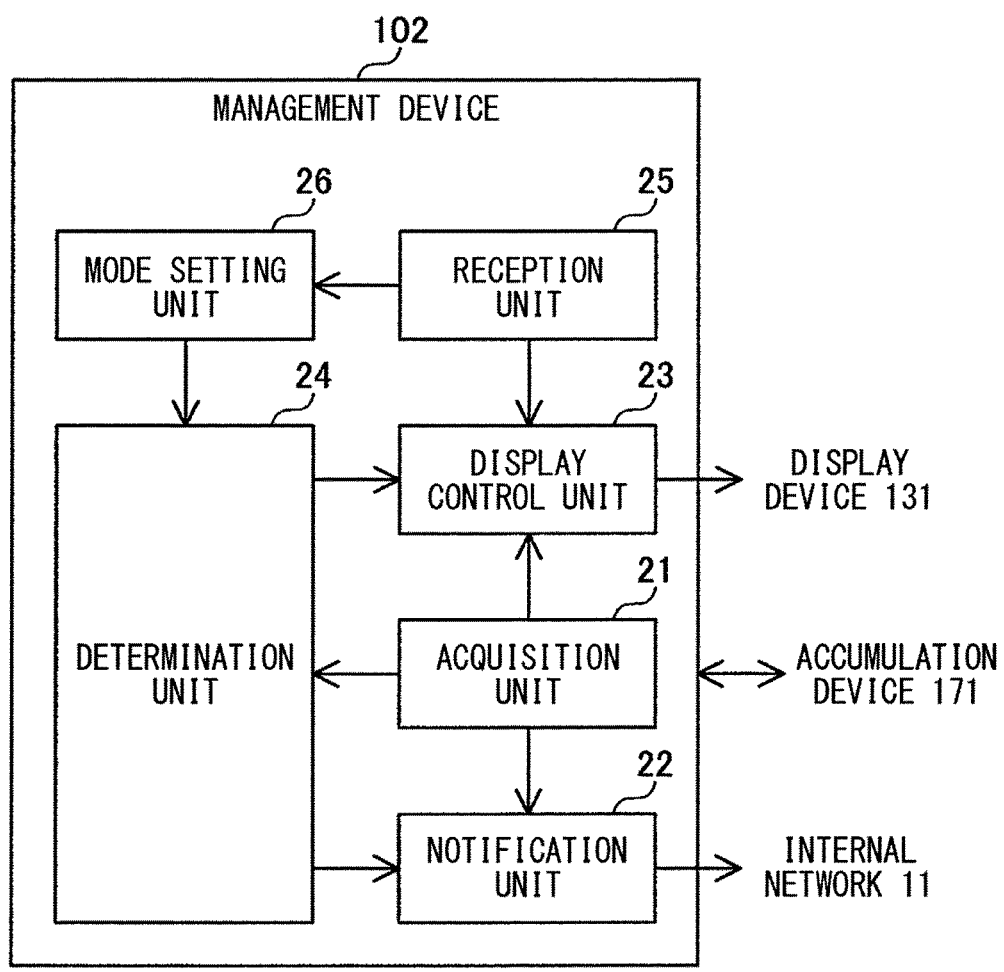
FIG. 15 shows a configuration of a management device in a management system according to a third embodiment of the present disclosure.

FIG. 15 shows a configuration of a management device in a management system according to the third embodiment of the present disclosure.

With reference to FIG. 15, a management device 102 further includes a mode setting unit 26, as compared with the management device 101 shown in FIG. 3.

The operations of an acquisition unit 21, a notification unit 22, a display control unit 23, a determination unit 24, and a reception unit 25 in the management device 102 are identical to the operations of the acquisition unit 21, the notification unit 22, the display control unit 23, the determination unit 24, and the reception unit 25 in the management device 101 shown in FIG. 3, respectively.

The determination unit 24 has, for example, a mode Mi for performing determination regarding the plant 5 by individually using pieces of sensor information, and a mode Mp for performing determination regarding the plant 5 by comparing pieces of sensor information of a plurality of sensors.

More specifically, the mode setting unit 26 sets, on the determination unit 24, at least one of the mode Mi and the mode Mp for each sensor.

[Example of Mode Mi]

Figure 16:
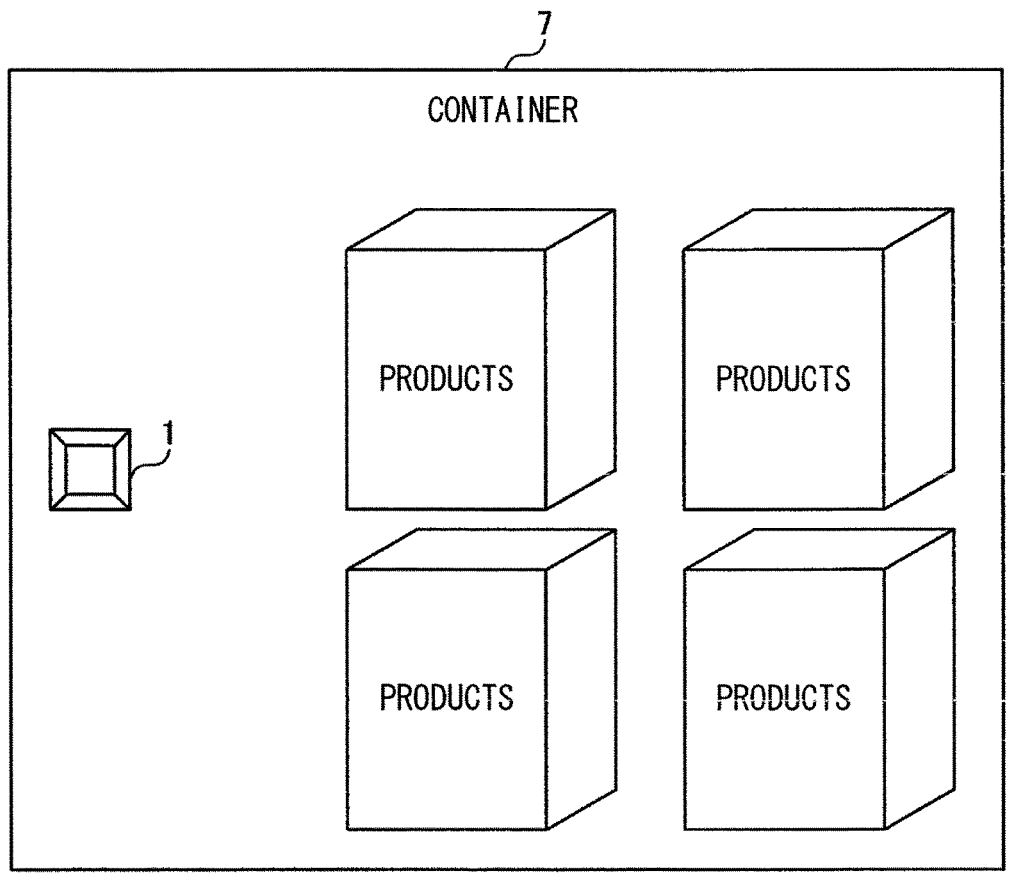
FIG. 16 shows an example of a container equipped with a sensor in the management system according to the third embodiment of the present disclosure.

FIG. 16 shows an example of a container equipped with a sensor in the management system according to the third embodiment of the present disclosure.

With reference to FIG. 16, for example, in a container 7 installed in the plant 5, the humidity is controlled to be constant in order to maintain the qualities of products stored therein. An administrator causes the sensor unit 1 to monitor the humidity in the container 7 in order to perform quality control for the products stored in the container 7. This sensor unit 1 includes a humidity sensor, for example. In this example, determination information indicates a threshold value, for example.

The administrator performs, on the reception unit 25, an operation to set the mode Mi on the humidity sensor (hereinafter also referred to as "target humidity sensor") provided in the container 7.

Upon receiving the operation performed by the administrator, the reception unit 25 creates operation information indicating the content of the received operation, and outputs the operation information to the mode setting unit 26.

In accordance with the operation information received from the reception unit 25, the mode setting unit 26 sets the determination unit 24 so as to operate in the mode Mi with respect to the sensor information from the target humidity sensor.

Each time the accumulation device 171 accumulates new sensor information received from the target humidity sensor, the determination unit 24 acquires the new sensor information from the accumulation device 171 via the acquisition unit 21.

When the humidity indicated by the acquired new sensor information is not lower than a predetermined upper-limit threshold value or not higher than a predetermined lower-limit threshold value, the determination unit 24 determines that the environment in the container 7 is abnormal.

Upon determining that abnormality has occurred in the container 7, the determination unit 24 creates abnormality detection information including: the ID of the target humidity sensor showing abnormality; and the humidity indicated by the sensor information from the target humidity sensor, and outputs the created abnormality detection information to the display control unit 23 and the notification unit 22.

[Example of Mode Mp]

Referring back to FIG. 2, the sensor unit 1 provided in the facility B in the plant 5 includes, for example, a temperature sensor, a non-contact temperature sensor, and a current sensor.

The administrator performs, on the reception unit 25, an operation to set the mode Mp on the temperature sensor, the non-contact temperature sensor, and the current sensor provided in the facility B.

Upon receiving the operation performed by the administrator, the reception unit 25 creates operation information indicating the content of the received operation, and outputs the operation information to the mode setting unit 26.

In accordance with the operation information received from the reception unit 25, the mode setting unit 26 sets the determination unit 24 so as to operate in the mode Mp with respect to pieces of sensor information obtained from the temperature sensor, the non-contact temperature sensor, and the current sensor provided in the facility B.

Each time the accumulation device 171 accumulates pieces of new sensor information received from the temperature sensor, the non-contact temperature sensor, and the current sensor, the determination unit 24 acquires the new sensor information from the accumulation device 171 via the acquisition unit 21.

Figure 17:
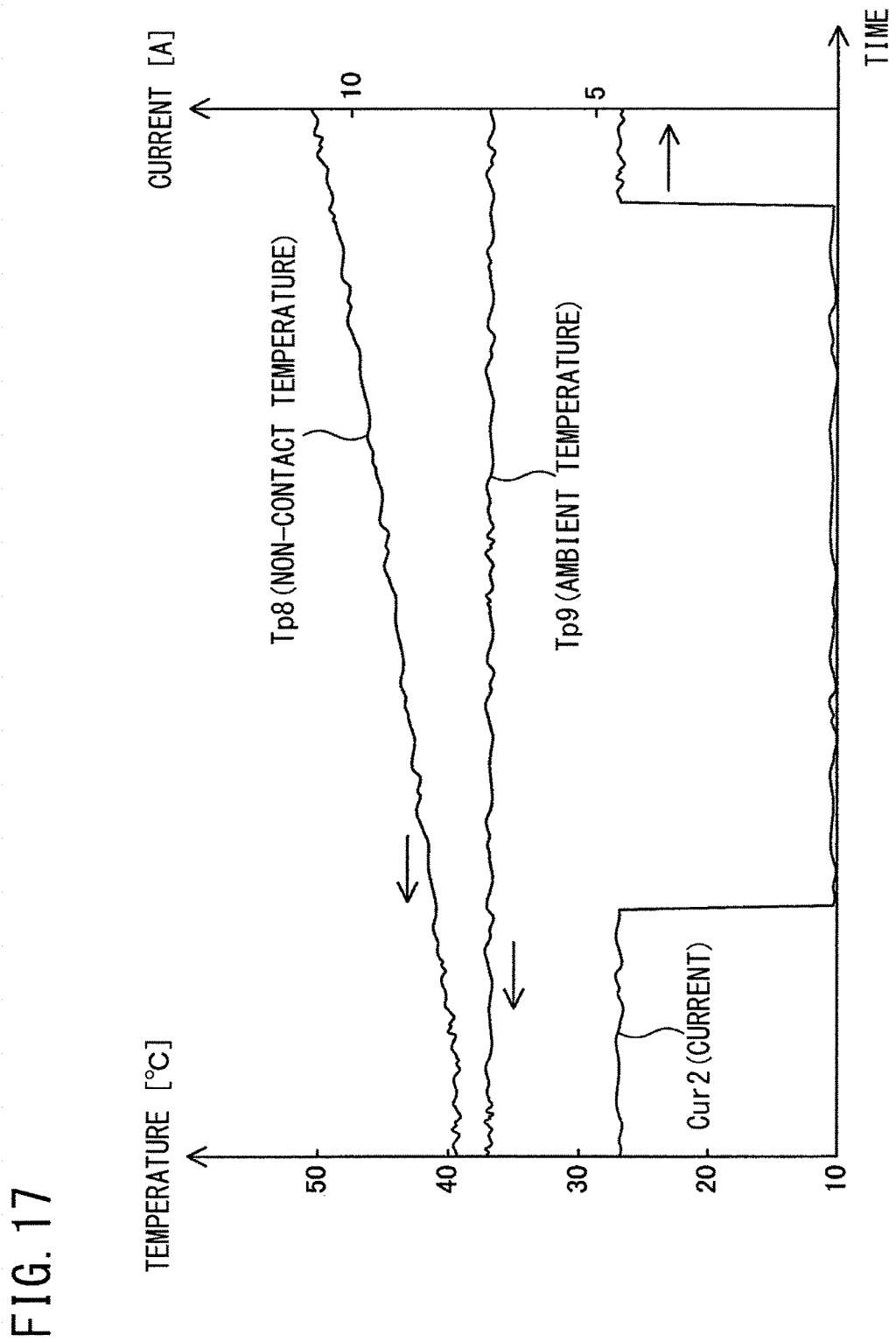
FIG. 17 shows examples of temporal changes of a non-contact temperature, a current, and an ambient temperature measured by a non-contact temperature sensor, a current sensor, and a temperature sensor according to the third embodiment of the present disclosure, respectively.

FIG. 17 shows examples of temporal changes of a non-contact temperature, a current, and an ambient temperature measured by the non-contact temperature sensor, the current sensor, and the temperature sensor, respectively, according to the third embodiment of the present disclosure. In FIG. 17, the vertical axes represent temperature and current, and the horizontal axis represents time.

With reference to FIG. 17, temperature curves Tp8 and Tp9 indicate the temporal changes of the non-contact temperature and the ambient temperature, respectively. A current curve Cur2 indicates the temporal change of the current. In this embodiment, since the non contact temperature sensor, the current sensor, and the temperature sensor are provided in the same facility B, for example, the non-contact temperature, the current, and the ambient temperature should be correlated with each other.

In this example, a target period is an arbitrary period, for example. In addition, for example, information indicating a tendency of a temporal change, in the target period, of each of the current curve Cur2 and the temperature curve Tp9 is the second tendency information. On the other hand, for example, information indicating a tendency of a temporal change, in the target period, of the temperature curve Tp8 is the first tendency information.

The information indicating the tendency of the temporal change, in the target period, of one of the current curve Cur2 and the temperature curve Tp9 may be the first tendency information. In this case, the information indicating the tendency of the temporal change, in the target period, of each of the remaining curve and the temperature curve Tp8 is the second tendency information.

The determination unit 24 acquires the pieces of sensor information of the non-contact temperature sensor, the current sensor, and the temperature sensor, from the accumulation device 171 via the acquisition unit 21, and monitors the temporal change of the non-contact temperature, the temporal change of the current, and the temporal change of the ambient temperature.

More specifically, the determination unit 24 compares the temperature curves Tp8, Tp9 and the current curve Cur2, and recognizes that the non-contact temperature increases while a current hardly flows and the ambient temperature is almost constant. Thus, the determination unit 24 determines that abnormality has occurred in the plant 5.

Upon determining that abnormality has occurred in the plant 5, the determination unit 24 creates abnormality detection information including: the ID of each sensor showing abnormality; and the temporal changes of the non-contact temperature, the current, and the ambient temperature, and outputs the created abnormality detection information to the display control unit 23 and the notification unit 22.

As described above, in the management system according to the third embodiment of the present disclosure, the determination information is a threshold value.

According to the above configuration, since comparison between the sensor information and the determination information can be easily performed, simplification of the determination process regarding the predetermined area can be achieved.

In the management system according to the third embodiment of the present disclosure, the management device 101 has the mode Mi for performing determination regarding the plant 5 by individually using pieces of sensor information, and the mode Mp for performing determination regarding the plant 5 by comparing pieces of sensor information of a plurality of sensors.

According to this configuration, for example, it is possible to selectively use, according to a measurement target, a determination method, based on an absolute value, for determining abnormality in the plant 5 from one type of measurement result, and a determination method, based on a relative value, for determining abnormality in the plant 5 from a plurality of types of measurement results. Thus, the monitoring function with respect to the plant 5 can be improved.

The other configurations and operations are the same as those of the management system according to the first embodiment, and detailed description thereof is not repeated here.

Next, another embodiment of the present disclosure will be described with reference to the drawings. The same or corresponding parts in the drawings are denoted by the same reference characters, and description thereof is not repeated.

Fourth Embodiment

This embodiment relates to a management system which changes a threshold value during operation, in contrast to the management system according to the first embodiment. Except for the contents described below, the management system of this fourth embodiment is identical to the management system of the first embodiment.

Referring back to FIG. 3, the determination unit 24 compares, for example, tendency information indicating a tendency of a temporal change of sensor information, which is based on the sensor information in a target period, with determination information indicating a threshold value. Based on the comparison result, the determination unit 24 performs determination regarding a predetermined area, for example, the plant 5. In addition, the determination unit 24, for example, dynamically sets the threshold value indicated by the determination information.

More specifically, the determination unit 24, for example, sets a plurality of division determination periods into which a determination period is divided, on the basis of values indicated by sensor information, and sets a threshold value for each of the plurality of division determination periods. In addition, the determination unit 24, for example, updates the threshold value on the basis of a statistic of the values indicated by the sensor information acquired by the acquisition unit 21.

Figure 18:
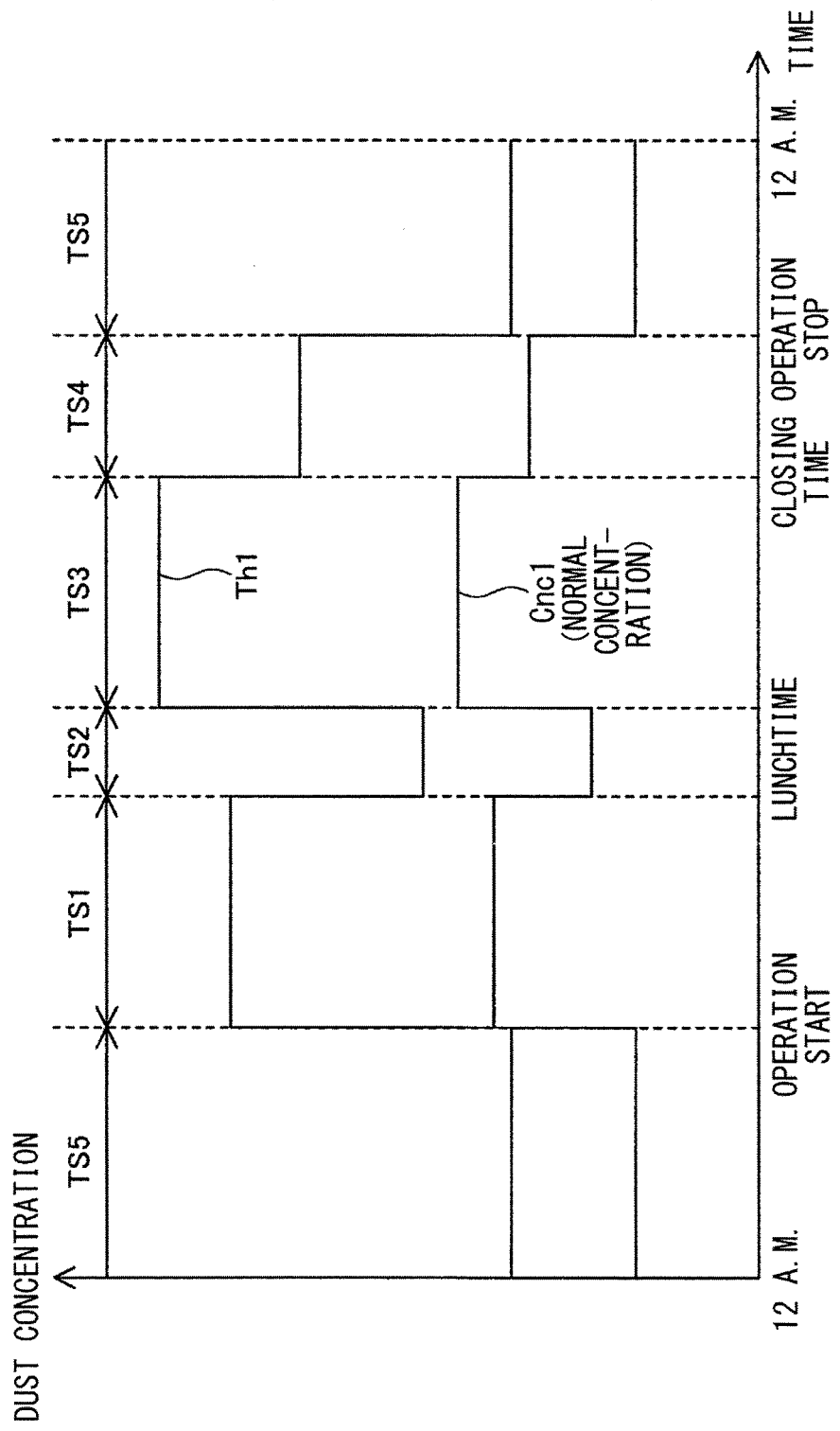
FIG. 18 shows an example of a threshold value used by a determination unit, and an example of a temporal change of a dust concentration measured by a smoke sensor, according to a fourth embodiment of the present disclosure.

FIG. 18 shows examples of threshold values used by the determination unit according to the fourth embodiment of the present disclosure, and an example of a temporal change of the dust concentration measured by a smoke sensor. In FIG. 18, the vertical axis represents the dust concentration, and the horizontal axis represents time.

With reference to FIG. 18, for example, an administrator creates time sections TS1 to TS5, which are examples of the division determination periods, on the basis of an operation schedule of the plant 5, and performs, on the reception unit 25, an operation of registering the created time sections TS1 to TS5.

The reception unit 25 acquires operation information indicating the content of the operation performed by the administrator, and registers, based on the acquired operation information, the time sections TS1 to TS5 in the accumulation device 171, for example.

The determination unit 24 calculates a normal concentration Conc1 for each time section, and sets a threshold value Th1 on the basis of the calculated normal concentration Conc1.

[Operation]

Figure 19:
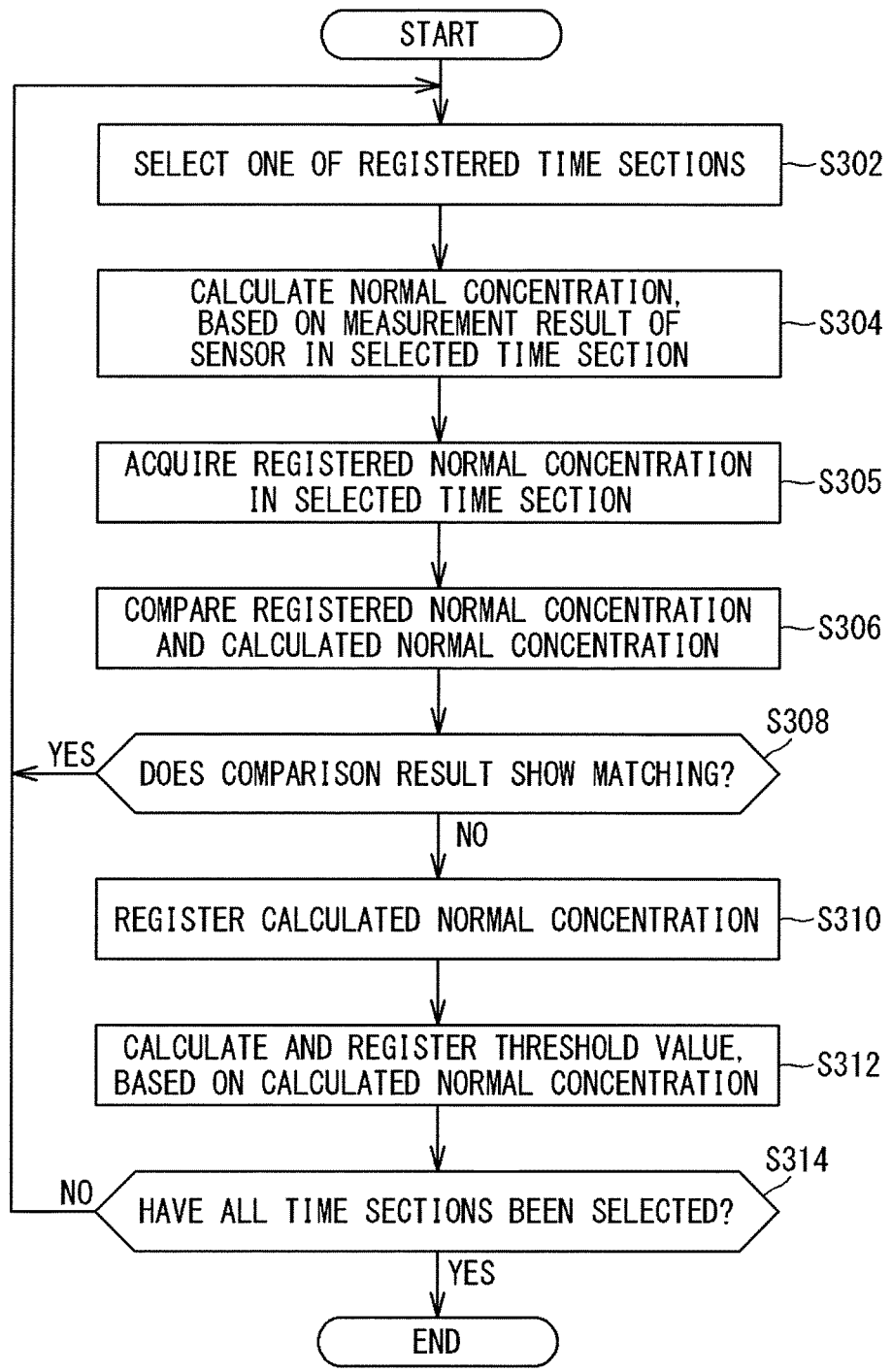
FIG. 19 is a flowchart showing an operation procedure used when the determination unit according to the fourth embodiment of the present disclosure performs a threshold setting process of dynamically setting a threshold value.

FIG. 19 is a flowchart showing an operation procedure used when the determination unit according to the fourth embodiment of the present disclosure performs a threshold setting process of dynamically setting threshold values.

With reference to FIG. 19, the determination unit 24 performs the threshold setting process at 5 o'clock in the morning, for example. In addition, a situation where the dust concentration in the plant 5 is normal is assumed.

First, the determination unit 24 acquires the registered time sections TS1 to TS5 from the accumulation device 171 via the acquisition unit 21, and selects one time section from the acquired time sections TS1 to TS5 (step S302).

Next, the determination unit 24 acquires a measurement result, which is obtained from a sensor as a threshold setting target (hereinafter also referred to as "target sensor") and is a past measurement result in the selected time section, from the accumulation device 171 via the acquisition unit 21. The past measurement result is a measurement result obtained in the previous day, a week ago, a month ago, or the like. The determination unit 24 eliminates abnormality data from the acquired measurement result.

Then, the determination unit 24 calculates a normal concentration in the time section, on the basis of the acquired measurement result. Specifically, the determination unit 24 calculates, as a normal concentration, an average value of the acquired measurement result, for example (step S304).

Next, the determination unit 24 acquires a registered normal concentration of the target sensor in the selected time section, from the accumulation device 171 via the acquisition unit 21 (step S305). If there is no registered normal concentration, the determination unit 24 uses a predetermined value.

Next, the determination unit 24 compares the registered normal concentration in the selected time section, with the presently calculated normal concentration (step S306).

If the comparison result does not match (NO in step S308), the determination unit 24 registers the presently calculated normal concentration in the accumulation device 171 (step S310).

Next, based on the presently calculated normal concentration, the determination unit 24 calculates and registers a threshold value of the target sensor in the selected time section. Specifically, the determination unit 24 calculates, for example, a value twice the presently calculated normal concentration, and registers the calculated value as the threshold value in the accumulation device 171 (step S312).

Next, if there is an unselected time section among the registered time sections TS1 to TS5 (NO in step S314) or when the comparison result matches (YES in step S308), the determination unit 24 selects one unselected time section (step S302).

When all of the registered time sections TS1 to TS5 have already been selected (YES in step S314), the determination unit 24 ends the threshold setting process.

The order of steps S304 and S306 is not limited to the above order, and steps S304 and S306 may be reversed.

Although the administrator creates the time sections, the present disclosure is not limited thereto. The determination unit 24 may automatically set time sections.

Although the determination unit 24 in step S304 calculates an average value of the measurement result as a normal concentration, the present disclosure is not limited thereto. Another statistic, such as a median of the measurement result, may be calculated as a normal concentration.

Figure 20:
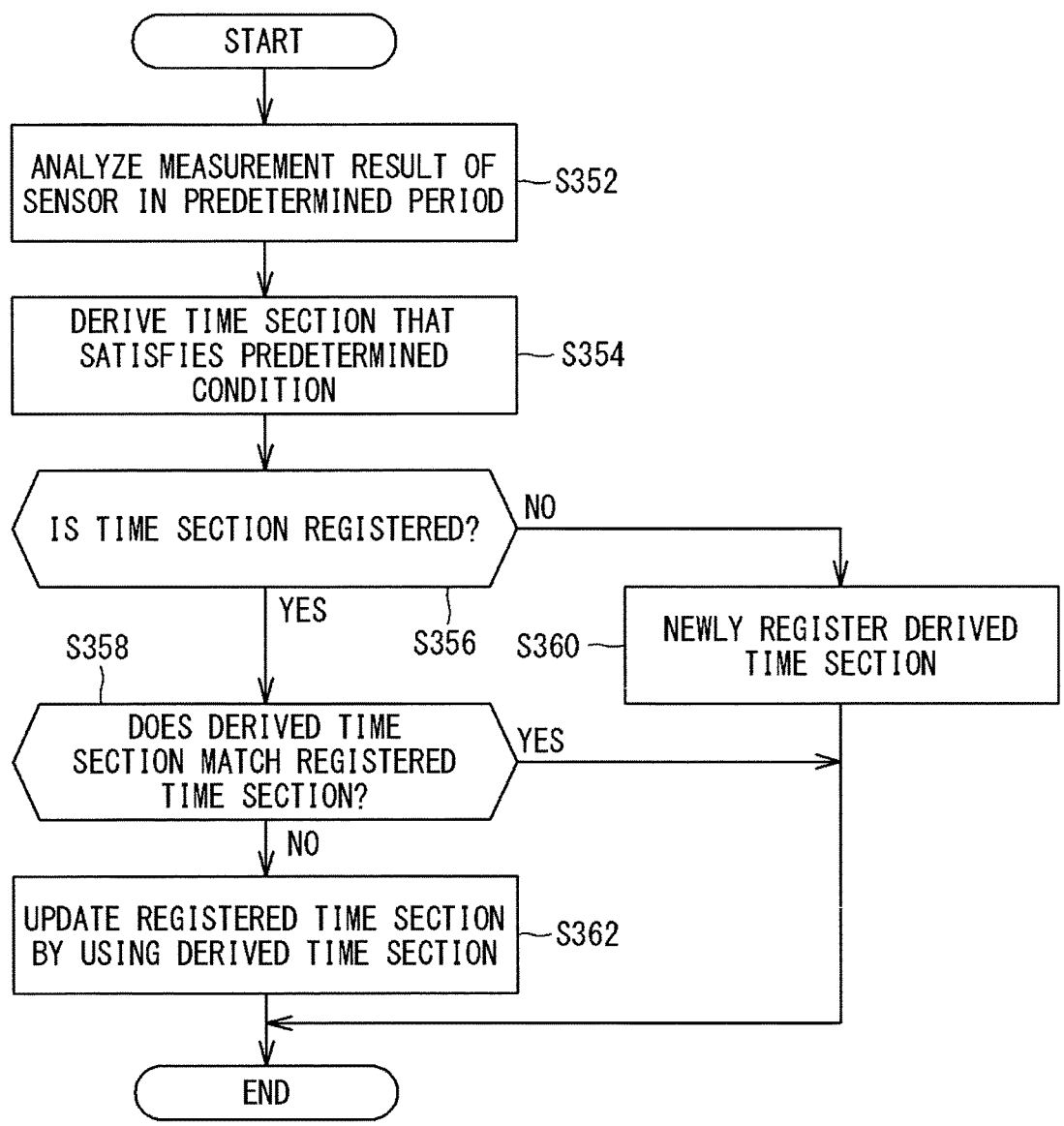
FIG. 20 is a flowchart showing an operation procedure used when the determination unit according to the fourth embodiment of the present disclosure performs a time section setting process for automatically setting time sections.

FIG. 20 is a flowchart showing an operation procedure used when the determination unit according to the fourth embodiment of the present disclosure performs a time section setting process of automatically setting time sections.

With reference to FIG. 20, first, the determination unit 24 acquires a measurement result of a sensor in a predetermined period from the accumulation device 171 via the acquisition unit 21 (step S352). The predetermined period is, for example, a period for each day type, a weekly-basis period, a monthly-basis period, a yearly-basis period, etc. The measurement result is a measurement result in a normal state, for example.

Next, the determination unit 24 derives a time section that satisfies a predetermined condition. Specifically, the determination unit 24 derives, for example, a time section in which the measurement result maintains substantially the same level (step S354).

Next, when time sections have been registered (YES in step S356), the determination unit 24 checks whether or not the derived time section matches a registered time section (step S358).

When the derived time section does not match the registered time section (NO in step S358), the determination unit 24 updates the registered time section by using the derived time section (step S362).

On the other hand, when no time sections have been registered (NO in step S356), the determination unit 24 newly registers the derived time section (step S360).

The determination unit 24 ends the time section setting process when the derived time section has been newly registered (step S360), when the derived time section matches the registered time section (YES in step S358), or when the registered time section has been updated by using the derived time section (step S362).

According to this configuration, since the time sections are automatically set as described above, even when a process change or rearrangement of facilities is performed, the work load on the administrator can be reduced.

Referring back to FIG. 3, for example, the determination unit 24 compares a value indicated by sensor information with a threshold value, and performs determination regarding the plant 5 on the basis of the comparison result.

Specifically, for example, each time a time section has arrived, the determination unit 24 acquires a threshold value for the time section from the accumulation device 171 via the acquisition unit 21. During the time section, the determination unit 24 monitors the measurement result of the smoke sensor acquired from the accumulation device 171 via the acquisition unit 21, and compares the acquired threshold value with the dust concentration detected by the smoke sensor corresponding to the threshold value.

When the dust concentration detected by the smoke sensor reaches or exceeds the threshold value, the determination unit 24 determines that abnormality has occurred in the plant 5.

In the management system according to the fourth embodiment of the present disclosure, the determination unit 24 updates the threshold value on the basis of a statistic of the values indicated by the sensor information acquired by the acquisition unit 21. However, the present disclosure is not limited thereto. For example, the determination unit 24 may further acquire a result of determination by the user as to whether or not a tendency of a temporal change of sensor information, which is based on the sensor information, is normal, and may correct the threshold value registered in advance, on the basis of the acquired determination result. Specifically, the determination unit 24, based on a user operation to correct a threshold value in a certain division determination period, updates the threshold value.

As described above, in the management system according to the fourth embodiment of the present disclosure, the determination information indicates a threshold value. The management device 101 dynamically sets the threshold value indicated by the determination information.

According to this configuration, for example, even in a case where the temperature, the dust concentration (the amount of dust), or the like in the plant 5 changes with lapse of time, a threshold value according to the changed environment can be set, whereby determination regarding the plant 5 can be appropriately performed based on the comparison result.

In the management system according to the fourth embodiment of the present disclosure, the management device 101 sets a threshold value for each of a plurality of division determination periods into which a determination period, during which determination is to be performed, is divided.

According to this configuration, a threshold value can be set for each division determination period during which the environment is stable, in accordance with, for example, the operation schedule of the plant 5, the season, etc., whereby determination regarding the plant 5 can be performed more appropriately.

In the management system according to the fourth embodiment of the present disclosure, each division determination period is set based on the values indicated by the sensor information.

According to this configuration, it is possible to set a plurality of division determination periods suitable for determination using threshold values, for example, division determination periods in each of which the environment, the state, or the like of the facility is substantially constant.

In the management system according to the fourth embodiment of the present disclosure, the management device 101 updates the threshold value on the basis of a statistic of the values indicated by the acquired sensor information.

According to this configuration, for example, a threshold value can be updated based on a statistic of values indicated by sensor information from a sensor provided in a facility. Therefore, even in a case where it is difficult to uniformly determine threshold values of sensors because new facilities and old facilities coexist in the plant 5, an appropriate threshold value, in which the state of each facility is reflected, can be automatically set.

The other configurations and operations are the same as those of the management system according to the first embodiment, and detailed description thereof is not repeated here.

Next, another embodiment of the present disclosure will be described with reference to the drawings. The same or corresponding parts in the drawings are denoted by the same reference characters, and description thereof is not repeated.

Fifth Embodiment

This embodiment relates to a management system which determines abnormal vibration in a facility, in contrast to the management system according to the first embodiment. Except for the contents described below, the management system of this fifth embodiment is identical to the management system of the first embodiment.

Figure 21:
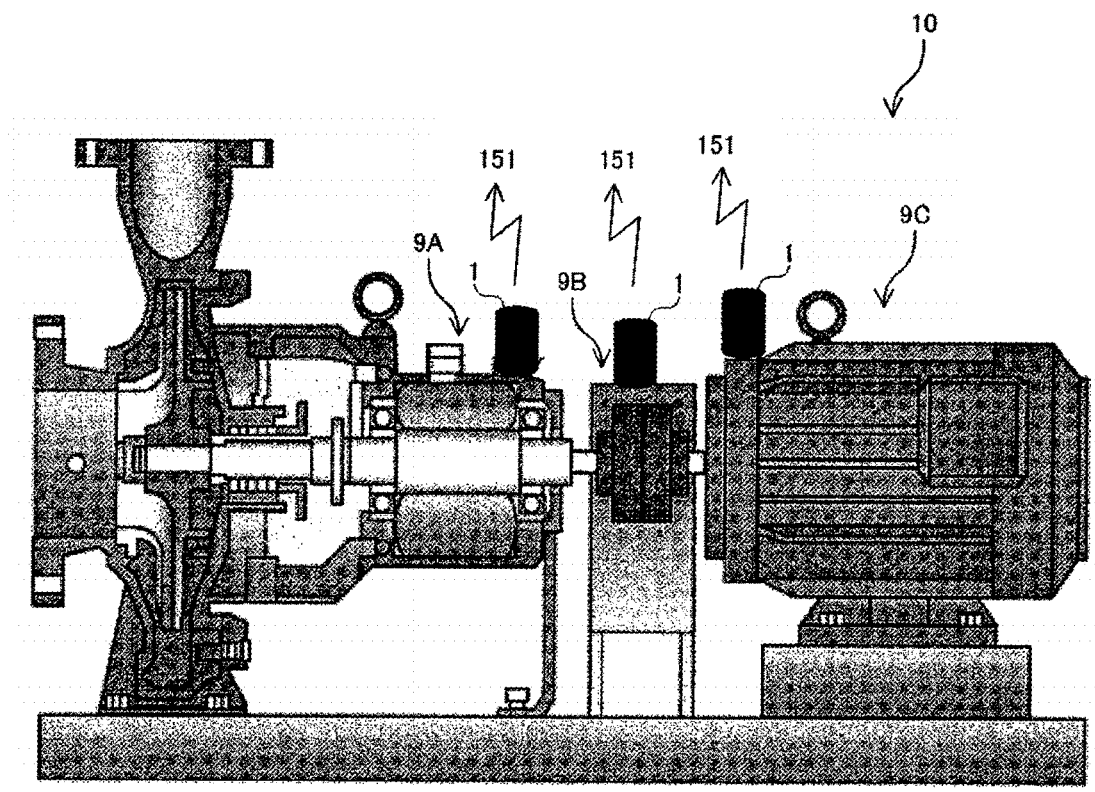
FIG. 21 shows an example of a facility equipped with sensors in the management system according to a fifth embodiment of the present disclosure.

FIG. 21 shows an example of a facility equipped with sensors in the management system according to the fifth embodiment of the present disclosure. FIG. 21 shows a facility 10 installed in the plant 5.

With reference to FIG. 21, the facility 10 includes rotation units 9A, 9B, and 9C. Hereinafter, each of the rotation units 9A, 9B, and 9C is also referred to as a rotation unit 9.

The rotation unit 9C is a motor, for example. Rotation power generated by the rotation unit 9C is transmitted via the rotation units 9B and 9A.

Three sensor units 1, each including an acceleration sensor, for example, are mounted to the rotation units 9A, 9B, and 9C, respectively.

Figure 22:
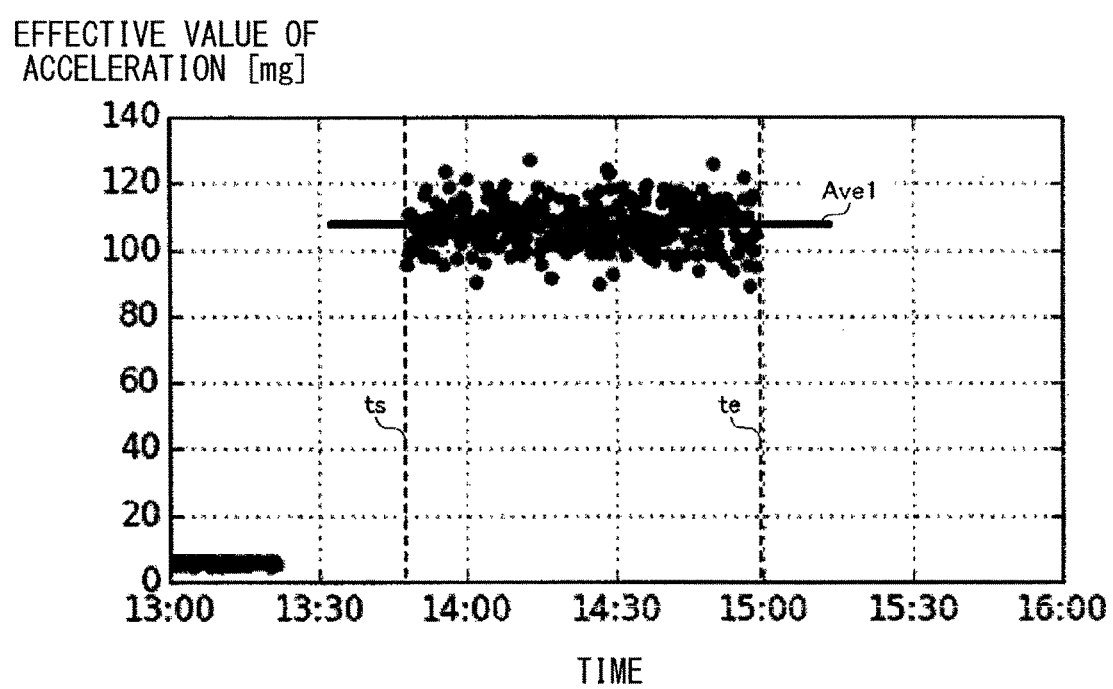
FIG. 22 shows an example of a measurement result of an acceleration sensor in the management system according to the fifth embodiment of the present disclosure.

FIG. 22 shows an example of a measurement result of an acceleration sensor in the management system according to the fifth embodiment of the present disclosure. In FIG. 22, the vertical axis represents the effective value of acceleration, and the horizontal axis represents time.

With reference to FIG. 22, the determination unit 24 in the management device 101 performs a temporal process using sensor information acquired by the acquisition unit 21 to perform determination of abnormal vibration in the facility 10, for example.

The determination unit 24 performs abnormality determination by comparing, for example, tendency information indicating a temporal change that is estimated from latest sensor information acquired by the acquisition unit 21 and from a plurality of pieces of sensor information acquired prior to the latest one, with determination information registered in advance. Specifically, the determination unit 24, for example, compares the tendency information with the determination information, and performs abnormality determination on the basis of the comparison result.

Specifically, the determination unit 24 compares tendency information indicating a tendency of a temporal change of sensor information, which is based on the sensor information in a target period, with determination information indicating a threshold value, and performs determination of abnormal vibration in the facility 10 on the basis of the comparison result. In this example, for example, the tendency information includes information based on a result of a statistical process performed on the sensor information in the target period. This statistical process is an averaging process, for example.

More specifically, for example, the determination unit 24 calculates, for each target period, a statistic of values indicated by a plurality of pieces of sensor information from the same acceleration sensor in the target period, and compares the calculated statistic with a threshold value Ths1. Then, for example, the determination unit 24 performs, for each target period, determination of abnormal vibration in the facility 10 on the basis of the comparison result.

In this embodiment, processing of sensor information from the acceleration sensor of the rotation unit 9A will be described. However, processing of sensor information from the acceleration sensors of the other rotation units 9 is the same as that for the rotation unit 9A.

For example, the determination unit 24 performs determination of abnormal vibration in the facility 10 every day. More specifically, the determination unit 24 sets, as a target period, a period from an operation start timing ts to an operation end timing te of the facility 10 in one day, and acquires pieces of sensor information in the set target period from the accumulation device 171 via the acquisition unit 21.

Based on the pieces of sensor information acquired, the determination unit 24 generates a waveform of acceleration for each predetermined time, and calculates an effective value of each waveform generated.

Then, the determination unit 24 calculates, as a representative value in the target period, an average value Ave1 of the generated effective values. The determination unit 24 may calculate, as a representative value, not only the average value but also a statistic such as a median, a moving average value, a variance, or standard deviation.

The determination unit 24 compares the calculated average value Ave1 with the threshold value Ths1. The threshold value Ths1 is set based on an average value Ls at the beginning of the operation of the facility 10, for example. Specifically, the threshold value Ths1 is twice or four times the average value Ls, for example. The threshold value Ths1 may be a predetermined value.

For example, when the average value Ave1 is not smaller than the threshold value Ths1, the determination unit 24 determines that abnormal vibration has occurred in the rotation unit 9A.

Upon determining that abnormality has occurred in the rotation unit 9A, the determination unit 24 creates abnormality detection information including: the ID of the acceleration sensor showing abnormality, and the effective value of acceleration, and outputs the created abnormality detection information to the display control unit 23 and the notification unit 22.

[Modification 1 of Abnormal Vibration Determination Process]

Figure 23:
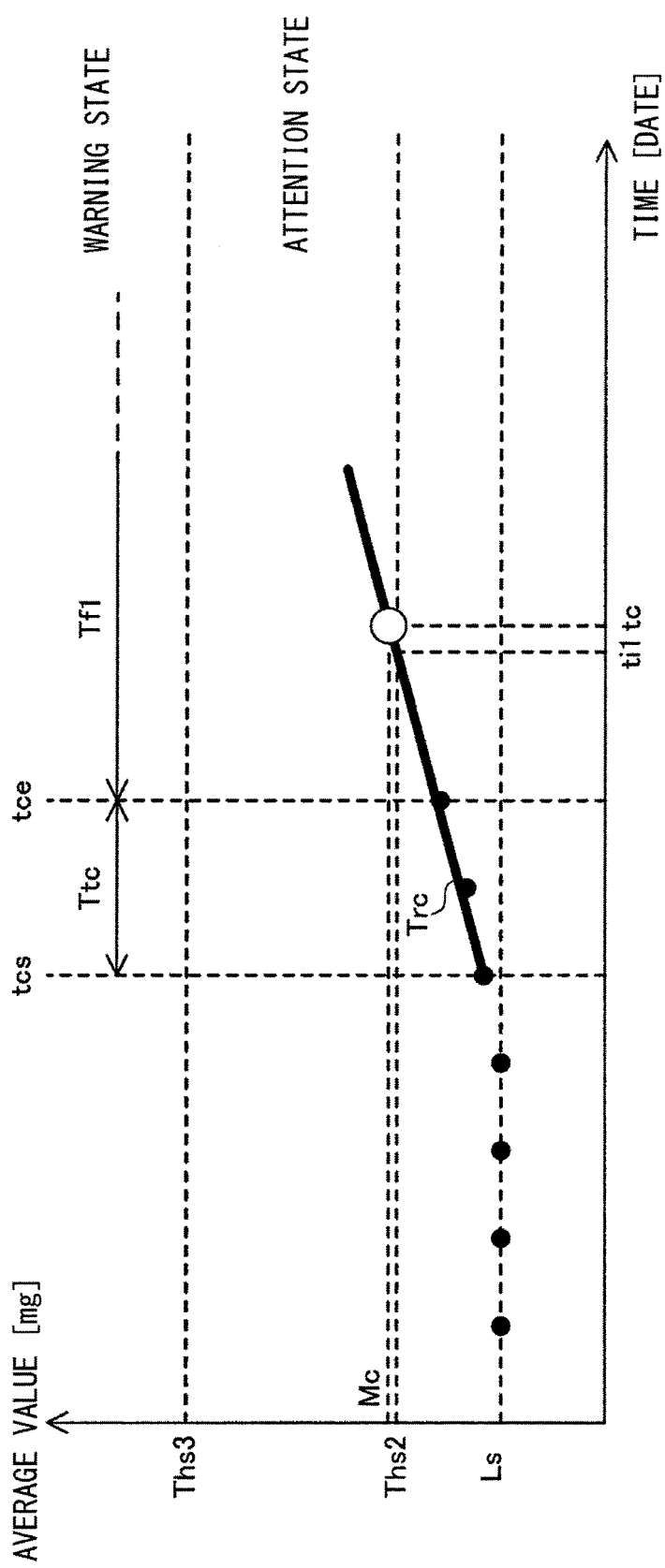
FIG. 23 shows an example of a measurement result of an acceleration sensor in the management system according to the fifth embodiment of the present disclosure.

FIG. 23 shows an example of a measurement result of an acceleration sensor in the management system according to the fifth embodiment of the present disclosure. In FIG. 23, the vertical axis represents the average value of effective values of acceleration, and the horizontal axis represents time.

With reference to FIG. 23, in this example, the determination unit 24 performs abnormality determination by comparing, for example, future sensor information that is estimated from the latest sensor information acquired by the acquisition unit 21 and from a plurality of pieces of sensor information acquired prior to the latest one, with determination information registered in advance. Specifically, for example, the determination unit 24 compares the future sensor information with the determination information, and performs abnormality determination on the basis of the comparison result.

In other words, for example, the tendency information includes prediction tendency information indicating a tendency of a temporal change, in a future period Tf1 after a target period, which is predicted based on a result of a statistical process performed on sensor information in the target period.

Specifically, the determination unit 24 performs, for example, with respect to a plurality of target periods, predetermined arithmetic processing on values indicated by a plurality of pieces of sensor information from the same acceleration sensor in each target period, thereby calculating a representative value in the target period. Then, based on the representative values in the respective target periods, the determination unit 24 predicts a representative value in the future period Tf1 after the target periods. Then, based on the prediction result, the determination unit 24 performs, for example, determination of abnormal vibration in the facility 10.

More specifically, the determination unit 24 calculates, for example, as a representative value in each target period, a statistic (in this case, an average value) of the values indicated by the plurality of pieces of sensor information from the same acceleration sensor in each target period, and predicts a representative value in the future period Tf1 on the basis of the representative values in the respective target periods. Then, for example, the determination unit 24 compares the predicted representative value with a threshold value, and performs determination of abnormal vibration in the facility 10 on the basis of the comparison result.

In FIG. 23, the representative values in the respective target periods are plotted with dates of the target periods, for example.

In this modification, processing of the sensor information from the acceleration sensor of the rotation unit 9A will be described. However, processing of sensor information from the acceleration sensors of the other rotation units 9 is the same as that for the rotation unit 9A.

The determination unit 24 sets, for example, a threshold value Ths2 that is twice the average value Ls, and a threshold value Ths3 that is four times the average value Ls. A region not smaller than the threshold value Ths2 and smaller than the threshold value Ths3 corresponds to an attention state. A region not smaller than the threshold value Ths3 corresponds to a warning state. The threshold values Ths2 and Ths3 may be predetermined values.

The determination unit 24 predicts, for example, a representative value in the future period Tf1 after a period Ttc that is from a date tcs at which the representative value started to increase from Ls to a date tce two days after the date tcs. This prediction is performed, for example, after the day when a representative value at the date tce was calculated, and before calculation of a representative value in the next day.

More specifically, the determination unit 24 calculates, for example, by using the representative values included in the period Ttc, a trend line Trc which is an example of the tendency of the temporal change in the future period Tf1, indicated by the prediction tendency information. In this modification, the trend line Trc is a straight line, and is calculated by using a least squares method or the like, for example. The trend line Trc is not limited to a straight line, and may be a curved line.

The determination unit 24 predicts a representative value in the future period Tf1 on the basis of the calculated trend line Trc. Specifically, the determination unit 24 calculates, for example, a timing at which the determination result indicates abnormality. More specifically, the determination unit 24 calculates, for example, a timing ti1, after the target period, at which the result of comparison between the prediction tendency information and the determination information satisfies a predetermined condition.

Specifically, the determination unit 24 calculates, for example, a first timing ti1 at which the trend line Trc reaches or exceeds the threshold value Ths2. Then, the determination unit 24, for example, calculates a date tc of the day including the timing ti1, and calculates, as a representative value in the future period Tf1, a value Mc indicated by the trend line Trc at the calculated date tc.

Then, the determination unit 24 creates, for example, abnormality detection information including an indication that the representative value may reach or exceed the threshold value Ths2 at the timing ti1 in the date tc and may shift into the attention state. The determination unit 24 outputs the created abnormality detection information to the display control unit 23 and the notification unit 22.

Figure 24:
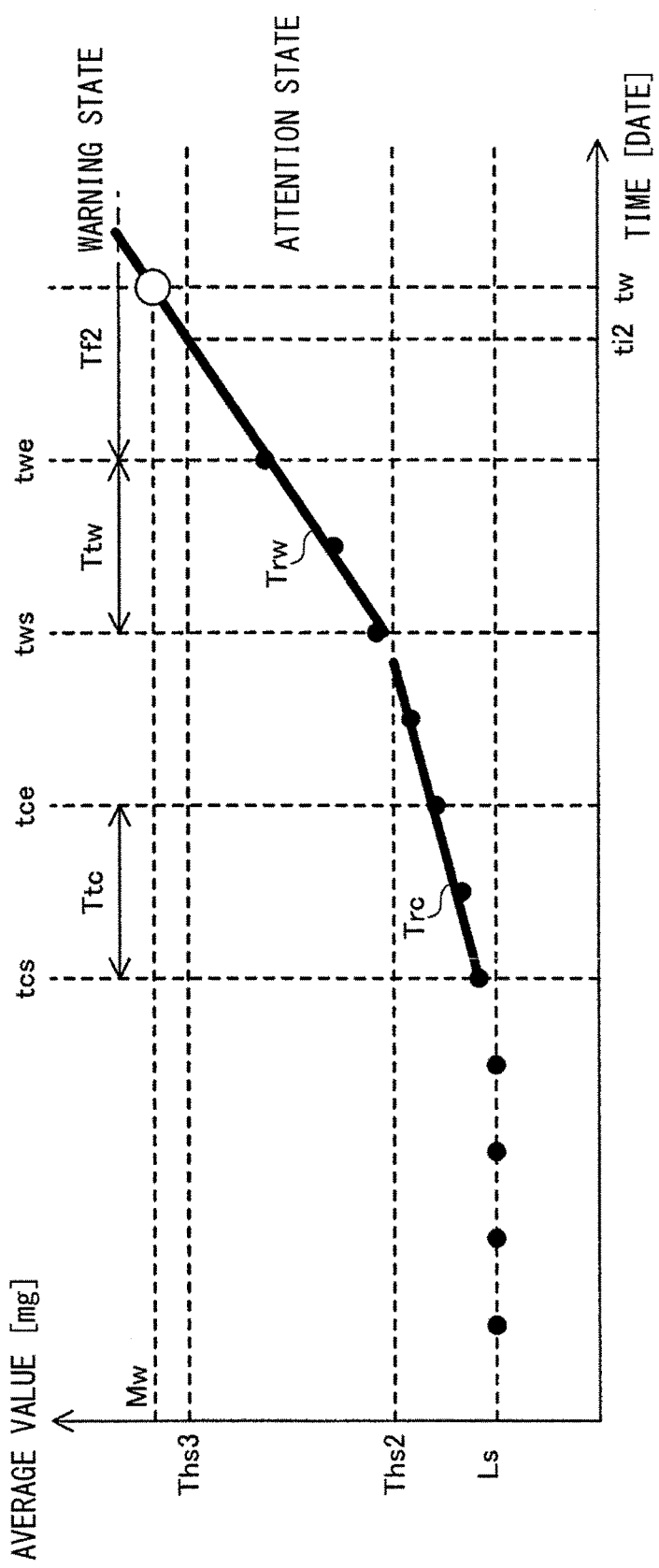
FIG. 24 shows an example of a measurement result of an acceleration sensor in the management system according to the fifth embodiment of the present disclosure.

FIG. 24 shows an example of a measurement result of an acceleration sensor in the management system according to the fifth embodiment of the present disclosure. The way of viewing FIG. 24 is the same as the way of viewing FIG. 23.

In FIG. 24, the representative values in the target periods shown in FIG. 23 and representative values in target periods after the above target periods are plotted with dates of the respective target periods, for example.

With reference to FIG. 24, the determination unit 24 predicts, for example, a representative value in a future period Tf2 after a period Ttw that is from a date tws at which a representative value is in the attention state to a date twe two days after the date tws. This prediction is performed, for example, after the day when a representative value at the date twe was calculated, and before calculation of a representative value in the next day.

More specifically, the determination unit 24 calculates, for example, by using the representative values included in the period Ttw, a trend line Trw which is an example of the tendency of the temporal change in the future period Tf2, indicated by the prediction tendency information. In this modification, the trend line Trw is a straight line, and is calculated by using a least squares method or the like, for example. The trend line Trw is not limited to a straight line, and may be a curved line.

The determination unit 24 predicts a representative value in the future period Tf2 on the basis of the calculated trend line Trw. More specifically, the determination unit 24 calculates, for example, a timing ti2, after the target period, at which the result of comparison between the prediction tendency information and the determination information satisfies a predetermined condition.

Specifically, the determination unit 24 calculates, for example, a first timing ti2 at which the trend line Trw reaches or exceeds the threshold value Ths3. Then, the determination unit 24, for example, calculates a date tw of the day including the timing ti2, and calculates, as a representative value in the future period Tf2, a value Mw indicated by the trend line Trw at the calculated date tw.

Then, the determination unit 24 creates, for example, abnormality detection information including an indication that the representative value may reach or exceed the threshold value Ths3 at the timing ti2 in the date tw and may shift into the warning state. The determination unit 24 outputs the created abnormality detection information to the display control unit 23 and the notification unit 22.

The determination unit 24 is configured to calculate the trend line by using the least squares method, and predict the representative value in the future period on the basis of the calculated trend line. However, the present disclosure is not limited thereto. The determination unit 24 may be configured to predict a representative value in a certain period by using, for example, a method using pattern matching, a method using a statistic difference, a method using a neural network, etc.

The determination unit 24 is configured to calculate, based on the trend line Trc, the first timing ti1 at which the trend line Trc reaches or exceeds the threshold value Ths2 as shown in FIG. 23. However, the determination unit 24 may be configured to calculate the timing ti1, and calculate a first timing at which the trend line Trc reaches or exceeds the threshold value Ths3.

As shown in FIG. 23, the determination unit 24 is configured to perform the prediction process including: calculating the trend line Trc after the day when the representative value at the date tce was calculated, and before calculation of the representative value in the next day; and predicting the representative value in the future period. However, the present disclosure is not limited thereto. The determination unit 24 may perform the prediction process for each predetermined period such as every day, every week, every month, etc. Alternatively, the determination unit 24 may perform the prediction process at a timing when pieces of new sensor information enough for the calculation of a representative value have been accumulated in the accumulation device 171. Still alternatively, the determination unit 24 may perform the prediction process at a timing when a difference between the calculated representative value and the trend line becomes not smaller than a predetermined value. The same applies to the prediction process using the trend line Trw shown in FIG. 24.

The determination unit 24 is configured to calculate the trend line Trc on the basis of the representative values for three days within the period Ttc, as shown in FIG. 23. However, the present disclosure is not limited thereto. The determination unit 24 may be configured to calculate the trend line Trc on the basis of the representative values for two days, or the representative values for four or more days. The same applies to the calculation process using the trend line Trw shown in FIG. 24.

The determination unit 24 is configured to predict the tendency, that is, calculate the trend line, of the temporal change of the sensor information in the future period, on the basis of the representative values based on the pieces of sensor information in the target periods. However, the present disclosure is not limited thereto. The determination unit 24 may be configured to calculate a trend line on the basis of sensor information in one or a plurality of target periods, without using such representative values.

[Modification 2 of Abnormal Vibration Determination Process]

Figure 25:
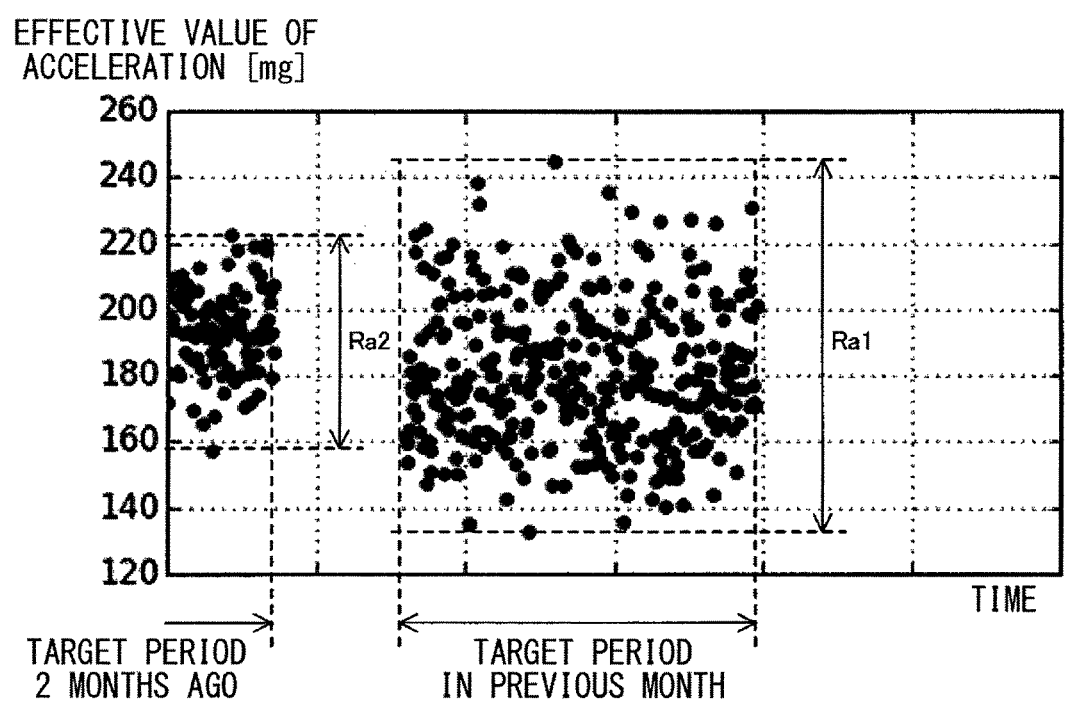
FIG. 25 shows an example of a measurement result of an acceleration sensor in the management system according to the fifth embodiment of the present disclosure.

FIG. 25 shows an example of a measurement result of an acceleration sensor in the management system according to the fifth embodiment of the present disclosure. In FIG. 25, the vertical axis represents the effective value of acceleration, and the horizontal axis represents time.

With reference to FIG. 25, the determination unit 24, for example, compares tendency information with determination information indicating a threshold value, and performs determination of abnormal vibration in the facility 10 on the basis of the comparison result. In this modification, for example, the tendency information includes information based on the size of a range of a temporal change of sensor information in a target period.

More specifically, the determination unit 24, for example, calculates, for each of target periods, the size of a range of values indicated by a plurality of pieces of sensor information from the same acceleration sensor in the target period, and compares the calculated size with a threshold value Thr1. Then, the determination unit 24, for example, performs, for each target period, determination of abnormal vibration in the facility 10 on the basis of the comparison result.

In this modification, processing of sensor information from the acceleration sensor of the rotation unit 9A will be described. However, processing of sensor information from the acceleration sensors of the other rotation units 9 is the same as that for the rotation unit 9A.

For example, the determination unit 24 sets a target period in each month, and acquires pieces of sensor information in the set target period from the accumulation device 171 via the acquisition unit 21.

Based on the acquired pieces of sensor information, the determination unit 24 generates a waveform of acceleration for each predetermined time, and calculates an effective value of each generated waveform.

Then, the determination unit 24 calculates, for example, a difference between a maximum value and a minimum value of the generated effective values, as the size of the range. In this modification, the determination unit 24 calculates a size Ra1 as the size of the range in a target period in the previous month.

The determination unit 24 compares the calculated size Ra1 of the range with the threshold value Thr1. The threshold value Thr1 is set on the basis of the size of the range at the beginning of the operation of the facility 10, for example. Specifically, the threshold value Thr1 is twice or four times the size Lr of the range at the beginning of the operation of the facility 10, for example. The threshold value Thr1 may be a predetermined value.

When the size Ra1 of the range is not smaller than the threshold value Thr1, the determination unit 24 determines that abnormal vibration has occurred in the rotation unit 9A.

Upon determining that abnormality has occurred in the rotation unit 9A, the determination unit 24, for example, creates abnormality detection information including: the ID of the acceleration sensor showing abnormality; and the effective value of acceleration, and outputs the created abnormality detection information to the display control unit 23 and the notification unit 22.

[Modification 3 of Abnormal Vibration Determination Process]

In this modification, for example, tendency information includes prediction tendency information indicating a tendency of a temporal change in a future period after a target period, which is predicted based on the size of a range of a temporal change of sensor information in the target period.

More specifically, the determination unit 24, for example, calculates, as a representative value in each of target periods, the size of a range of values indicated by a plurality of pieces of sensor information from the same acceleration sensor in the target period, and predicts a representative value in a future period after the target periods on the basis of the representative values in the target periods. Then, the determination unit 24, for example, compares the predicted representative value with a threshold value, and performs determination of abnormal vibration in the facility 10 on the basis of the comparison result.

In this modification, processing of sensor information from the acceleration sensor of the rotation unit 9A will be described. However, processing of sensor information from the acceleration sensors of the other rotation units 9 is the same as that for the rotation unit 9A.

The determination unit 24 sets, for example, a threshold value Thr2 that is twice the average value Lr, and a threshold value Thr3 that is four times the average value Lr. A region not smaller than the threshold value Thr2 and smaller than the threshold value Thr3 corresponds to an attention state. A region not smaller than the threshold value Thr3 corresponds to a warning state. The threshold values Thr2 and Thr3 may be predetermined values.

The determination unit 24 predicts a representative value of the current month on the basis of the representative values in a period from N months ago to the previous month. Here, N is an integer not less than 2.

More specifically, the determination unit 24 calculates, for example, a size Ra2 as the size of a range, i.e., as a representative value, in a target period two months ago. Likewise, the determination unit 24 calculates sizes RaN to Ra3 (not shown) as representative values in target periods from N months ago to three months ago.

As in the cases shown in FIG. 23 and FIG. 24, the determination unit 24 calculates a trend line by using the calculated representative values RaN to Ra1, and calculates a representative value in a future period on the basis of the calculated trend line and the threshold values Thr2 and Thr3.

[Modification 4 of Abnormal Vibration Determination Process]

FIG. 26 shows an example of a measurement result of an acceleration sensor in the management system according to the fifth embodiment of the present disclosure. In FIG. 26, the vertical axis represents intensity, and the horizontal axis represents frequency.

With reference to FIG. 26, the determination unit 24, for example, compares tendency information with determination information indicating a threshold value, and performs determination of abnormal vibration in the facility 10 on the basis of the comparison result. In this modification, for example, the tendency information includes information based on the magnitude of a frequency component in a temporal change of sensor information in a target period.

More specifically, the determination unit 24 calculates, for example, for each of target periods, a frequency distribution of values indicated by a plurality of pieces of sensor information, arranged in time sequence, from the same acceleration sensor in the target period, and compares the magnitude of a predetermined frequency component in the calculated frequency distribution with a threshold value. Then, based on the comparison result, the determination unit 24 performs, for example, determination of abnormal vibration in the facility 10 for each target period.

In this modification, processing of sensor information from the acceleration sensor of the rotation unit 9A will be described. However, processing of sensor information from the acceleration sensors of the other rotation units 9 is the same as that for the rotation unit 9A.

For example, the determination unit 24 sets, as a target period, a predetermined sampling period in each month, and acquires pieces of sensor information in the set target period from the accumulation device 171 via the acquisition unit 21.

Based on the acquired sensor information, the determination unit 24 generates a waveform of acceleration in the sampling period, and subjects the generated waveform to FFT (Fast Fourier Transform), thereby generating a power spectrum as a frequency distribution.

The determination unit 24 compares the magnitude of a predetermined frequency component (in this case, the magnitude of a component at frequency Rf1) in the power spectrum, with a threshold value Thf1. The threshold value Thf1 is set based on, for example, the magnitude of the component at frequency Rf1 at the beginning of the operation of the facility 10. Specifically, the threshold value Thf1 is, for example, twice or four times the magnitude of the component at frequency Rf1 at the beginning of the operation of the facility 10. The threshold value Thf1 may be a predetermined value.

For example, when the magnitude of the component at frequency Rf1 is not smaller than the threshold value Thf1 as in the previous month, the determination unit 24 determines that abnormal vibration has occurred in the rotation unit 9A.

Upon determining that abnormality has occurred in the rotation unit 9A, the determination unit 24, for example, creates abnormality detection information including: the ID of the acceleration sensor showing abnormality; the frequency Rf1; and the magnitude of this frequency component, and outputs the created abnormality detection information to the display control unit 23 and the notification unit 22.

[Modification 5 of Abnormal Vibration Determination Process]

FIG. 27 shows an example of a measurement result of an acceleration sensor in the management system according to the fifth embodiment of the present disclosure. In FIG. 27, the vertical axis represents intensity, and the horizontal axis represents frequency.

With reference to FIG. 27, in this modification, for example, tendency information includes prediction tendency information indicating a tendency of a temporal change in a future period after a target period, which is predicted based on the magnitude of a frequency component in a temporal change of sensor information in the target period.

More specifically, the determination unit 24 calculates a frequency distribution of values indicated by a plurality of pieces of sensor information, arranged in time sequence, from the same acceleration sensor in a target period, and calculates the magnitude of a predetermined frequency component in the calculated frequency distribution, as a representative value in the target period. The determination unit 24, for example, predicts a representative value in a future period after target periods on the basis of the representative values in the target periods. Then, the determination unit 24, for example, compares the predicted representative value with a threshold value, and performs determination of abnormal vibration in the facility 10 on the basis of the comparison result.

In this modification, processing of sensor information from the acceleration sensor of the rotation unit 9A will be described. However, processing of sensor information from the acceleration sensors of the other rotation units 9 is the same as that for the rotation unit 9A.

In the determination unit 24, for example, a frequency Rf2 is registered as a natural frequency of the rotation unit 9A. The determination unit 24 sets, for example, threshold values Thf2 and Thf3 on the basis of a magnitude Lf of a component at frequency Rf2 at the beginning of the operation of the facility 10.

Specifically, the determination unit 24 sets, for example, a threshold value Thf2 that is ten times the magnitude Lf, and a threshold value Thf3 that is twenty times the magnitude Lf. A region not smaller than the threshold value Thf2 and smaller than the threshold value Thf3 corresponds to an attention state. A region not smaller than the threshold value Thf3 corresponds to a warning state. The threshold values Thf2 and Thf3 may be predetermined values.

The determination unit 24 calculates, for example, a power spectrum seven months ago, a power spectrum four months ago, and a power spectrum in the previous month. Based on the calculated power spectrums seven months ago, four months ago, and in the previous month, the determination unit 24 calculates magnitudes Rf3, Rf2, and Rf1 of the component at frequency Rf2, respectively. Then, the determination unit 24 predicts a representative value two months after the current month, on the basis of the calculated magnitudes Rf3, Rf2, and Rf1.

As in the cases shown in FIG. 23 and FIG. 24, the determination unit 24 calculates a trend line by using the calculated representative values Rf3 to Rf1, and calculates a representative value in the future period on the basis of the calculated trend line and the threshold values Thf2 and Thf3.

In this modification, the magnitude of the component at frequency Rf2 increases by 10 mg every three months, and therefore is predicted to shift into the attention state after about 24 months.

Figure 28:
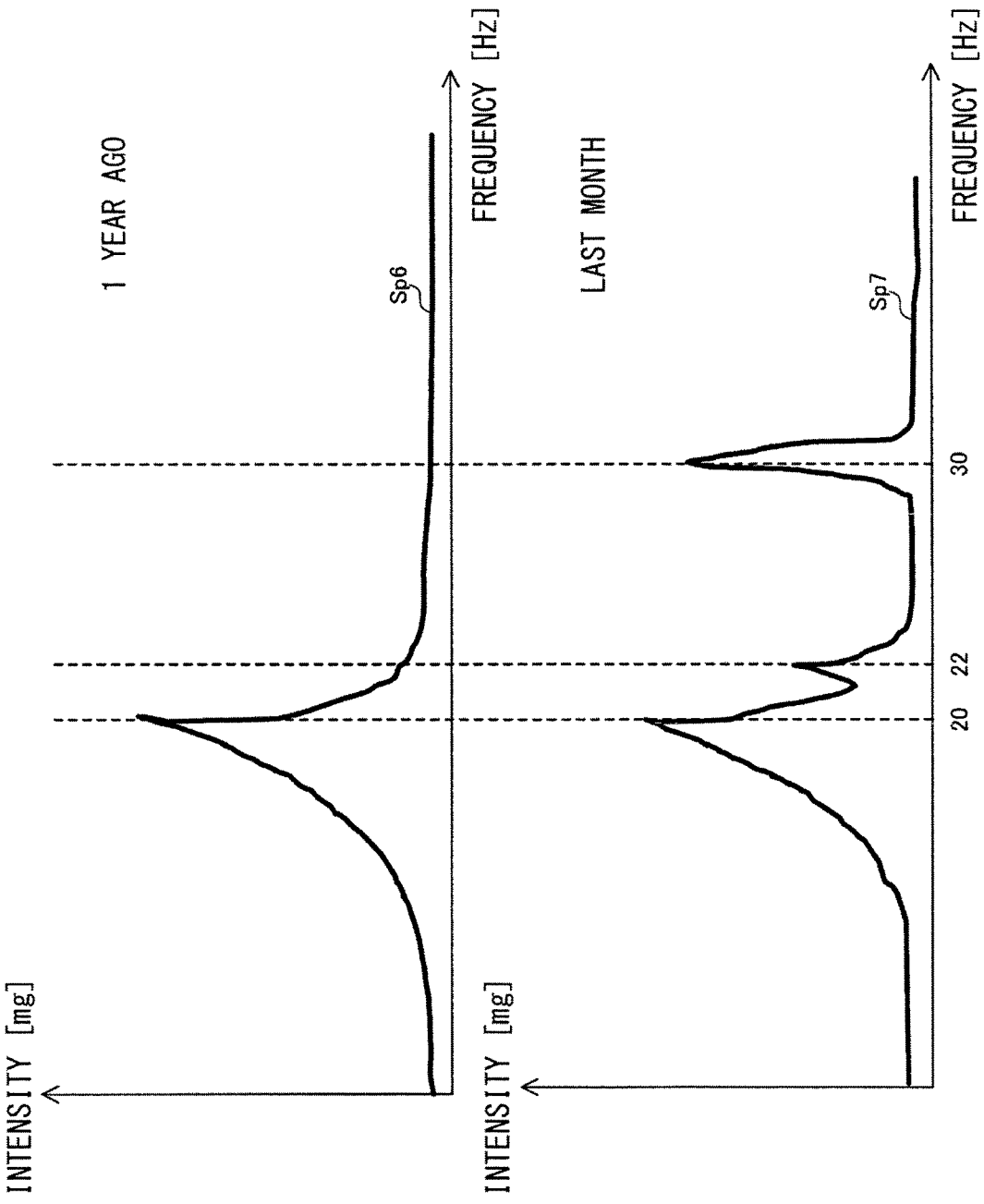
FIG. 28 shows an example of a measurement result of an acceleration sensor in the management system according to the fifth embodiment of the present disclosure.

FIG. 28 shows an example of a measurement result of an acceleration sensor in the management system according to the fifth embodiment of the present disclosure. In FIG. 28, the vertical axis represents intensity, and the horizontal axis represents frequency.

FIG. 28 shows a power spectrum Sp6 in a case where the rotation units 9A, 9B are smoothly operated, and a power spectrum Sp7 in a case where the rotation units 9A, 9B are not smoothly operated. For example, the power spectrums Sp6 and Sp7 are data from the previous month and data from one year ago, respectively.

Each of the rotation units 9A, 9B, and 9C in the facility 10 has a natural frequency. In this modification, the natural frequencies of the rotation units 9A, 9B, and 9C are 22 Hz, 30 Hz, and 20 Hz, respectively.

While the rotation units 9A, 9B are smoothly operated, no peaks appear in the corresponding natural frequencies, as shown by the power spectrum Sp6. However, when the rotation units 9A, 9B are not smoothly operated due to flaw, attachment of foreign matter, or the like, peaks appear in the corresponding natural frequencies, as shown by the power spectrum Sp7.

Since the rotation unit 9C is a motor, a peak appears in the corresponding natural frequency in both the power spectrums Sp6 and Sp7.

As shown by the power spectrum Sp7, the peaks at 22 Hz, 30 Hz, and 20 Hz are monitored in the power spectrums based on the data from the acceleration sensors respectively mounted to the rotation units 9A, 9B, and 9C.

More specifically, in the power spectrum based on the data from the acceleration sensor mounted to the rotation unit 9A, a peak intensity at 22 Hz is greater than the corresponding peak intensity in the other power spectrum. Likewise, in the power spectrum based on the data from the acceleration sensor mounted to the rotation unit 9B, a peak intensity at 30 Hz is greater than the corresponding peak intensity in the other power spectrum. Likewise, in the power spectrum based on the data from the acceleration sensor mounted to the rotation unit 9C, a peak intensity at 20 Hz is greater than the corresponding peak intensity in the other power spectrum.

By registering the aforementioned natural frequencies in the determination unit 24, the determination unit 24 can determine present abnormality and past abnormality in the operation of the rotation unit 9, on the basis of the magnitudes of the peaks in the natural frequencies. In addition, the determination unit 24 can determine future abnormality in the operation of the rotation unit 9, on the basis of temporal changes of the magnitudes of the peaks in the natural frequencies.

[Operation]

Figure 29:
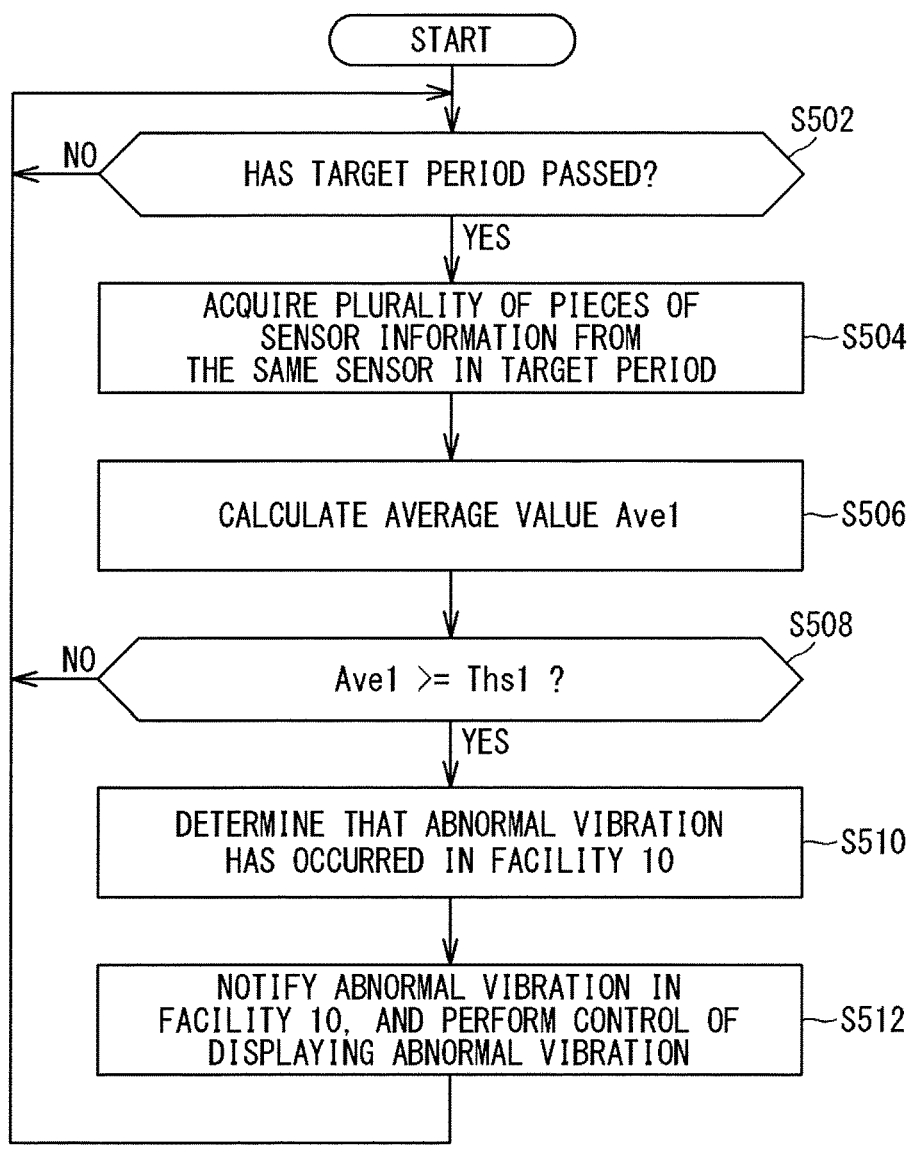
FIG. 29 is a flowchart showing an operation procedure used when the management device according to the fifth embodiment of the present disclosure determines abnormal vibration in a facility.

FIG. 29 is a flowchart showing an operation procedure used when the management device according to the fifth embodiment of the present disclosure determines abnormal vibration in a facility.

With reference to FIG. 29, first, the management device 101 stands by until a target period passes (NO in step S502).

When the target period has passed (YES in step S502), the management device 101 acquires, from the accumulation device 171, a plurality of pieces of sensor information from the same acceleration sensor in the target period (step S504).

Next, based on the acquired plurality of pieces of sensor information, the management device 101 calculates effective values of acceleration, and calculates an average value Ave1 of the calculated effective values (step S506).

Next, when the average value Ave1 is not smaller than the threshold value Ths1 (YES in step S508), the management device 101 determines that abnormal vibration has occurred in the facility 10 (step S510).

Next, the management device 101 notifies the abnormal vibration that has occurred in the facility 10, and performs control of temporally or spatially displaying the abnormal vibration (step S512). Specifically, the management device 101, for example, transmits a mail including the abnormality detection information, performs display control to emphasize the rotation unit 9 abnormally vibrating in the facility 10 shown in FIG. 21, or performs control of displaying the graph shown in FIG. 22.

Next, when the average value Ave1 is smaller than the threshold value Ths1 (NO in step S508) or when the management device 101 has notified the abnormal vibration or has performed display control for the abnormal vibration (step S512), the management device 101 stands by until a new target period passes (NO in step S502).

The management device 101 calculates the average value Ave1 of the effective values in step S506. However, the present disclosure is not limited thereto. The management device 101 may calculate the size of a range of the effective values, or may calculate the magnitude of a component at the frequency Rf1.

Figure 30:
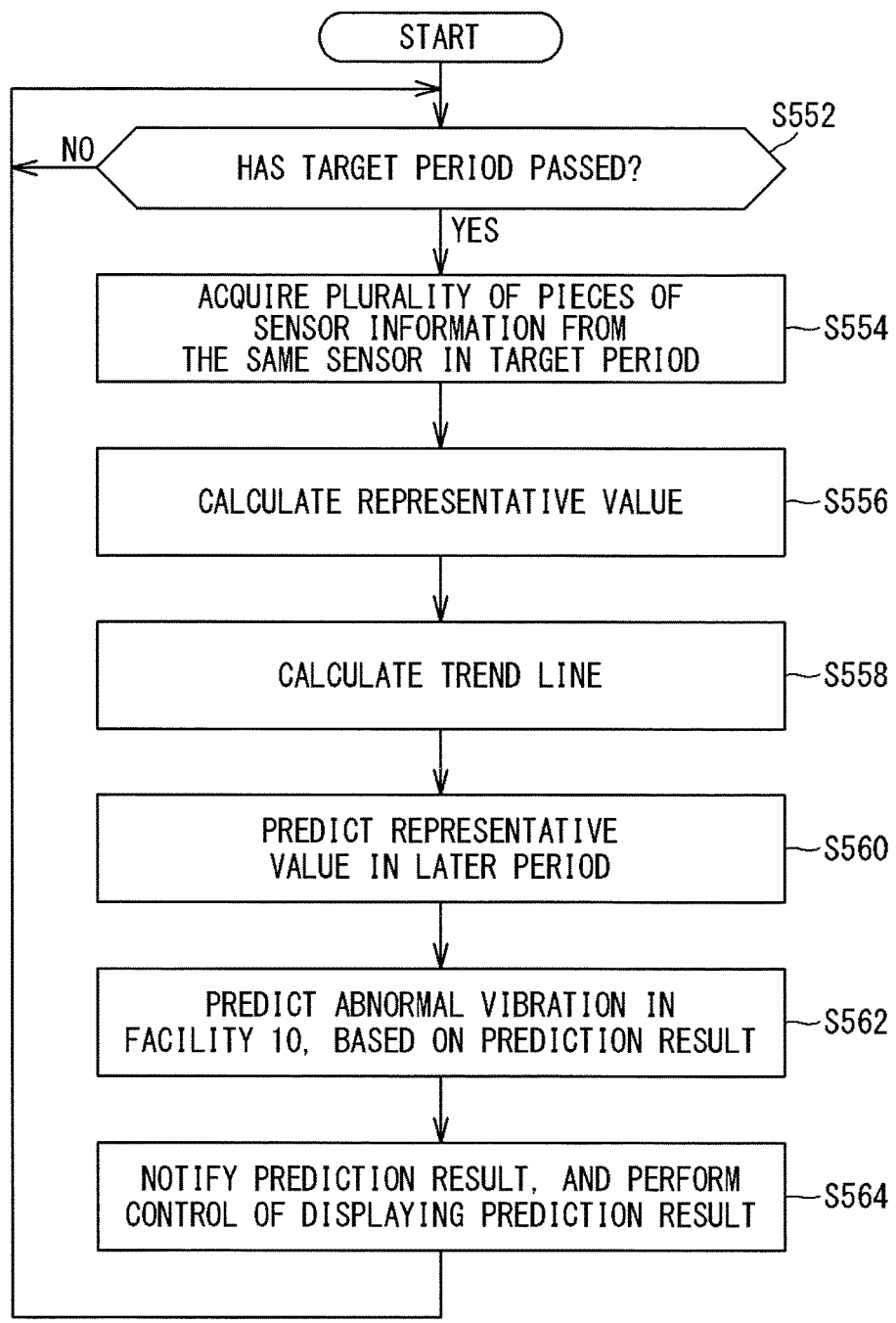
FIG. 30 is a flowchart showing an operation procedure used when the management device according to the fifth embodiment of the present disclosure predicts abnormal vibration in a facility.

FIG. 30 is a flowchart showing an operation procedure used when the management device according to the fifth embodiment of the present disclosure predicts abnormal vibration in a facility.

With reference to FIG. 30, first, the management device 101 stands by until a target period passes (NO in step S552).

When the target period has passed (YES in step S552), the management device 101 acquires, from the accumulation device 171, a plurality of pieces of sensor information from the same acceleration sensor in the target period (step S554).

Next, based on the plurality of pieces of sensor information, the management device 101 calculates a representative value in the target period (step S556).

Next, the management device 101 calculates a trend line on the basis of the representative value in the target period and representative values in target periods prior to the target period (step S558).

Next, the management device 101 predicts a representative value in a period after the target periods by using the calculated trend line (step S560).

Next, the management device 101 predicts abnormal vibration in the facility 10 on the basis of the relationship between the threshold value and the predicted representative value in the period after the target periods (step S562). Specifically, the management device 101 predicts a timing and a date in which the rotation unit 9 in the facility 10 may shift into the attention state or the warning state.

Next, the management device 101 notifies the prediction result of the abnormal vibration in the facility 10, and performs control of temporally or spatially displaying the abnormal vibration (step S564). Specifically, the management device 101, for example, transmits a mail including the abnormality detection information, performs display control to emphasize the rotation unit 9 for which abnormal vibration in the facility 10 shown in FIG. 21 is predicted, performs control of displaying the timing and the date in which the rotation unit 9 in the facility 10 may shift into the attention state or the warning state, or performs control of displaying the graph shown in FIG. 22 or FIG. 23.

Next, the management device 101 stands by until a new target period passes (NO in step S552).

In step S556, the management device 101 calculates, as the representative value in the target period, at least one of: a statistic of the values indicated by the pieces of sensor information; a range of the values; and the magnitude of a predetermined frequency component in a frequency distribution of the values.

In the management system according to the fifth embodiment of the present disclosure, the determination unit 24 is configured to perform determination of abnormal vibration in the facility 10 on the basis of the measurement result of the acceleration sensor. However, the present disclosure is not limited thereto. The determination unit 24 may be configured to perform the above determination on the basis of a measurement result of another type of sensor.

In the management system according to the fifth embodiment of the present disclosure, the determination unit 24 is configured to perform determination of abnormal vibration in the facility 10. However, the present disclosure is not limited thereto. The determination unit 24 may be configured to perform another determination as long as the determination relates to the predetermined area.

In the management system according to the fifth embodiment of the present disclosure, the determination unit 24 is configured to predict a tendency of a temporal change of sensor information in a future period, on the basis of sensor information from an acceleration sensor in a target period. However, the present disclosure is not limited thereto. The determination unit 24 may be configured to predict the aforementioned tendency on the basis of sensor information, in a target period, from another sensor such as a temperature sensor. Also in this configuration, the determination unit 24 is able to compare determination information with prediction tendency information indicating the predicted tendency of the temporal change of the sensor information, and perform determination of abnormal vibration in the facility 10 on the basis of the comparison result.

As described above, in the management system according to the fifth embodiment of the present disclosure, the determination unit 24 performs abnormality determination by comparing the tendency information indicating a temporal change estimated from the sensor information acquired by the acquisition unit 21, with the determination information registered in advance.

As described above, the tendency information includes, for example, information indicating a temporal change representing the characteristics of values indicated by the sensor information, whereby the state of the predetermined area can be correctly grasped. Therefore, the state of the predetermined area can be satisfactorily monitored.

In the management system according to the fifth embodiment of the present disclosure, the tendency information includes the information based on the result of the statistical process performed on the sensor information.

As described above, the tendency information includes the information, based on the result of the statistical process, which represents the characteristics of values indicated by the sensor information, whereby the state of the predetermined area can be grasped more correctly.

In the management system according to the fifth embodiment of the present disclosure, the result of the statistical process is at least one of an average, a variance, and a standard deviation.

As described above, the tendency information includes the information that appropriately indicates variation of values indicated by the sensor information, whereby the state of the predetermined area can be easily grasped from the variation.

In the management system according to the fifth embodiment of the present disclosure, the determination unit 24 performs abnormality determination by comparing the future sensor information estimated based on the sensor information acquired by the acquisition unit 21, with the determination information registered in advance.

According to this configuration, for example, future abnormality in the predetermined area can be determined, whereby necessary measures to deal with the future abnormality can be taken during the normal state.

In the management system according to the fifth embodiment of the present disclosure, the management device 101 calculates a timing at which the determination result indicates abnormality.

According to this configuration, it is possible to provide a more accurate preparation period for dealing with future abnormality, i.e., a period from the timing at which the determination is performed to the timing indicated by the calculation result.

In the management system according to the fifth embodiment of the present disclosure, the tendency information includes the prediction tendency information indicating the tendency of a temporal change in a future period after a target period, which is predicted based on the sensor information in the target period.

According to this configuration, for example, future abnormality in the predetermined area can be determined, whereby necessary measures to deal with the future abnormality can be taken during the normal state.

In the management system according to the fifth embodiment of the present disclosure, the management device 101 calculates a timing, after a target period, at which the result of comparison between the tendency information and the determination information satisfies a predetermined condition.

According to this configuration, for example, it is possible to provide a more accurate preparation period for dealing with future abnormality, i.e., a period from the timing at which the determination is performed to the timing indicated by the calculation result.

In the management system according to the fifth embodiment of the present disclosure, the tendency information includes the information based on the result of the statistical process performed on the sensor information.

As described above, the tendency information includes the information based on the result of the statistical process, which represents the characteristics of values indicated by the sensor information. Therefore, the state of the predetermined area can be correctly grasped, whereby the state of the predetermined area can be satisfactorily monitored.

In the management system according to the fifth embodiment of the present disclosure, the tendency information includes information based on the size of a range of a temporal change of the sensor information.

As described above, the tendency information includes the information, based on the size of the range of the temporal change of the sensor information, which represents the characteristics of values indicated by the sensor information. Therefore, the state of the predetermined area can be correctly grasped, whereby the state of the predetermined area can be satisfactorily monitored.

In the management system according to the fifth embodiment of the present disclosure, the tendency information includes information based on the magnitude of a frequency component in a temporal change of the sensor information.

As described above, the tendency information includes the information, based on the magnitude of the frequency component in the temporal change of the sensor information, which represents the characteristics of values indicated by the sensor information. Therefore, the state of the predetermined area can be correctly grasped, whereby the state of the predetermined area can be satisfactorily monitored.

In the management system according to the fifth embodiment of the present disclosure, the management device 101 calculates, for each target period, a statistic of values indicated by a plurality of pieces of sensor information from the same sensor in the target period, and compares the calculated statistic with a threshold value. Then, the management device 101 performs, for each target period, determination regarding the predetermined area on the basis of the comparison result.

As described above, the statistic, which represents the characteristics of the values indicated by the sensor information in the target period, is used, whereby the state of the predetermined area in each target period can be correctly grasped. That is, the state of the predetermined area can be monitored more satisfactorily.

In the management system according to the fifth embodiment of the present disclosure, the management device 101 calculates, for each target period, the size of a range of values indicated by a plurality of pieces of sensor information from the same sensor in the target period, and compares the calculated size with a threshold value. Then, the management device 101 performs, for each target period, determination regarding the predetermined area on the basis of the comparison result.

As described above, the size of the range of the values indicated by the sensor information, which represents the characteristics of the values in each target period, is used, whereby the state of the predetermined area in each target period can be correctly grasped. That is, the state of the predetermined area can be monitored more satisfactorily.

In the management system according to the fifth embodiment of the present disclosure, the management device 101 calculates, for each target period, a frequency distribution of values indicated by a plurality of pieces of sensor information arranged in time sequence from the same sensor in the target period, and compares the magnitude of a predetermined frequency component in the calculated frequency distribution, with a threshold value. Then, the management device 101 performs, for each target period, determination regarding the predetermined area on the basis of the comparison result.

As described above, the magnitude of the predetermined frequency component in the frequency distribution, which represents the characteristics of the values indicated by the sensor information in the target period, is used, whereby the state of the predetermined area in each target period can be correctly grasped. That is, the state of the predetermined area can be monitored more satisfactorily.

In the management system according to the fifth embodiment of the present disclosure, the management device 101 performs, with respect to a plurality of target periods, predetermined arithmetic processing on values indicated by a plurality of pieces of sensor information from the same sensor in each target period, thereby calculating a representative value in the target period. Based on the representative values in the respective target periods, the management device 101 predicts a representative value in a period after the target periods. Then, based on the prediction result, the management device 101 performs determination regarding the predetermined area.

As described above, since the future representative value is predicted, and the aforementioned determination is performed based on the prediction result, the future state of the predetermined area can be correctly grasped, whereby the future state of the predetermined area can be satisfactorily monitored.

In the management system according to the fifth embodiment of the present disclosure, the management device 101 calculates, as a representative value in each target period, a statistic of values indicated by a plurality of pieces of sensor information from the same sensor in the target period. Based on the representative values in the respective target periods, the management device 101 predicts a representative value in a later period. Then, the management device 101 compares the predicted representative value with a threshold value, and performs determination regarding the predetermined area on the basis of the comparison result.

As described above, the statistic representing the characteristics of the values indicated by the sensor information in each target period is calculated as a representative value, and a representative value in a later period is predicted based on the representative values in the respective target periods. Thus, the future state of the predetermined area can be grasped more correctly, whereby the future state of the predetermined area can be monitored more satisfactorily.

In the management system according to the fifth embodiment of the present disclosure, the management device 101 calculates, as a representative value in each target period, the size of a range of values indicated by a plurality of pieces of sensor information from the same sensor in the target period, and predicts a representative value in a later period on the basis of the representative values in the respective target periods. Then, the management device 101 compares the predicted representative value with a threshold value, and performs determination regarding the predetermined area on the basis of the comparison result.

As described above, the size of the range of the values indicated by the sensor information, which represents the characteristics of the values in each target period, is calculated as a representative value, and a representative value in a later period is predicted based on the representative values in the respective target periods. Therefore, the future state of the predetermined area can be grasped more correctly, whereby the future state of the predetermined area can be monitored more satisfactorily.

In the management system according to the fifth embodiment of the present disclosure, the management device 101 calculates a frequency distribution of values indicated by a plurality of pieces of sensor information arranged in time sequence from the same sensor in each target period, and calculates, as a representative value in the target period, the magnitude of a predetermined frequency component in the calculated frequency distribution. Based on the representative values in the respective target periods, the management device 101 predicts a representative value in a later period, and compares the predicted representative value with a threshold value. Then, the management device 101 performs determination regarding the predetermined area on the basis of the comparison result.

As described above, the magnitude of the predetermined frequency component in the frequency distribution, which represents the characteristics of the values indicated by the sensor information in each target period, is calculated as a representative value, and a representative value in a later period is predicted based on the representative values in the respective target periods. Therefore, the future state of the predetermined area can be grasped more correctly, whereby the future state of the predetermined area can be monitored more satisfactorily.

In the management system according to the fifth embodiment of the present disclosure, a plurality of sensors are installed in a predetermined area. The accumulation device 171 accumulates pieces of sensor information wirelessly transmitted from the plurality of sensors. The management device 101 acquires the sensor information. Then, the management device 101 performs, with respect to a plurality of target periods, predetermined arithmetic processing on values indicated by a plurality of pieces of sensor information from the same sensor in each target period, thereby calculating a representative value in the target period. Then, the management device 101 predicts a representative value in a period after the target periods on the basis of the representative values in the target periods.

As described above, the future representative value is predicted, and the aforementioned determination is performed based on the prediction result. Thus, the future state of the predetermined area can be correctly grasped, whereby the future state of the predetermined area can be satisfactorily monitored.

In the management system according to the fifth embodiment of the present disclosure, the management device 101 calculates a statistic of values indicated by a plurality of pieces of sensor information from the same sensor in each target period, as a representative value in the target period. Based on the representative values in the respective target periods, the management device 101 predicts a representative value in a later period.

As described above, the statistic representing the characteristics of the values indicated by the sensor information in each target period is calculated as a representative value, and a representative value in a later period is predicted based on the representative values in the respective target periods. Thus, the future state of the predetermined area can be grasped more correctly, whereby the future state of the predetermined area can be monitored more satisfactorily.

In the management system according to the fifth embodiment of the present disclosure, the management device 101 calculates the size of a range of values indicated by a plurality of pieces of sensor information from the same sensor in each target period, as a representative value in the target period, and predicts a representative value in a later period on the basis of the representative values in the respective target periods.

As described above, the size of the range of the values indicated by the sensor information, which represents the characteristics of the values in each target period, is calculated as a representative value, and a representative value in a later period is predicted based on the representative values in the respective target periods. Thus, the future state of the predetermined area can be grasped more correctly, whereby the future state of the predetermined area can be monitored more satisfactorily.

In the management system according to the fifth embodiment of the present disclosure, the management device 101 calculates a frequency distribution of values indicated by a plurality of pieces of sensor information arranged in time sequence from the same sensor in each target period, and calculates the magnitude of a predetermined frequency component in the calculated frequency distribution, as a representative value in the target period. Based on the representative values in the respective target periods, the management device 101 predicts a representative value in a later period.

Thus, the magnitude of the predetermined frequency component in the frequency distribution, which represents the characteristics of the values indicated by the sensor information in each target period, is calculated as a representative value, and a representative value in a later period is predicted based on the representative values in the respective target periods. Therefore, the future state of the predetermined area can be grasped more correctly, whereby the future state of the predetermined area can be monitored more satisfactorily.

The other configurations and operations are the same as those of the management system according to the first embodiment, and detailed description thereof is not repeated here.

Next, another embodiment of the present disclosure will be described with reference to the drawings. The same or corresponding parts in the drawings are denoted by the same reference characters, and description thereof is not repeated.

Sixth Embodiment

This embodiment relates to a management system which determines an abnormal area in a plant, in contrast to the management system according to the first embodiment. Except for the contents described below, the management system of this sixth embodiment is identical to the management system of the first embodiment.

Figure 31:
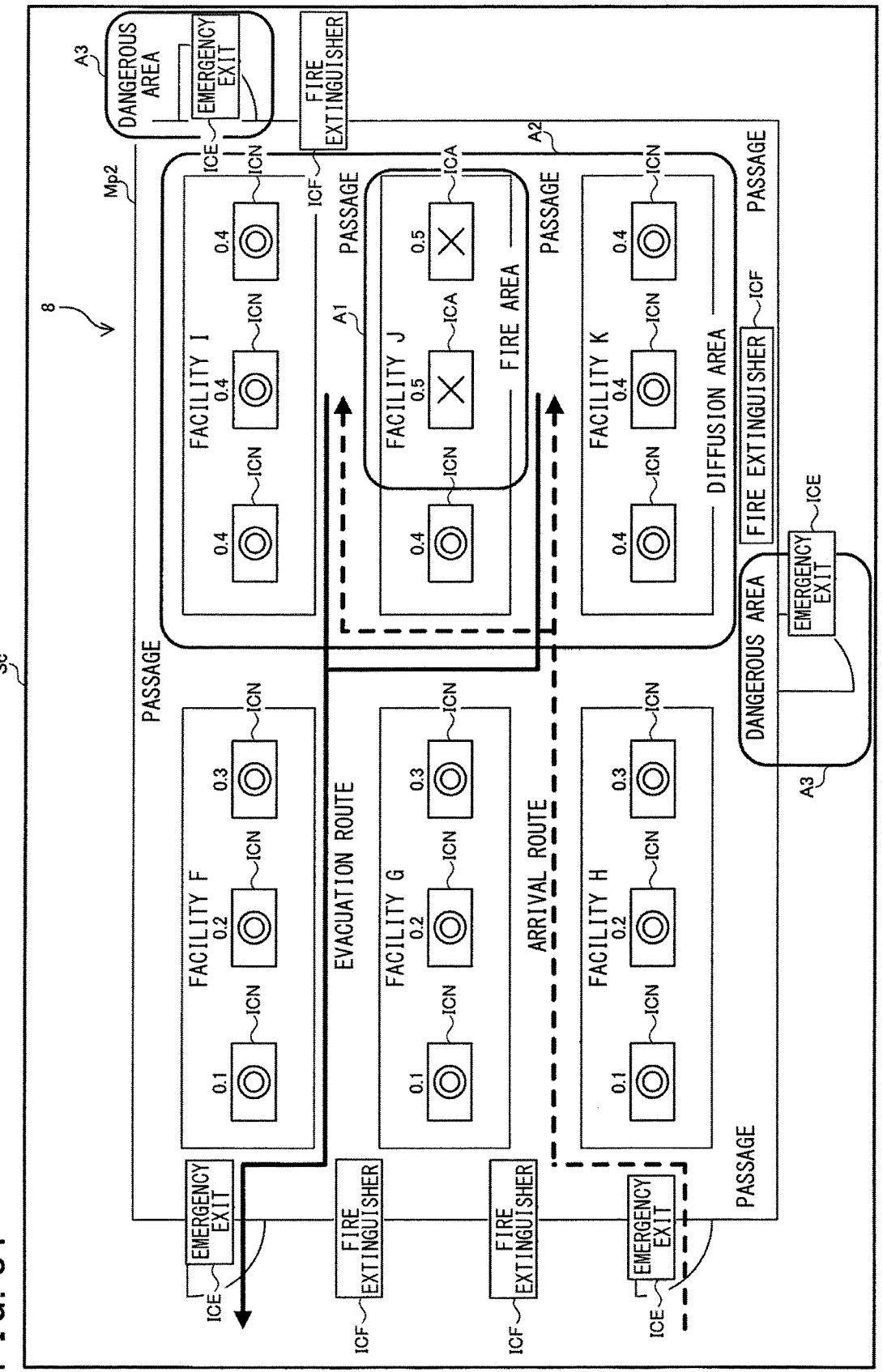
FIG. 31 shows an example of a screen displayed on a display device in a management system according to a sixth embodiment of the present disclosure.

FIG. 31 shows an example of a screen displayed on a display device in the management system according to the sixth embodiment of the present disclosure. FIG. 31 shows a drawing Mp2 of a plant 8 different from the plant 5 shown in FIG. 2.

With reference to FIG. 31, facilities F to K are installed in the plant 8. Each facility is equipped with: three sensor units 1 (not shown) each including a smoke sensor; and one announcement device 111 (not shown).

Referring back to FIG. 1 and FIG. 3, the accumulation device 171 retains security information indicating: the types of the facilities F to K in the plant 8; position coordinates, in the drawing of the plant 8, of fire extinguishers that are examples of fire extinguishing tools as well as maintenance tools; and position coordinates, in the drawing, of emergency exits.

The determination unit 24 in the management device 101 performs a spatial process using sensor information acquired by the acquisition unit 21 to perform determination regarding the plant 8, for example, determination of an abnormal area in the plant 8.

Specifically, the determination unit 24, for example, compares information based on sensor information in a target period with determination information used for determination, and performs determination of an abnormal area in a predetermined area on the basis of the comparison result. In this example, a first range and a second range described later are examples of the determination information. In addition, the determination unit 24 performs the determination regarding the plant 8 at predetermined time intervals, for example. Therefore, the target period is a most-recent predetermined period, for example.

Specifically, based on a measurement result of smoke, the determination unit 24 determines, for example, two abnormal areas including: a fire area A1 in the plant 8; and a diffusion area A2, in the plant 8, which is at least partially different from the fire area A1. More specifically, the determination unit 24 determines, for example, the diffusion area A2 as an area obtained by extending or shifting the determined fire area A1. Here, the area obtained by extending the fire area A1 has an area greater than that of the fire area A1, and includes the entire fire area A1. In addition, the fire area A1 and the area obtained by shifting the fire area A1 partially overlap with each other.

More specifically, the determination unit 24, for example, compares a value indicated by sensor information from a smoke sensor with a first range, and determines a fire area A1 on the basis of the comparison result. In addition, the determination unit 24, for example, compares the value indicated by the sensor information from the smoke sensor with a second range that is at least partially different from the first range, and determines a diffusion area A2 on the basis of the comparison result. In this example, the first range is a range not smaller than 0.5 and smaller than a measurement upper limit of the smoke sensor. The second range is a range not smaller than 0.4 and smaller than 0.5.

The determination unit 24 acquires the drawing information and the security information from the accumulation device 171 via the acquisition unit 21.

Figure 32:
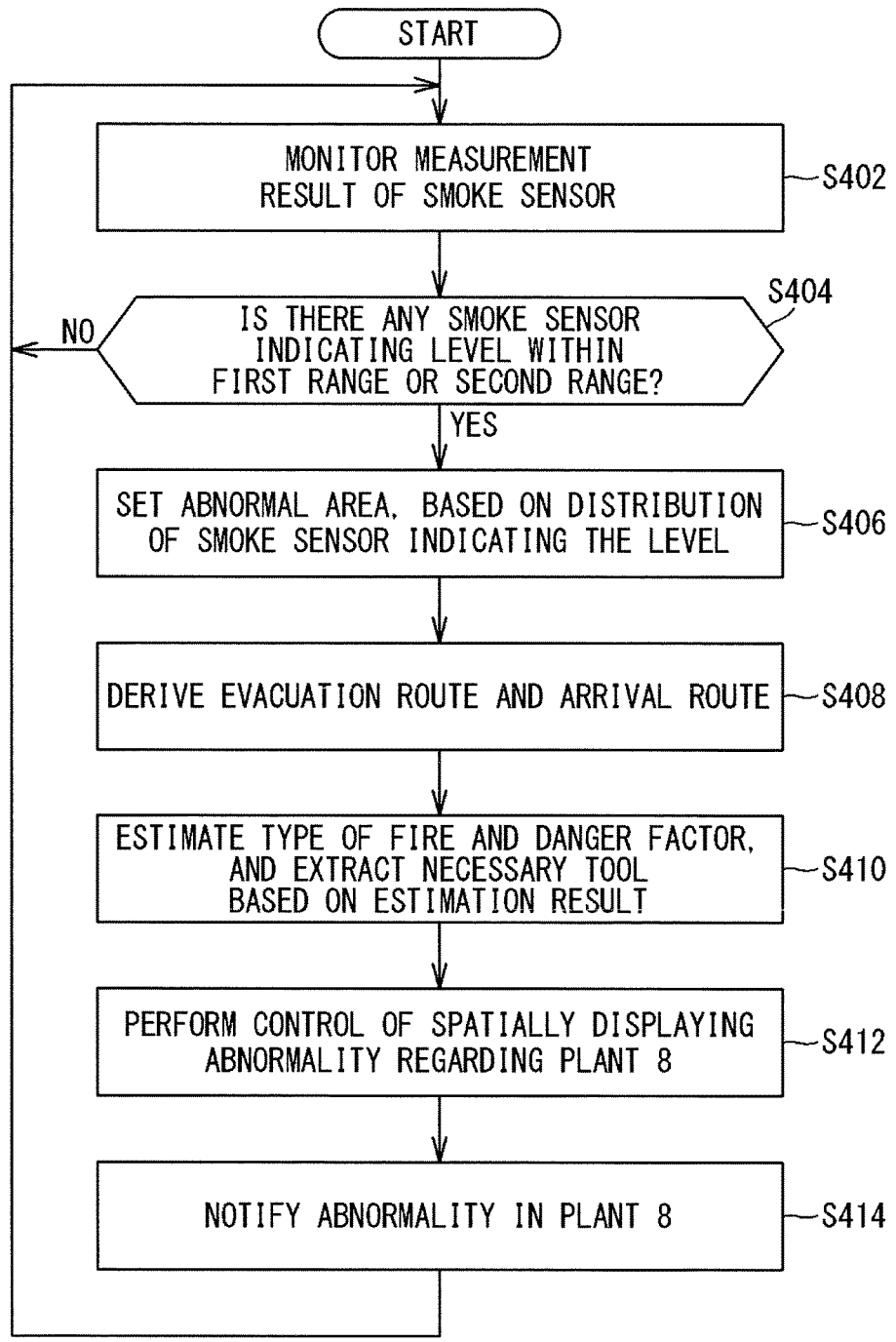
FIG. 32 is a flowchart showing an operation procedure used when a management device according to the sixth embodiment of the present disclosure determines an abnormal area, and performs a process of displaying and notifying the determination result.

FIG. 32 is a flowchart showing an operation procedure used when the management device according to the sixth embodiment of the present disclosure determines an abnormal area, and performs a process of displaying and notifying the determination result.

With reference to FIG. 31 and FIG. 32, first, the determination unit 24 acquires pieces of sensor information from a plurality of smoke sensors installed in the plant 8, from the accumulation device 171 via the acquisition unit 21, and monitors the acquired pieces of sensor information (step S402).

Next, when there is no smoke sensor that has transmitted sensor information indicating a dust concentration within the first range or the second range, among the dust concentrations indicated by the pieces of sensor information as monitoring targets (NO in step S404), the determination unit 24 continues to monitor the sensor information (step S402).

On the other hand, when there is a smoke sensor that has transmitted sensor information indicating a dust concentration within the first range or the second range (YES in step S404), the determination unit 24 sets a fire area A1, a diffusion area A2, and a dangerous area A3 which are examples of abnormal areas, on the basis of distribution of the position of such a smoke sensor (step S406).

More specifically, when the dust concentration indicated by the sensor information is within the first range, the determination unit 24 recognizes the position of the smoke sensor on the basis of the drawing information and the ID of the smoke sensor that has transmitted the sensor information, and sets an area around the smoke sensor, as a fire area A1. In this example, the determination unit 24 sets an area including a part of the facility J, as a fire area A1.

When the dust concentration indicated by the sensor information is within the second range, the determination unit 24 recognizes the position of the smoke sensor on the basis of the drawing information and the ID of the smoke sensor that has transmitted the sensor information, and sets an area around the smoke sensor, as a diffusion area A2. In this example, the determination unit 24 sets an area including the facilities I to K, as a diffusion area A2.

When determining at least one of the fire area A1 and the diffusion area A2, the determination unit 24 sets, as a dangerous area A3, an area including an emergency exit located near the diffusion area A2.

Next, based on the drawing information and the security information, the determination unit 24 derives routes connecting the abnormal area and the outside of the plant 8, specifically, an evacuation route and an arrival route (step S408).

More specifically, the determination unit 24 derives an evacuation route from the fire area A1 to the outside of the plant 8, that is, an evacuation route from the fire area A1 to an emergency exit that has not been determined as a dangerous area A3. In addition, the determination unit 24 derives an arrival route from the outside of the plant 8 to the fire area A1, that is, an arrival route from an emergency exit that has not been determined as a dangerous area A3 to the fire area A1.

Preferably, the determination unit 24 derives the evacuation route and the arrival route so as not to overlap with the diffusion area A2 and the dangerous area A3.

If the evacuation route overlaps with the diffusion area A2 or the dangerous area A3, the determination unit 24 derives the evacuation route so as to reduce the length, of the route, overlapped with the diffusion area A2 or the dangerous area A3. When the arrival route overlaps with the diffusion area A2 or the dangerous area A3, the determination unit 24 derives the arrival route so as to reduce the length, of the route, overlapped with the diffusion area A2 or the dangerous area A3.

The determination unit 24 derives the evacuation route and the arrival route so as to reduce overlapping of these routes.

Next, based on the type of the facility J indicated by the security information, the determination unit 24 estimates the type of fire and a danger factor, and extracts a necessary tool on the basis of the estimation result (step S410).

Then, the determination unit 24 creates abnormality detection information indicating: the ID and the measurement value of the smoke sensor; the fire area A1; the diffusion area A2; the dangerous area A3; the extracted tool; and the evacuation route and the arrival route, and outputs the created abnormality detection information to the display control unit 23 and the notification unit 22.

Next, the display control unit 23 performs control of spatially displaying abnormality in the plant 8. Specifically, the display control unit 23 performs, for example, control of displaying the content according to the abnormal area determined by the determination unit 24. In addition, the display control unit 23 performs, for example, control of displaying distribution of smoke in the plant 8 (step S412).

More specifically, upon receiving the abnormality detection information from the determination unit 24, the display control unit 23 acquires the drawing information and the security information from the accumulation device 171 via the acquisition unit 21. Then, based on the abnormality detection information and the drawing information, the display control unit 23 performs control of displaying, on a screen Sc, the drawing Mpg of the plant 8, and icons ICN, ICA which represent a plurality of smoke sensors installed in the plant 8 and to which the measurement results of the corresponding smoke sensors are appended.

Furthermore, based on the security information, the display control unit 23 performs, for example, control of displaying, on the screen Sc, icons ICF representing the locations of the fire extinguishers as examples of the fire extinguishing tools to be used for the fire area A1 in the plant 8, and icons ICE representing the locations of the emergency exits. The display control unit 23 may perform control of displaying the types of the fire extinguishers as well as the aforementioned locations.

Based on the abnormality detection information, the display control unit 23 performs control of displaying, on the screen Sc, the fire area A1, the diffusion area A2, the dangerous area A3, the evacuation route, and the arrival route in the plant 8.

Next, the management device 101 notifies the abnormality in the plant 8. Specifically, the notification unit 22 notifies, for example, the content according to the abnormal area determined by the determination unit 24 (step S414).

More specifically, upon receiving the abnormality detection information from the determination unit 24, the notification unit 22 acquires announcement destination information, the drawing information, and the security information from the accumulation device 171 via the acquisition unit 21.

The notification unit 22 creates a mail including the contents of the abnormality detection information, the drawing information, and the security information, specifically, a mail including the content of the screen Sc shown in FIG. 31, and transmits the created mail to a device, such as a server, indicated by the acquired announcement destination information, via the internal network 11.

Based on the abnormality detection information and the drawing information, the notification unit 22 creates, for example, announcement information indicating the facilities included in the diffusion area A2, i.e., the facilities I to K, and transmits the created announcement information to the announcement device 111 via the internal network 11.

Next, when there is no smoke sensor that has transmitted sensor information indicating the dust concentration not lower than 0.4 (NO in step S404) or when the notification unit 22 has notified the content according to the abnormal area (step S414), the determination unit 24 continues to monitor the sensor information (step S402).

The order of steps S408 and S410 is not limited to the above order, and steps S408 and S410 may be reversed. The order of steps S412 and S414 is not limited to the above order, and steps S412 and S414 may be reversed.

[Modification of Determination of Abnormal Area]

Figure 33:
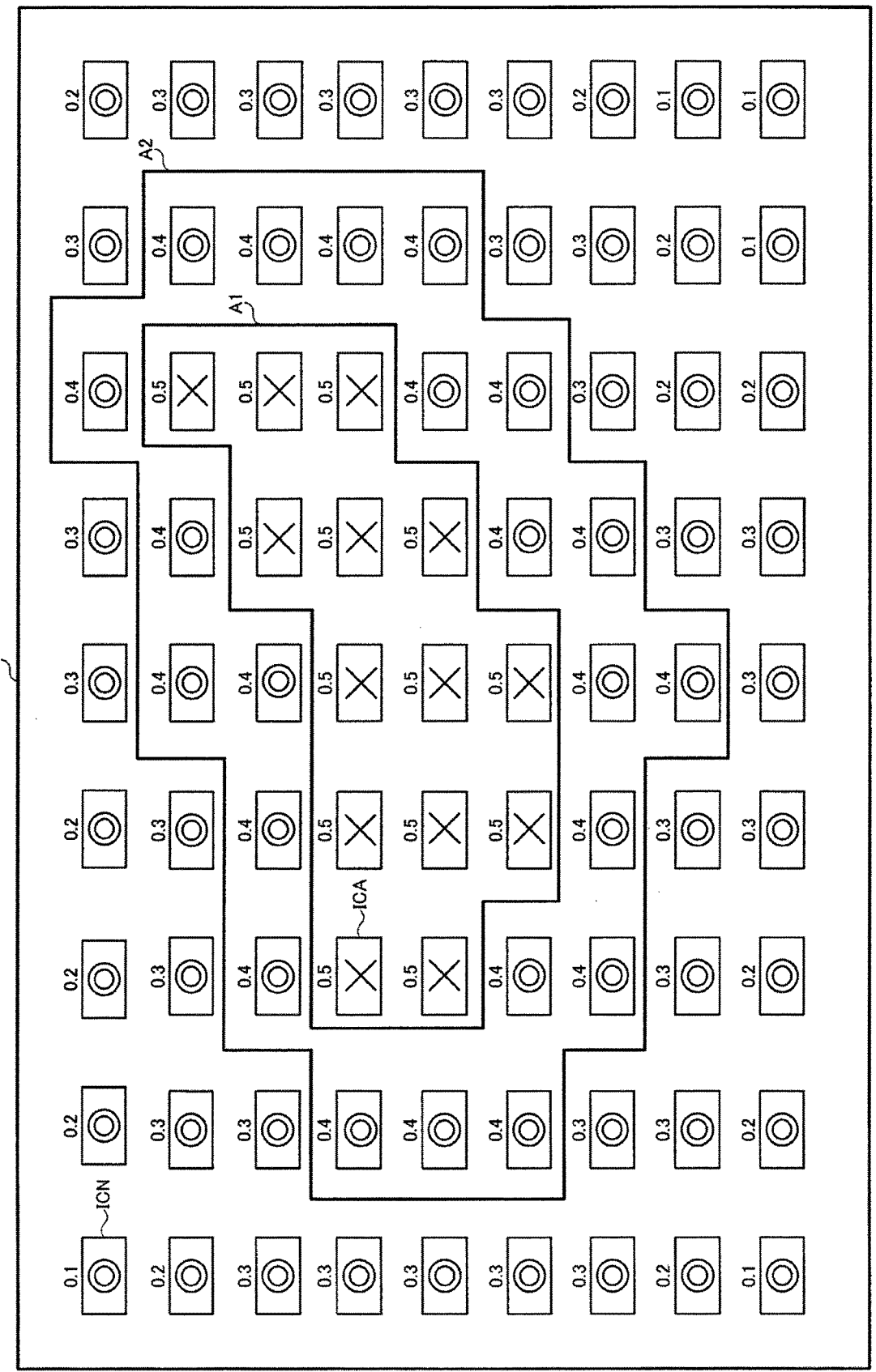
FIG. 33 shows a modification of the screen shown in FIG. 31.

FIG. 33 shows a modification of the screen shown in FIG. 31. Although the drawing of the plant 8 is not shown on the screen Sc of FIG. 33 in contrast to the screen Sc of FIG. 31, the drawing of the plant 8 may be displayed. Although the dangerous area, the evacuation route, and the arrival route are not shown on the screen Sc of FIG. 33, the dangerous area, the evacuation route, and the arrival route may be displayed.

In FIG. 33, a fire area A1 is shown so as to surround icons ICA indicating smoke sensors that exhibit dust concentrations within the first range. In addition, a diffusion area A2 is shown so as to surround icons ICN indicating smoke sensors that exhibit dust concentrations within the second range.

As shown in FIG. 33, the display control unit 23 is able to perform control of displaying the icons ICN, ICA of many smoke sensors, the fire area A1, and the diffusion area A2.

Figure 34:
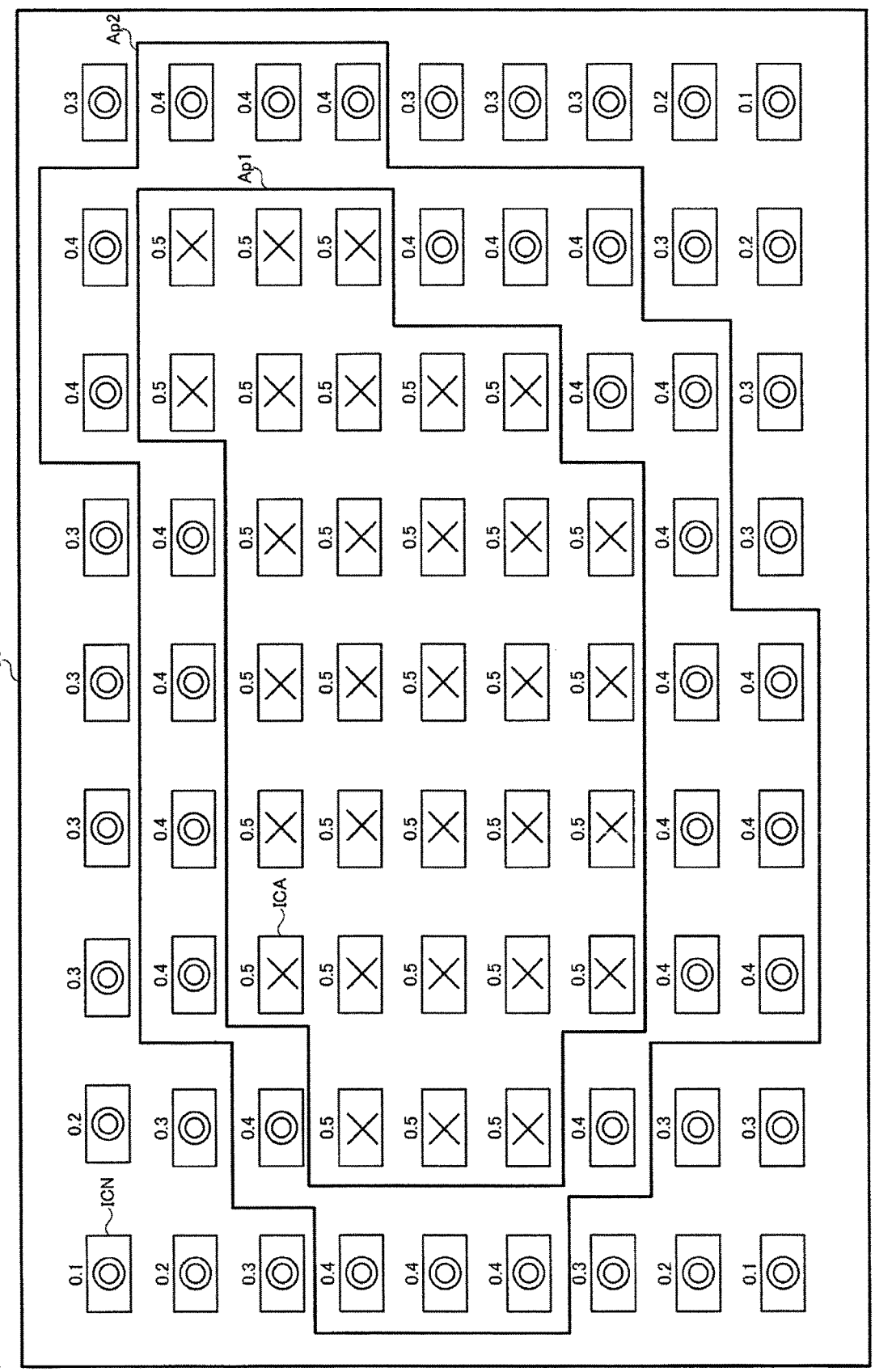
FIG. 34 shows an example of a screen displayed on a display device in the management system according to the sixth embodiment of the present disclosure.

FIG. 34 shows an example of a screen displayed on the display device in the management system according to the sixth embodiment of the present disclosure. FIG. 34 shows a predicted fire area Ap1 and a predicted diffusion area Ap2 corresponding to the fire area A1 and the diffusion area A2 shown in FIG. 33 after a lapse of a predetermined time. The way of viewing FIG. 34 is the same as the way of viewing FIG. 33.

With reference to FIG. 34, the determination unit 24 performs, for example, a temporal process and a spatial process using the sensor information acquired by the acquisition unit 21 to determine an abnormal area in the plant 8.

Specifically, the determination unit 24 predicts, for example, a temporal transition of the abnormal area on the basis of sensor information in a target period. More specifically, the determination unit 24 determines, for example, a predicted fire area Ap1 and a predicted diffusion area Ap2 corresponding to the fire area A1 and the diffusion area A2 shown in FIG. 33 after a lapse of a predetermined time, specifically, after a lapse of 1 minute, 2 minutes, 3 minutes, and 10 minutes.

Specifically, the determination unit 24 performs, for example, with respect to a plurality of target periods, predetermined arithmetic processing on values V1 indicated by a plurality of pieces of sensor information from the same smoke sensor in each target period, thereby calculating a representative value in the target period. This representative value may be any one of a statistic of the values V1, the size of a range of the values V1, the magnitude of a predetermined frequency component in a frequency distribution based on the values V1, or may be a combination thereof.

The determination unit 24 predicts a representative value in a period after the respective target periods on the basis of the representative values in the target periods. Then, based on the prediction result, the determination unit 24 performs, for example, determination of a predicted fire area Ap1 and a predicted diffusion area Ap2 after a lapse of a predetermined time.

The determination unit 24 performs the above determination for each smoke sensor to calculate distribution of the smoke density after a lapse of a predetermined time, and specifies a predicted fire area Ap1 and a predicted diffusion area Ap2 after the lapse of the predetermined time.

The determination unit 24 creates abnormality detection information including the specified predicted fire area Ap1 and predicted diffusion area Ap2, and outputs the created abnormality detection information to the display control unit 23 and the notification unit 22.

Upon receiving the abnormality detection information from the determination unit 24, the display control unit 23 performs control of displaying the screen Sc shown in FIG. 34 on the basis of the received abnormality detection information.

The determination unit 24 is configured to determine two abnormal areas including the fire area A1 and the diffusion area A2 in the plant 8. However, the present disclosure is not limited thereto. The determination unit 24 may be configured to determine one abnormal area in the plant 8, or may be configured to determine three or more abnormal areas in the plant 8.

As described above, in the management system according to the sixth embodiment of the present disclosure, a plurality of sensors are installed in a predetermined area. The accumulation device 171 accumulates sensor information wirelessly transmitted from the plurality of sensors. The management device 101 acquires the sensor information. The management device 101 is able to perform determination regarding the predetermined area through a spatial process using the acquired sensor information, notify the content based on the determination result, and perform control of spatially displaying the content regarding the predetermined area on the basis of the acquired sensor information.

As described above, the determination regarding the predetermined area is performed through the spatial process using the sensor information, and a spatial change of the state of the predetermined area can be recognized based on a spatial change of the content of the sensor information, whereby the state of the predetermined area can be grasped more accurately. In addition, since the accumulation device 171 is provided, the spatial process can be easily performed. Further, the content based on the determination result is notified, and the content regarding the predetermined area, based on the sensor information, is spatially displayed, whereby the state of the predetermined area can be accurately transmitted to the administrator. Accordingly, the state of the predetermined area can be satisfactorily monitored, and the monitoring result regarding the predetermined area can be transmitted more accurately.

In the management system according to the sixth embodiment of the present disclosure, the management device 101 compares information based on sensor information in a target period with determination information used for determination, and performs determination of an abnormal area in a predetermined area on the basis of the comparison result.

Since the determined abnormal area is spatially displayed and notified, a user can promptly recognize the abnormal area in the predetermined area, and thus can appropriately deal with abnormality.

In the management system according to the sixth embodiment of the present disclosure, the management device 101 determines a plurality of abnormal areas including: a fire area A1 in the predetermined area; and a diffusion area A2, in the predetermined area, which is at least partially different from the fire area A1. Specifically, the management device 101 compares the values indicated by the sensors with the first range, and determines the fire area A1 in accordance with the comparison result. Then, the management device 101 compares the values indicated by the sensors with the second range that is at least partially different from the first range, and determines the diffusion area A2 in accordance with the comparison result.

As described above, since the abnormal area is determined stepwise in accordance with the degree of abnormality, a spatial spread of the degree of abnormality in the predetermined area can be transmitted to the administrator more accurately. For example, there is a case where many facilities are installed depending on the scale of the predetermined area. In this case, when each of the facilities is equipped with a sensor, spatial abnormality can be determined based on the measurement results from the respective sensors. For example, when fire breaks out in the predetermined area, it is desired to minimize damage by promptly specifying a facility that causes the fire, extinguishing the fire, and preventing the fire from spreading to other facilities. Therefore, for example, if a maintenance person can be separately notified of an area where the fire actually breaks out and an area to which the fire may spread, on the basis of the measurement results from the sensors, it is possible to promptly specify the facility that causes the fire, and extinguish the fire. Therefore, the aforementioned configuration is particularly effective in a plant.

In the management system according to the sixth embodiment of the present disclosure, the management device 101 predicts a temporal transition of an abnormal area on the basis of sensor information in a target period.

According to this configuration, a spatial spread of a future abnormal area can be more accurately transmitted to the administrator, whereby the administrator can provide preventive measures for the future.

In the management system according to the sixth embodiment of the present disclosure, a plurality of sensors are installed in a predetermined area. The accumulation device 171 accumulates pieces of sensor information wirelessly transmitted from the plurality of sensors. The accumulation device 171 acquires the pieces of sensor information. Then, the accumulation device 171 determines an abnormal area in the predetermined area on the basis of the acquired plurality of pieces of sensor information.

As described above, since the spatial spread of the abnormal area is predicted, for example, the administrator can provide measures against the abnormal area. Therefore, the state of the predetermined area can be satisfactorily monitored.

In the management system according to the sixth embodiment of the present disclosure, a plurality of sensors are installed in a predetermined area. The accumulation device 171 accumulates pieces of sensor information wirelessly transmitted from the plurality of sensors. The management device 101 acquires the sensor information. Based on the acquired plurality of pieces of sensor information, the management device 101 predicts a temporal transition of an abnormal area in the predetermined area.

As described above, since a spatial spread of a future abnormal area is predicted, for example, the administrator can provide preventive measures for the future. Therefore, the state of the predetermined area can be satisfactorily monitored.

In the management system according to the sixth embodiment of the present disclosure, the management device 101 determines a fire area A1 in the plant 8.

According to this configuration, a spatial spread of the fire area A1 in the plant 8 can be transmitted to the administrator more accurately.

In the management system according to the sixth embodiment of the present disclosure, the management device 101 determines the diffusion area A2 obtained by extending or shifting the determined fire area A1.

According to this configuration, a spatial spread of the diffusion area A2 which is highly likely to be abnormal can be transmitted to the administrator more accurately, whereby the administrator can provide preventive measures to deal with spread or shift of the fire area A1.

In the management system according to the sixth embodiment of the present disclosure, the management device 101 determines an abnormal area in the plant 8. Then, the management device 101 notifies the content according to the determined abnormal area.

According to this configuration, for example, the position of the abnormal area in the plant 8 can be notified, whereby a person who has received the notification can spatially recognize the positional relationship between the abnormal area and the plant 8.

In the management system according to the sixth embodiment of the present disclosure, the management device 101 determines an abnormal area in the plant 8. Then, the management device 101 performs control of displaying the content according to the determined abnormal area.

According to this configuration, for example, the position of the abnormal area in the plant 8 can be displayed, whereby a person who has seen the display can visually recognize the positional relationship between the plant 8 and the abnormal area.

In the management system according to the sixth embodiment of the present disclosure, the content according to the abnormal area is a route connecting the abnormal area and the outside of the plant 8.

According to this configuration, for example, an evacuation route for safe and prompt escape from the abnormal area to the outside of the plant 8, and an arrival route for safe and prompt arrival from the outside of the plant 8 to the abnormal area, can be transmitted, whereby the risk that a person is stuck in the plant 8 can be reduced.

In the management system according to the sixth embodiment of the present disclosure, the content according to the abnormal area is the position of a maintenance tool to be used against the abnormal area.

According to this configuration, for example, the position of a fire extinguisher in the plant 8 can be transmitted, whereby the time required for searching for the fire extinguisher can be reduced. Thus, prompt measures against the abnormal area can be taken.

In the management system according to the sixth embodiment of the present disclosure, sensor information includes a measurement result of smoke. The management device 101 performs control of displaying distribution of smoke in the predetermined area.

According to this configuration, a person who has seen the display can recognize, for example, the position where fire breaks out, and the degree of spread of smoke, whereby the person can more accurately recognize the fire situation in the predetermined area.

In the management system according to the sixth embodiment of the present disclosure, the management device 101 determines a fire area A1 in the predetermined area on the basis of a measurement result of smoke. Then, the management device 101 performs control of displaying an evacuation route from the fire area A1 to the outside of the predetermined area.

According to this configuration, the fire area A1 can be determined more accurately, whereby a more accurate evacuation route can be displayed. Thus, it is possible to further reduce the risk that a person is stuck in the predetermined area as he/she escapes therefrom.

In the management system according to the sixth embodiment of the present disclosure, the management device 101 determines a fire area A1 in the predetermined area on the basis of a measurement result of smoke. Then, the management device 101 performs control of displaying an arrival route from the outside of the predetermined area to the fire area A1.

According to this configuration, the fire area A1 can be determined more accurately, whereby a more accurate arrival route can be displayed. Thus, it is possible to further reduce the risk that a person is stuck in the predetermined area as he/she rushes to the fire area A1.

In the management system according to the sixth embodiment of the present disclosure, the management device 101 performs control of displaying the position of a fire extinguishing tool to be used against the fire area A1 in the predetermined area.

According to this configuration, the time required for searching for the fire extinguishing tool can be reduced, whereby prompt measures against fire in the predetermined area can be taken.

In the management device according to the sixth embodiment of the present disclosure, the acquisition unit 21 acquires sensor information wirelessly transmitted from a plurality of sensor units 1 installed in a predetermined area. The determination unit 24 performs a spatial process using the sensor information acquired by the acquisition unit 21 to perform determination regarding the predetermined area. The notification unit 22 notifies the content based on the result of the determination performed by the determination unit 24. Then, based on the sensor information acquired by the acquisition unit 21, the display control unit 23 performs control of spatially displaying the content regarding the predetermined area.

Since the determination regarding the predetermined area is performed through the spatial process using the sensor information, a spatial change of the state of the predetermined area can be recognized based on a spatial change of the content of the sensor information. Therefore, the state of the predetermined area can be grasped more accurately. In addition, the content based on the determination result is notified, and the content regarding the predetermined area, based on the sensor information, is spatially displayed, whereby the state of predetermined area can be transmitted to the administrator more accurately. Accordingly, the monitoring result regarding the plant can be transmitted more accurately.

The other configurations and operations are the same as those of the management system according to the first embodiment, and detailed description thereof is not repeated here.

Next, another embodiment of the present disclosure will be described with reference to the drawings. The same or corresponding parts in the drawings are denoted by the same reference characters, and description thereof is not repeated.

Seventh Embodiment

This embodiment relates to a management system which performs determination regarding smoke in a plant, in contrast to the management system according to the first embodiment. Except for the contents described below, the management system of this seventh embodiment is identical to the management system of the first embodiment.

Figure 35:
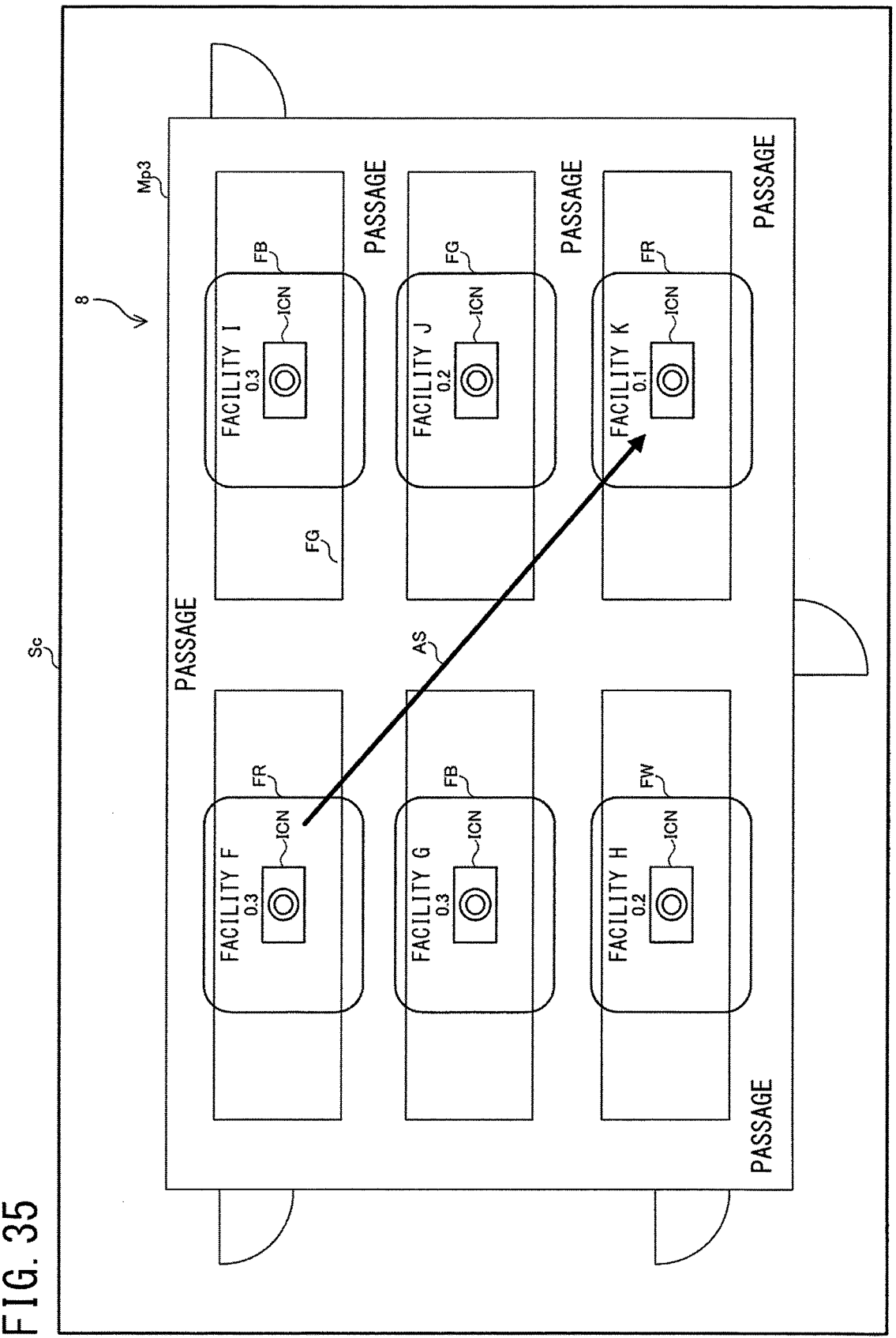
FIG. 35 shows an example of a screen displayed on a display device in a management system according to a seventh embodiment of the present disclosure.

FIG. 35 shows an example of a screen displayed on a display device in the management system according to the seventh embodiment of the present disclosure. FIG. 35 shows a drawing Mp3 of the plant 8 shown in FIG. 31. In the drawing Mp3, in contrast to FIG. 31, each facility is equipped with one sensor unit 1 including a smoke sensor.

Referring back to FIG. 3, the determination unit 24 in the management device 101 performs a spatial process and a temporal process using sensor information acquired by the acquisition unit 21 to perform determination regarding a predetermined area, i.e., the plant 8. For example, the management device 101 performs determination regarding smoke in the plant 8. In addition, the determination unit 24 acquires drawing information from the accumulation device 171 via the acquisition unit 21.

Figure 36:
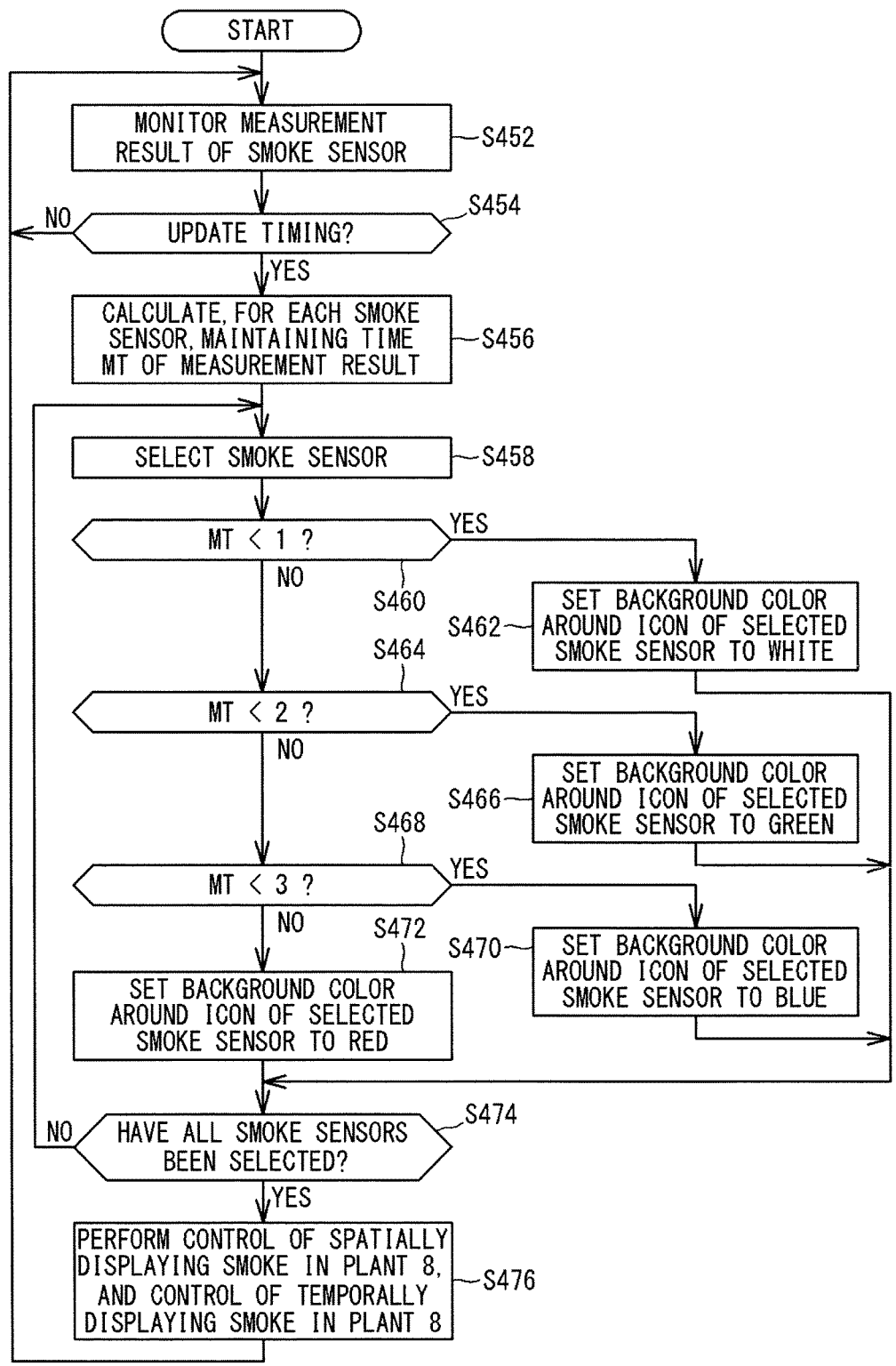
FIG. 36 is a flowchart showing an operation procedure used when the management device according to the seventh embodiment of the present disclosure performs determination regarding smoke, and performs a process of displaying the determination result.

FIG. 36 is a flowchart showing an operation procedure used when the management device according to the seventh embodiment of the present disclosure performs determination regarding smoke, and performs a process of displaying the determination result.

With reference to FIG. 35 and FIG. 36, first, the determination unit 24 acquires sensor information from a plurality of smoke sensors installed in the plant 8, from the accumulation device 171 via the acquisition unit 21, and monitors the acquired sensor information (step S452).

Next, until a predetermined update timing arrives (NO in step S454), the determination unit 24 continues to monitor the sensor information (step S452). The predetermined update timing may be, for example, each predetermined time such as 10 minutes, or each event such as acquisition of sensor information from a smoke sensor.

When the predetermined update timing has arrived (YES in step S454), the determination unit 24 calculates, for each smoke sensor, a maintaining time MT during which a state where the value of a measurement result is within a predetermined range is maintained (step S456).

Next, the determination unit 24 selects one smoke sensor from among the plurality of smoke sensors installed in the plant 8 (step S458).

Next, when the maintaining time MT of the selected smoke sensor is less than 1 hour (YES in step S460), the determination unit 24 sets a background color around the selected smoke sensor to white (step S462).

On the other hand, when the maintaining time MT of the selected smoke sensor is not less than 1 hour and less than 2 hours (NO in step S460 and YES in step S464), the determination unit 24 sets the background color around the selected smoke sensor to green (step S466).

On the other hand, when the maintaining time MT of the selected smoke sensor is not less than 2 hours and less than 3 hours (NO in step S460, NO in step S464, and YES in step S468), the determination unit 24 sets the background color around the selected smoke sensor to blue (step S470).

On the other hand, when the maintaining time MT of the selected smoke sensor is not less than 3 hours (NO in step S460, NO in step S464, and NO in step S468), the determination unit 24 sets the background color around the selected smoke sensor to red (step S472).

Next, when the background color is set to white (step S462), green (step S466), blue (step S470), or red (step S472), the determination unit 24 determines whether or not there is an unselected smoke sensor among the plurality of smoke sensors installed in the plant 8 (step S474).

When there is an unselected smoke sensor among the plurality of smoke sensors installed in the plant 8 (NO in step S474), the determination unit 24 selects one unselected smoke sensor (step S458).

On the other hand, when all the smoke sensors installed in the plant 8 have already been selected (YES in step S474), the determination unit 24 creates smoke condition information indicating the IDs and measurement values of the respective smoke sensors, and the background colors of the respective smoke sensors, and outputs the created smoke condition information to the display control unit 23.

Next, the display control unit 23 performs control of spatially displaying abnormality in the plant 8, and control of temporally displaying the abnormality in the plant 8.

Specifically, the display control unit 23 performs, for example, control of displaying a flow, distribution, and residence time of smoke in the plant 8 (step S476).

More specifically, upon receiving the smoke condition information from the determination unit 24, the display control unit 23 derives a smoke flow direction AS on the basis of the received smoke condition information. For example, since the dust concentrations of 0.3 and 0.1 are maintained for 3 hours or more in the facilities F and K, the display control unit 23 derives a direction from the facility F to the facility K as the smoke flow direction AS.

In addition, the display control unit 23 acquires the drawing information from the accumulation device 171 via the acquisition unit 21. Based on the smoke condition information and the drawing information, the display control unit 23 performs: control of displaying, on the screen Sc, icons ICN which indicate the plurality of smoke sensors installed in the plant 8 and to which the measurement results of the smoke sensors are appended, in the corresponding background colors; and control of displaying the drawing Mp3 of the plant 8 on the screen Sc.

Based on the drawing information, the display control unit 23 performs control of displaying the derived smoke flow direction AS on the screen Sc.

Next, the determination unit 24 continues to monitor the sensor information (step S452).

The display control unit 23 in step S476 performs control of displaying the background of each icon in a color according to the maintaining time MT. However, the present disclosure is not limited thereto. The display control unit 23 may perform control of displaying each icon by use of hatching according to the maintaining time MT, or may perform control of displaying each icon by use of a combination of a background color and hatching, according to the maintaining time MT.

The display control unit 23 in step S476 performs control of displaying the background of each icon in a color according to the maintaining time MT. However, the present disclosure is not limited thereto. The display control unit 23 may perform control of displaying the background of each icon in a color according to a direction in which the measurement value of the corresponding smoke sensor changes. More specifically, the display control unit 23 may perform control of displaying an icon of each smoke sensor in different background colors corresponding to a case where the measurement value of the smoke sensor increases, a case where the measurement value decreases, and a case where the measurement value is maintained.

The display control unit according to the seventh embodiment of the present disclosure is configured to perform control of displaying the flow, distribution, and residence time of smoke in the plant 8. However, the present disclosure is not limited thereto. The display control unit 23 may be configured to perform control of displaying any one or two of the flow, distribution, and residence time of smoke in the plant 8.

As described above, in the management system according to the seventh embodiment of the present disclosure, the sensor information includes a measurement result of smoke. The management device 101 performs control of displaying at least one of a flow, distribution, and residence time of smoke in the predetermined area.

According to the above configuration, for example, a position, where smoke stays, in the predetermined area can be recognized, whereby an appropriate installation place for smoke eliminating equipment can be grasped.

The other configurations and operations are the same as those of the management system according to the first embodiment, and detailed description thereof is not repeated here.

Some or all of the components and operations of the devices according to the first to seventh embodiments of the present disclosure may be combined as appropriate.

Some or all of the functions of the server according to any of the first to seventh embodiments of the present disclosure may be provided by cloud computing. That is, the server according to any of the first to seventh embodiments of the present disclosure may be composed of a plurality of cloud servers, etc.

The embodiment above is to be considered in all aspects as illustrative and not restrictive. The scope of the present disclosure is indicated by the appended claims rather than by the above description, and all changes which come within the meaning and range of equivalency of the claims are therefore intended to be embraced therein.

The above description includes the features in the additional notes below.

[Additional Note 1]

A management system comprising a plurality of sensors installed in a predetermined area, and a management device,
 the management device comprising:
 an acquisition unit configured to acquire sensor information wirelessly transmitted from the plurality of sensors;
 an accumulation unit configured to accumulate the sensor information acquired by the acquisition unit;
 a determination unit configured to perform abnormality determination regarding the predetermined area by use of the sensor information;
 a notification unit configured to notify a content based on a result of the determination by the determination unit; and
 a display control unit capable of performing a control of temporally displaying a content regarding the predetermined area, on the basis of the sensor information acquired by the acquisition unit, wherein
 the predetermined area is a plant, an airport, a railroad station, a bus terminal, an office, or a warehouse,
 the sensor is a smoke sensor, a temperature sensor, a humidity sensor, a current sensor, a non-contact temperature sensor, an acceleration sensor, a concentration sensor, a gyro sensor, a pressure sensor, or a battery voltage sensor,
 the notification unit notifies the content based on the result of the determination by use of a mail, voice, or a warning lamp, and
 the display control unit performs, as the temporal display control, control of displaying a graph that indicates a temporal change of a content of the sensor information, on the basis of the acquired sensor information.

[Additional Note 2]

A management system comprising:
 a plurality of sensors installed in a predetermined area;
 an accumulation unit configured to accumulate sensor information wirelessly transmitted from the plurality of sensors; and
 a management device configured to acquire the sensor information, wherein
 the management device performs determination regarding the predetermined area by performing at least one of a spatial process and a temporal process using the acquired sensor information, and the management device is capable of notifying a content based on a result of the determination, and performing, based on the acquired sensor information, at least one of control of spatially displaying a content regarding the predetermined area and control of temporally displaying the content regarding the predetermined area, the predetermined area is a plant, an airport, a railroad station, a bus terminal, an office, or a warehouse, the sensor is a smoke sensor, a temperature sensor, a humidity sensor, a current sensor, a non-contact temperature sensor, an acceleration sensor, a concentration sensor, a gyro sensor, a pressure sensor, or a battery voltage sensor, the management device notifies the content based on the result of the determination by use of a mail, voice, or a warning lamp, the management device performs, as the spatial display control, control of displaying icons of the sensors installed in the predetermined area, on the basis of the acquired sensor information, and the management device performs, as the temporal display control, control of displaying a graph indicating a temporal change of a content of the sensor information, on the basis of the acquired sensor information.

[Additional Note 3]

A management system comprising:

a plurality of sensors installed in a predetermined area;

an accumulation unit configured to accumulate sensor information wirelessly transmitted from the plurality of sensors; and a management device configured to acquire the sensor information, wherein the management device performs, with respect to a plurality of target periods, predetermined arithmetic processing on target values which are values indicated by a plurality of pieces of sensor information from the same sensor in each target period, to calculate a representative value in the target period, and the management device predicts, based on the representative values in the respective target periods, a representative value in a period later than the target periods, the predetermined area is a plant, an airport, a railroad station, a bus terminal, an office, or a warehouse, the sensor is a smoke sensor, a temperature sensor, a humidity sensor, a current sensor, a non-contact temperature sensor, an acceleration sensor, a concentration sensor, a gyro sensor, a pressure sensor, or a battery voltage sensor, and the representative value is a statistic of the target values, a size of a range of the target values, or a magnitude of a predetermined frequency component in a frequency distribution of the target values.

[Additional Note 4]

A management system comprising:

a plurality of sensors installed in a predetermined area;

an accumulation unit configured to accumulate sensor information wirelessly transmitted from the plurality of sensors; and a management device configured to acquire the sensor information, wherein the management device determines an abnormal area in the predetermined area on the basis of the acquired sensor information, the predetermined area is a plant, an airport, a railroad station, a bus terminal, an office, or a warehouse, the sensor is a smoke sensor, a temperature sensor, a humidity sensor, a current sensor, a non-contact temperature sensor, an acceleration sensor, a concentration sensor, a gyro sensor, a pressure sensor, or a battery voltage sensor, and the management device determines a fire area, and a diffusion area obtained by extending or shifting the fire area, on the basis of the sensor information from the plurality of smoke sensors.

[Additional Note 5]

A management system comprising:

a plurality of sensors installed in a predetermined area;

an accumulation unit configured to accumulate sensor information wirelessly transmitted from the plurality of sensors; and a management device configured to acquire the sensor information, wherein the management device predicts a temporal transition of an abnormal area in the predetermined area, on the basis of the acquired sensor information, the predetermined area is a plant, an airport, a railroad station, a bus terminal, an office, or a warehouse, the sensor is a smoke sensor, a temperature sensor, a humidity sensor, a current sensor, a non-contact temperature sensor, an acceleration sensor, a concentration sensor, a gyro sensor, a pressure sensor, or a battery voltage sensor, and the management device predicts temporal transitions of a fire area and a diffusion area obtained by extending or shifting the fire area, on the basis of the sensor information from the plurality of smoke sensors.

[Additional Note 6]

A management device comprising:

an acquisition unit configured to acquire sensor information wirelessly transmitted from a plurality of sensors installed in a predetermined area;

a determination unit configured to perform abnormality determination regarding the predetermined area by use of the sensor information;

a notification unit configured to notify a content based on a result of the determination by the determination unit; and a display control unit capable of performing control of temporally displaying a content regarding the predetermined area, on the basis of the sensor information acquired by the acquisition unit, wherein the predetermined area is a plant, an airport, a railroad station, a bus terminal, an office, or a warehouse, the sensor is a smoke sensor, a temperature sensor, a humidity sensor, a current sensor, a non-contact temperature sensor, an acceleration sensor, a concentration sensor, a gyro sensor, a pressure sensor, or a battery voltage sensor, the notification unit notifies the content based on the result of the determination by use of a mail, voice, or a warning lamp, and the display control unit performs, as the temporal display control, control of displaying a graph that indicates a temporal change of a content of the sensor information, on the basis of the acquired sensor information.

[Additional Note 7]

A management device comprising:

an acquisition unit configured to acquire sensor information wirelessly transmitted from a plurality of sensors installed in a predetermined area;

a determination unit configured to perform determination regarding the predetermined area by performing at least one of a spatial process and a temporal process using the sensor information acquired by the acquisition unit;

a notification unit configured to notify a content based on a result of the determination by the determination unit; and a display control unit configured to perform, based on the sensor information acquired by the acquisition unit, at least one of control of spatially displaying a content regarding the predetermined area and control of temporally displaying the content regarding the predetermined area, wherein the predetermined area is a plant, an airport, a railroad station, a bus terminal, an office, or a warehouse, the sensor is a smoke sensor, a temperature sensor, a humidity sensor, a current sensor, a non-contact temperature sensor, an acceleration sensor, a concentration sensor, a gyro sensor, a pressure sensor, or a battery voltage sensor, the notification unit notifies the content based on the result of the determination by use of a mail, voice, or a warning lamp, the display control unit performs, as the spatial display control, control of displaying icons of the sensors installed in the predetermined area, on the basis of the acquired sensor information, and the display control unit performs, as the temporal display control, control of displaying a graph indicating a temporal change of a content of the sensor information, on the basis of the acquired sensor information.

REFERENCE SIGNS LIST 1 sensor
5, 8 plant
6 office
7 container
9 rotation unit
10 facility
11 internal network
21 acquisition unit
22 notification unit
23 display control unit
24 determination unit
25 reception unit
26 mode setting unit
101, 102 management device
111 notification device
131 display device
151 access point (relay device)
171 accumulation device
301 management system

The invention claimed is:

1. A management system comprising a plurality of sensors installed in a predetermined area, and a management device,
the management device comprising:
a non-transitory computer readable memory;
a hardware processor coupled to the non-transitory computer readable memory and configured to read instructions from the non-transitory computer readable memory to cause the management device to perform operations comprising:
acquiring sensor information wirelessly transmitted from the plurality of sensors;
accumulating the sensor information;
performing an abnormality determination regarding the predetermined area by use of the sensor information;
notifying a content based on a result of the abnormality determination; and
performing a control of temporally displaying a content regarding the predetermined area, on the basis of the sensor information, wherein
the operation of performing the abnormality determination includes performing the abnormality determination by comparing tendency information indicating a temporal change of at least one of a dust concentration, a humidity, an electric current, and an acceleration, with determination information that is registered in advance, the temporal change being estimated from the sensor information.

2. The management system according to claim 1, wherein the tendency information includes information based on a result of a statistical process performed on the sensor information.

3. The management system according to claim 2, wherein the result of the statistical process is at least one of an average, a variance, and a standard deviation.

4. The management system according to claim 1, wherein the determination information is a threshold value.

5. The management system according to claim 1, wherein the management device compares the tendency information in a target period, with determination information used for the abnormality determination, and performs determination of an abnormal area in the predetermined area, on the basis of a result of the comparison.

6. The management system according to claim 5, wherein the management device predicts a temporal transition of the abnormal area on the basis of the sensor information in the target period.

7. The management system according to claim 1, further comprising a plurality of relay devices configured to relay the sensor information through wireless communication, wherein
the sensor information is transmitted to the management device via the plurality of relay devices.

8. The management system according to claim 1, wherein the sensor information includes at least one measurement result, regarding the predetermined area, among measurement results of smoke, temperature, humidity, current, voltage, concentration, pressure, acceleration, and angular acceleration.

9. The management system according to claim 8, wherein
the sensor information includes a measurement result of smoke, and
the management device performs control of displaying at least one of flow, distribution, and residence time of smoke in the predetermined area.

10. The management system according to claim 9, wherein
the management device determines a fire area in the predetermined area on the basis of the measurement result of smoke, and
the management device performs control of displaying an evacuation route from the fire area to an outside of the predetermined area.

11. The management system according to claim 9, wherein
the management device determines a fire area in the predetermined area on the basis of the measurement result of smoke, and
the management device performs control of displaying an arrival route from an outside of the predetermined area to the fire area.

12. The management system according to claim 9, wherein the management device performs control of displaying a position of a fire extinguishing tool to be used against a fire area in the predetermined area.

13. The management system according to claim 1, wherein the predetermined area is included in a plant.

14. A management device comprising:
a non-transitory computer readable memory;
a hardware processor coupled to the non-transitory computer readable memory and configured to read instructions from the non-transitory computer readable memory to cause the management device to perform operations comprising:
acquiring sensor information wirelessly transmitted from a plurality of sensors installed in a predetermined area;
performing abnormality determination regarding the predetermined area by use of the sensor information;

notifying a content based on a result of the abnormality determination; and performing a control of temporally displaying a content regarding the predetermined area, on the basis of the sensor information, wherein the operation of performing the abnormality determination includes performing the abnormality determination by comparing tendency information indicating a temporal change of at least one of a dust concentration, a humidity, an electric current, and an acceleration, with determination information that is registered in advance, the temporal change being estimated from the sensor information.

15. A management method used in a management system that includes a plurality of sensors installed in a predetermined area, and a management device, the method comprising:

acquiring, by the management device, sensor information wirelessly transmitted from the plurality of sensors;

accumulating, by the management device, the acquired sensor information;

performing, by the management device, abnormality determination regarding the predetermined area by use of the sensor information;

notifying, by the management device, a content based on a result of the determination; and performing, by the management device, a control of temporally displaying a content regarding the predetermined area, on the basis of the acquired sensor information, wherein the step of performing the abnormality determination includes performing the abnormality determination by comparing tendency information indicating a temporal change of at least one of a dust concentration, a humidity, an electric current, and an acceleration, with determination information that is registered in advance, the temporal change being estimated from the sensor information.

16. A non-transitory computer readable storage medium storing a computer program used in a management device, the computer program causing a computer to execute the steps of:

acquiring sensor information wirelessly transmitted from a plurality of sensors installed in a predetermined area;

performing abnormality determination regarding the predetermined area by use of the sensor information;

notifying a content based on a result of the abnormality determination; and performing a control of temporally displaying a content regarding the predetermined area, on the basis of the sensor information, wherein the step of performing the abnormality determination includes performing the abnormality determination by comparing tendency information indicating a temporal change of at least one of a dust concentration, a humidity, an electric current, and an acceleration, with determination information that is registered in advance, the temporal change being estimated from the sensor information.

* * * * *